(12) United States Patent
Lay et al.

(10) Patent No.: US 9,190,185 B2
(45) Date of Patent: Nov. 17, 2015

(54) BULK PURIFICATION AND DEPOSITION METHODS FOR SELECTIVE ENRICHMENT IN HIGH ASPECT RATIO SINGLE-WALLED CARBON NANOTUBES

(71) Applicant: University of Georgia Research Foundation, Inc., Athens, GA (US)

(72) Inventors: Marcus D. Lay, Athens, GA (US); Pornnipa Vichchulada, Athens, GA (US); Nidhi P. Bhatt, Athens, GA (US)

(73) Assignee: UNIVERSITY OF GEORGIA RESEARCH FOUNDATION, INC., Athens, GA (US)

( * ) Notice: Subject to any disclaimer, the term of this patent is extended or adjusted under 35 U.S.C. 154(b) by 159 days.

(21) Appl. No.: 13/868,381

(22) Filed: Apr. 23, 2013

(65) Prior Publication Data
US 2013/0277618 A1  Oct. 24, 2013

Related U.S. Application Data

(60) Provisional application No. 61/636,885, filed on Apr. 23, 2012.

(51) Int. Cl.
| | |
|---|---|
| H01B 1/06 | (2006.01) |
| H01B 1/24 | (2006.01) |
| H01B 1/04 | (2006.01) |
| H01B 13/00 | (2006.01) |
| C01B 31/02 | (2006.01) |
| B82Y 30/00 | (2011.01) |
| B82Y 40/00 | (2011.01) |

(52) U.S. Cl.
CPC ............... *H01B 1/04* (2013.01); *C01B 31/026* (2013.01); *H01B 13/00* (2013.01); *B82Y 30/00* (2013.01); *B82Y 40/00* (2013.01); *Y10S 977/748* (2013.01); *Y10S 977/847* (2013.01); *Y10S 977/932* (2013.01)

(58) Field of Classification Search
CPC .. B82Y 40/00; C01B 31/026; C01B 2202/08; H01B 1/04; H01B 13/00
USPC .................. 252/506; 205/157, 333; 210/634; 428/156, 688
See application file for complete search history.

(56) References Cited

U.S. PATENT DOCUMENTS

| | | | |
|---|---|---|---|
| 2007/0125707 | A1 | 6/2007 | Komatsu et al. |
| 2008/0280160 | A1 | 11/2008 | Arepalli et al. |
| 2009/0169819 | A1* | 7/2009 | Drzaic et al. ................. 428/156 |

OTHER PUBLICATIONS

Lipscomb et al.; "Methods for enhanced control over the density and electrical properties of SWNT networks"; 2011, J Mater Sci; 46; 6812-6822.*

Yongfu Lian, "A Green Access to Highly Pure Single-Walled Carbon Nanotubes by Taurocholate-Assistant Dispersion and Centrifugation," Journal of Physics: Conference Series 188 (2009) 012050, 4 pages, IOP Publishing Ltd., 8th China International Nanoscience and Technology Symposium (CINSTS09).

(Continued)

*Primary Examiner* — Khanh Tuan Nguyen
(74) *Attorney, Agent, or Firm* — Thomas Horstemeyer, LLP

(57) ABSTRACT

The present disclosure includes purification and deposition methods for single-walled carbon nanotubes (SWNTs) that allow for purification without damaging the SWNTs. The present disclosure includes methods for reducing electrical resistance in SWNT networks.

13 Claims, 43 Drawing Sheets

(56) References Cited

OTHER PUBLICATIONS

Kai Moshammer, Frank Hennrich, and Manfred M. Kappes, "Selective Suspension in Aqueous Sodium Dodecyl Sulfate According to Electronic Structure Type Allows Simple Separation of Metallic from Semiconducting Single-Walled Carbon Nanotubes," Nano Res (2009) 2: pp. 599-606, Tsinghua University Press and Springer-Verlag 2009, Germany.

M.F. Islam, E. Rojas, D.M. Bergey, A.T. Johnson, and A. G. Yodh, "High Weight Fraction Surfactant Solubilization of Single-Wall Carbon Nanotubes in Water," Nano Letters 2003, vol. 3, No. 2, pp. 269-273, REG130972 2011PT, Published on Web Jan. 16, 2003.

L.A. Hough, M.F. Islam, B. Hammouda, A.G. Yodh, and P.A. Heiney, "Structure of Semidilute Single-Wall Carbon Nanotube Suspensions and Gels," Nano Letters 2006, vol. 6, No. 2, pp. 313-317, Department of Physics and Astronomy, University of Pennsylvania, Philadelphia, PA, and National Institute of Standards and Technology, Gaithersburg, MD, Published on Web Jan. 26, 2006.

D.T.N. Chen, K. Chen, L.A. Hough, M.F. Islam, and A.G. Yodh, "Rheology of Carbon Nanotube Networks During Gelation," Macromolecules 2010, 43, pp. 2048-2053, Department of Physics and Astronomy, University of Pennsylvania, Philadelphia, PA, Complex Fluids Laboratory, Rhodia Inc., Bristol, PA, and Department of Chemcial Engineering and Department of Materials Science and Engineering, Carnegie Mellon University, Pittsburgh, PA, Published on Web Feb. 1, 2010.

Aiping Yu, Elena Bekyarova, Mikhail E. Itkis, Danylo Fakhrutdinov, Robert Webster, and Robert C. Haddon, "Application of Centrifugation to the Large-Scale Purification of Electric Arc-Produced Single-Walled Carbon Nanotubes," J/A/C/S Articles, J. Am Chem. Soc. 2006, 128, pp. 9902-9908, University of California, Reiverside, CA and Carbon Solutions, Inc., Riverside, CA, Published on Web Jul. 8, 2006.

Jean-Marc Bonard, Thierry Stora, Jean-Paul Salvetat, Frederic Maier, Thomas Stockli, Claus Duschl, Laszlo Forro, Walt A. De Heer, and Andre Chatelain, "Purification and Size-Selection of Carbon Nanotubes," Adv. Mater, 9(10), 827 (1997), pp. 1-5, Adv. Mater. 9(10), 827 (1997), Lausanne, Switzerland and Atlanta, Georgia, USA.

Li Wei, Bo Wang, Qiang Wang, Lain-Jong Li, Yanhui Yang, and Yuan Chen, "Effect of Centrifugation on the Purity of Single-Walled Carbon Nanotubes from MCM-41 Containing Cobalt," J. Phys. Chem. C 2008, 112, pp. 17567-17575, Ananyang Technological University, Singapore, Published on Web Oct. 16, 2008.

"Purification of Single-Walled Carbon Nanotubes by Means of an Ultracentrifuge," Himac Application No. 129, Jan. 2008, 2 pages, Hitachi Koki Co., Ltd. Life-Science Instruments Division, Japan.

\* cited by examiner

BULK PURIFICATION AND DEPOSITION METHODS FOR SELECTIVE ENRICHMENT IN HIGH ASPECT RATIO SINGLE-WALLED CARBON NANOTUBES

CROSS-REFERENCE TO RELATED APPLICATION

This application claims priority to U.S. provisional application entitled "Bulk Purification and Deposition Methods for Selective Enrichment in High Aspect Ratio Single-Walled Carbon Nanotubes," having Ser. No. 61/636,885 filed on Apr. 23, 2012, which is entirely incorporated herein by reference.

STATEMENT REGARDING FEDERALLY SPONSORED RESEARCH OR DEVELOPMENT

This invention was made with Government support under grant numbers DMR-0906564 and CHE-1038015, awarded by the National Science Foundation. The Government has certain rights in the invention.

BACKGROUND

Single-walled carbon nanotubes (SWNTs) have attracted attention because of their unique electronic and mechanical properties. They have the highest measured tensile strength, are flexible, lightweight, and exhibit low power consumption while retaining high on/off ratios in electronic materials. These seamless tubes of graphene are typically micrometers long and one nanometer in diameter. However, unlike graphene, SWNTs exist as either semi-conductive or metallic conductors due to quantum confinement effects resulting from their curvature. Therefore, there is particular interest in using SWNTs for electronic applications.

Despite their great potential, the widespread use of SWNTs in electronic materials remains stalled by issues with unbundling and purifying them in order to obtain much greater precision over their electronic properties. This is important because, regardless of the growth method, as-produced (AP) grade SWNT soot is a mixture of SWNTs, metal catalyst nanoparticles, and amorphous carbon. The majority of existing purification methods involve oxidizing SWNT soot in strong acids and/or gases. These types of treatments remove metal catalyst nanoparticles and amorphous carbon, but significantly damage the SWNTs and increase their electrical resistance. In addition, use of SWNTs in electronic materials will require addressing a major barrier—the reduction of their high sheet resistance (R).

SUMMARY

Embodiments of the present disclosure, in one aspect, relate to purification and deposition methods for single-walled carbon nanotubes.

Briefly described, embodiments of the present disclosure include a method of purifying and depositing single-walled carbon nanotube (SWNT) networks comprising preparing a substrate, preparing a suspension of SWNTs, and depositing the SWNT suspension, where the deposition method provides control over the density and alignment of the SWNTs and prevents the SWNTs from forming bundles during deposition.

Embodiments of the present disclosure also include a method of reducing electrical resistance in SWNT networks, comprising selective electrodeposition of conductive nanoparticles on SWNTs in a network, where the network is bridging metal electrodes, allowing deposition on the defect sites and sidewalls of the conductive SWNTs, while avoiding metal deposition around them, where the semi-conductive character of the SWNTs is preserved and electrical resistance is reduced.

Embodiments of the present disclosure further include semiconducting single-walled carbon nanotube networks prepared by the disclosed methods, where the on-off current ratio is increased by reducing resistance in the network.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

than b) about 90 min., indicating that the LFD method used to form the deposits preferentially deposits high aspect ratio SWNTs over residual impurities in the suspension processed for about 45 min.

FIGS. 7A-7D illustrate AFM images (8×8 µm) for SWNT deposits on Si/SO$_x$ wafer fragments showed that; a,b) about 45 min. processing times lead to a greater density of SWNTs and impurities between aliquots A and E, respectively than; c,d) about 90 min. periods for aliquots A and E, respectively.

Figure 8:
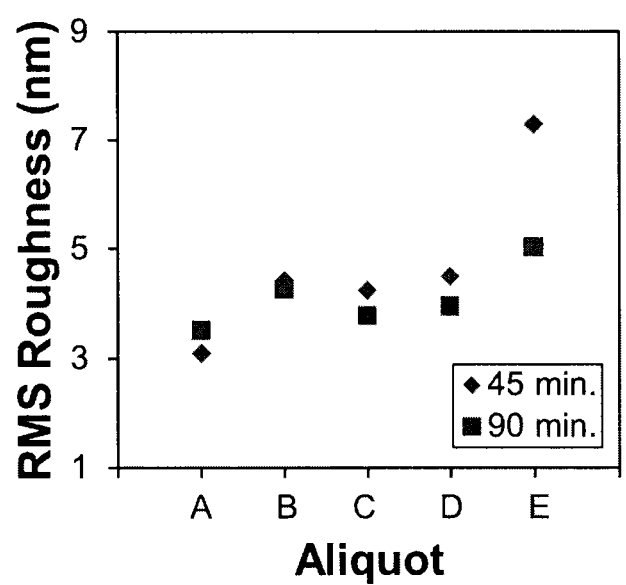

FIG. 8 illustrates RMS roughness values for about 45 and 90 min. processing times were in close agreement for the first few aliquots. However, at lower levels of the suspensions, the shorter time for separation and pelletization of impurities resulted in increased surface roughness.

Figure 9:
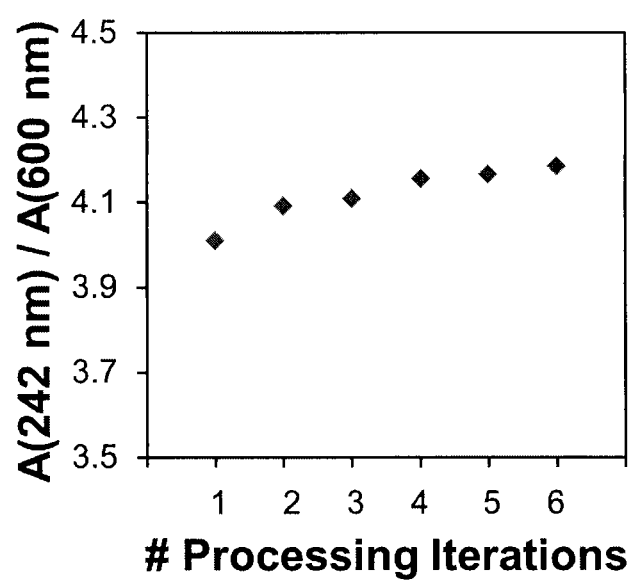
Figure 10A:
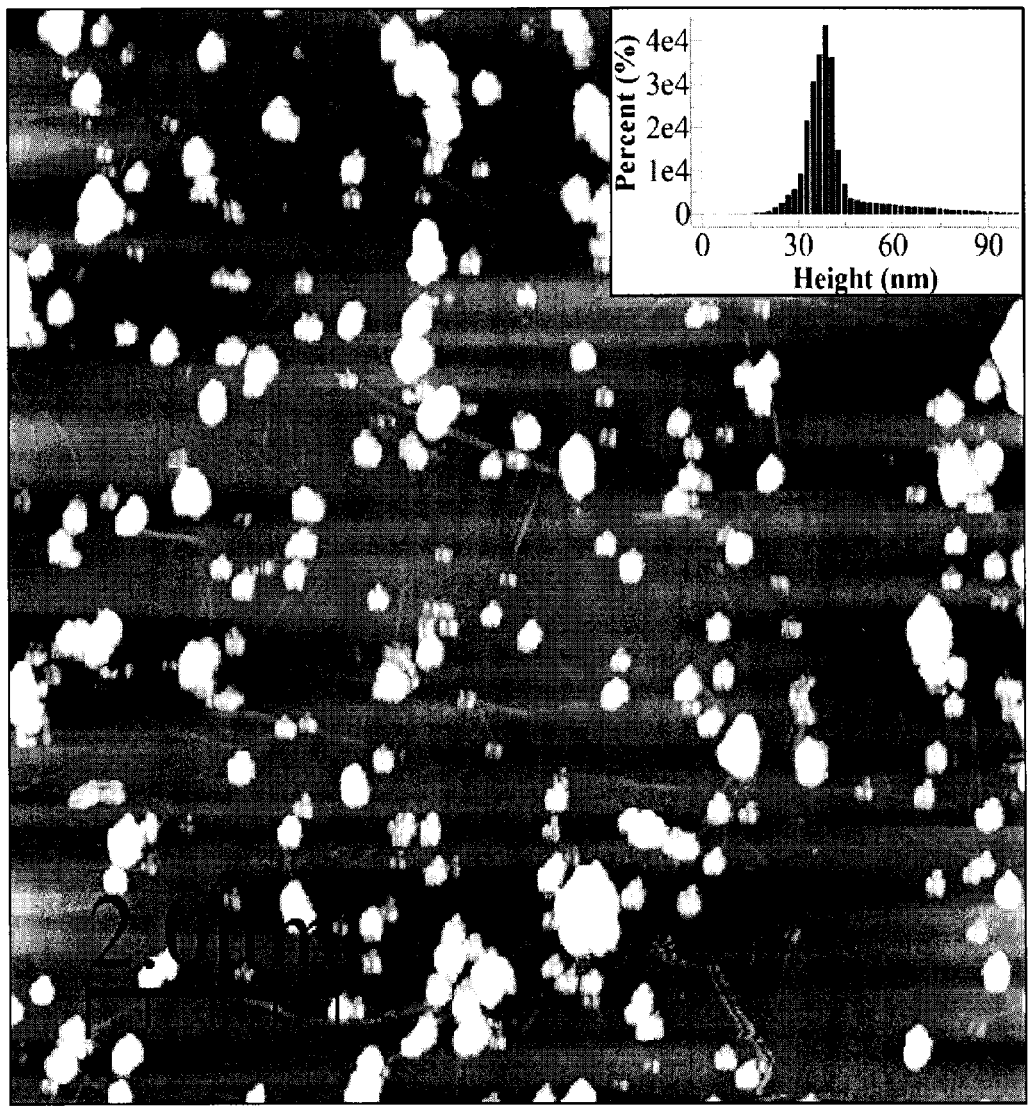
Figure 10B:
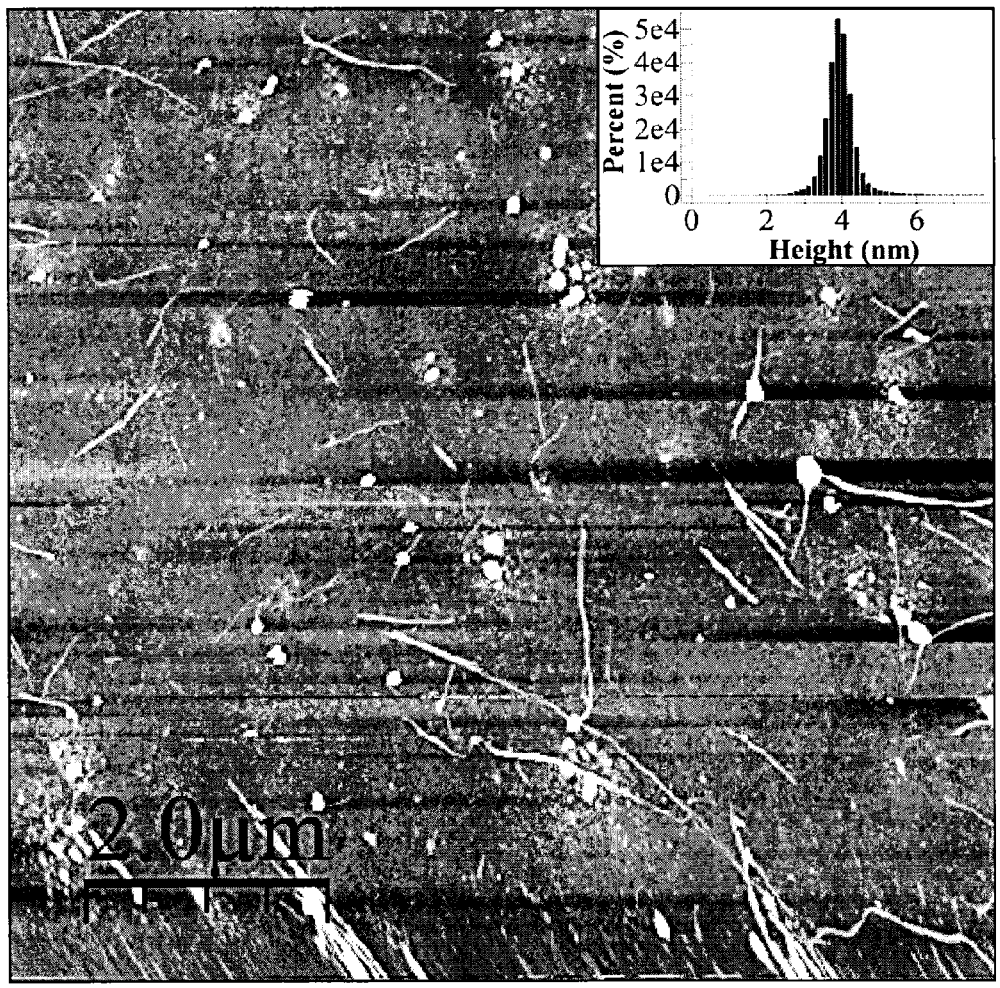
Figure 10C:
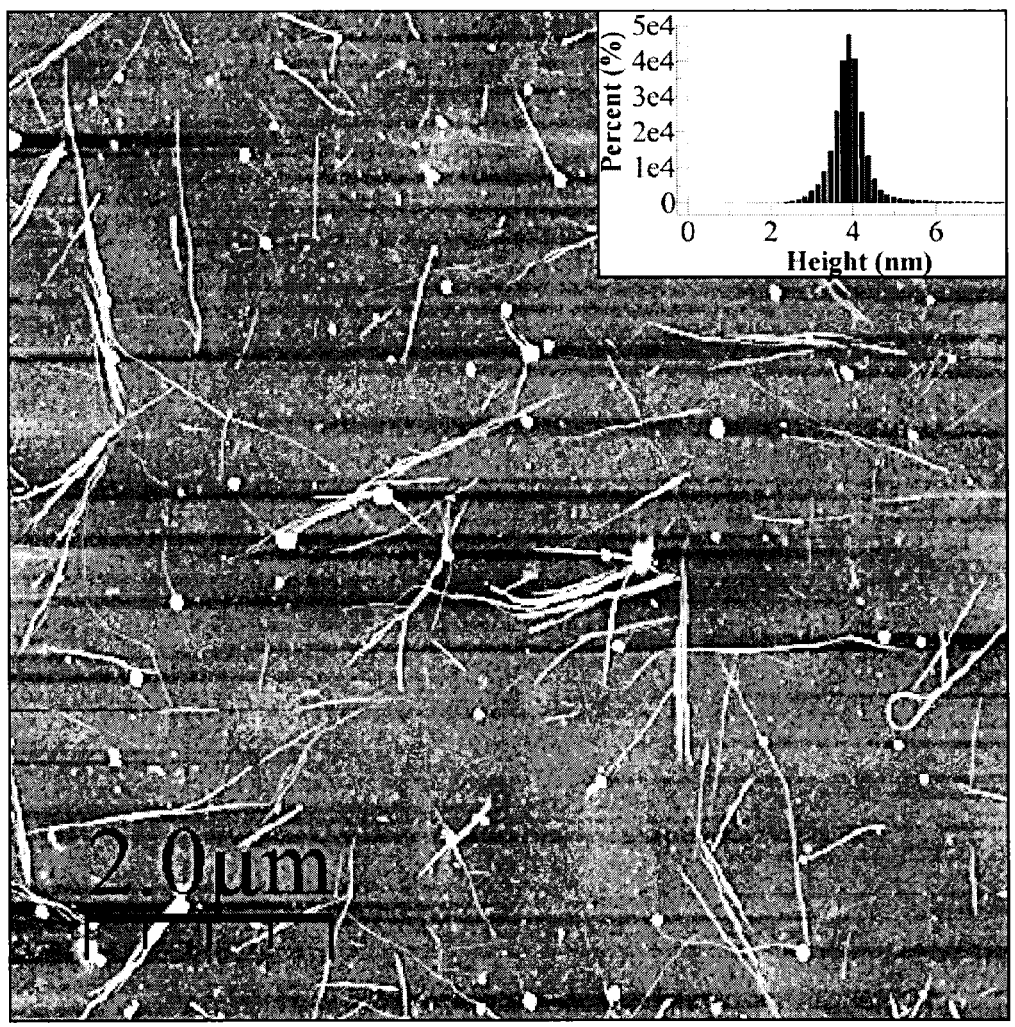
Figure 10D:
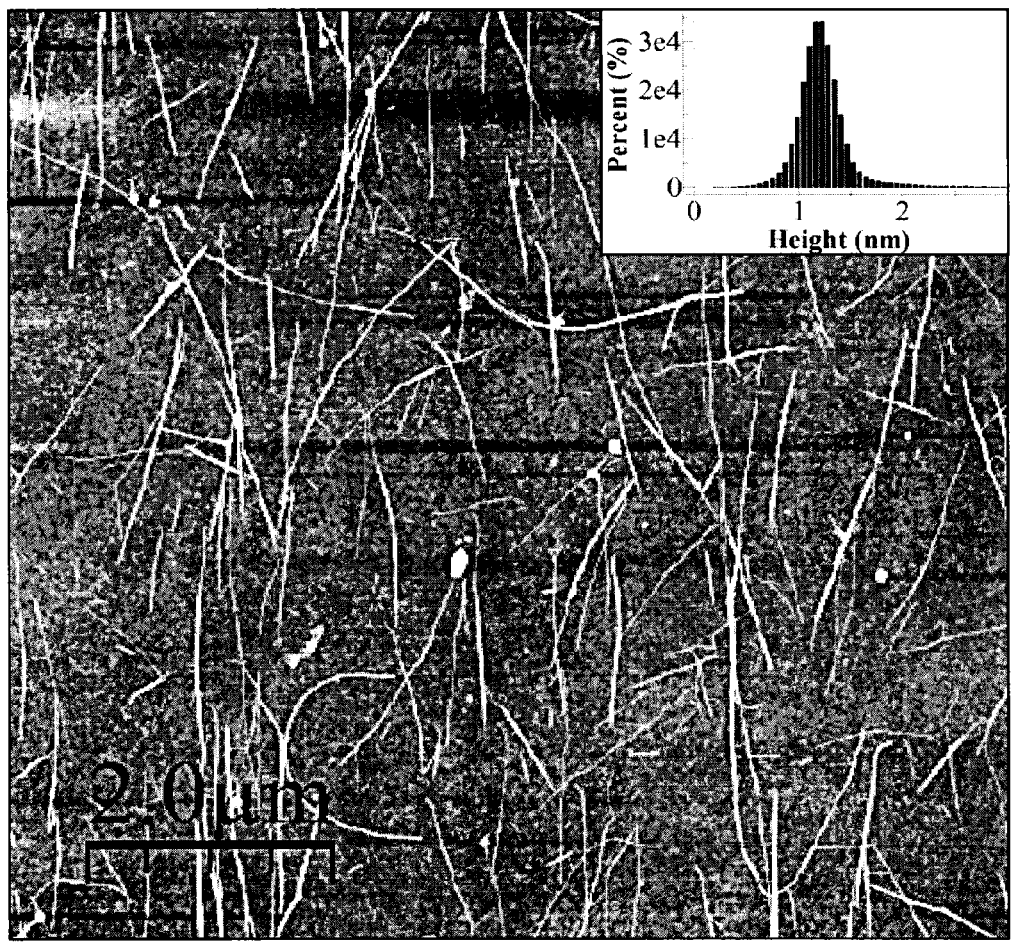

FIG. 9 illustrates the ratio of A(242 nm)/A(600 nm) was highest for an AP suspension of about 0.1 mg/mL SWNT soot. A sudden drop in the ratio after the first processing step indicated that much of the carbonaceous impurities were removed in the first processing step. Then, the increase in this ratio with each processing step is indicative of the enrichment in unbundled SWNTs.

FIGS. 10A-10D illustrate representative AFM images (8×8 µm) for deposits formed from suspensions at various stages of processing; a) an unprocessed suspension resulted in a deposit with average height of about 40.00 nm; b) the average height decreased to about 4.89 nm after the first processing iteration; c) after three steps, the average height was about 3.38 nm; d) six stages resulted in average height of about 1.31 nm, indicating significant removal of impurities and unbundling of SWNTs.

Figure 11:
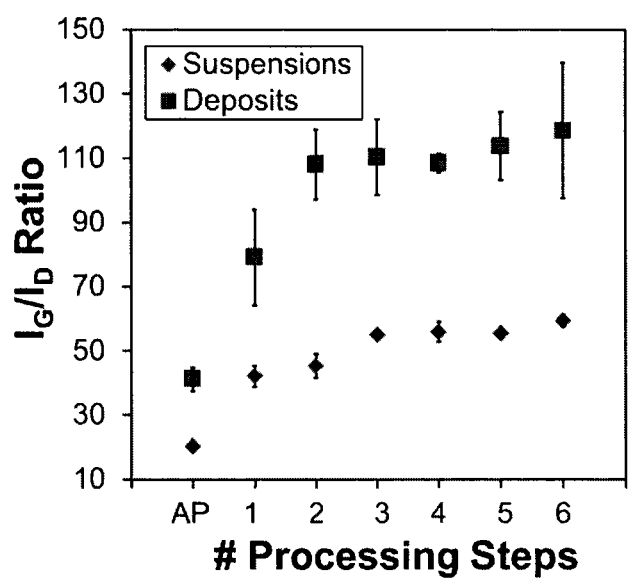

FIG. 11 illustrates the evolution of Raman $I_G/I_D$ ratios for suspensions and deposits of SWNTs over six processing iterations shows that the deposition process plays an important role in separating pristine SWNTs from impurities.

Figure 12:
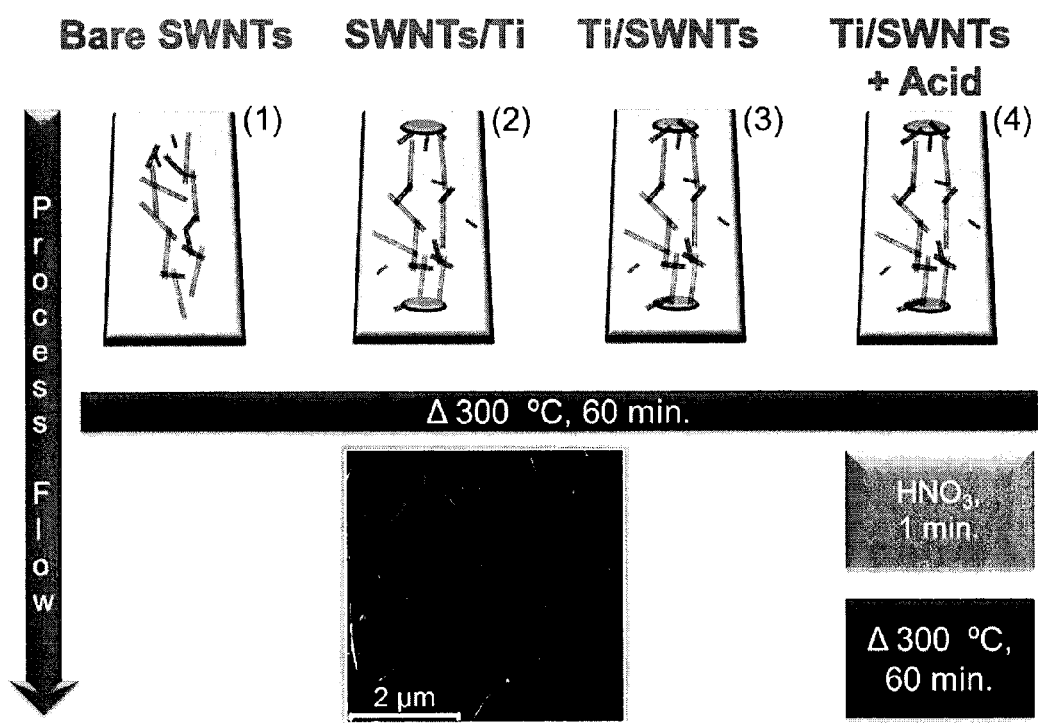

FIG. 12 illustrates a schematic of the process flow (not to scale) for the groups of samples investigated: The effect of low-temperature annealing was observed for (1) bare SWNT networks, (2) when Ti electrodes were deposited post-network deposition, (3) when Ti electrodes were deposited pre-network deposition, and (4) when samples similar to those in (3) were treated with dilute acid and annealed. An AFM image of a typical network appears below.

Figure 13A:
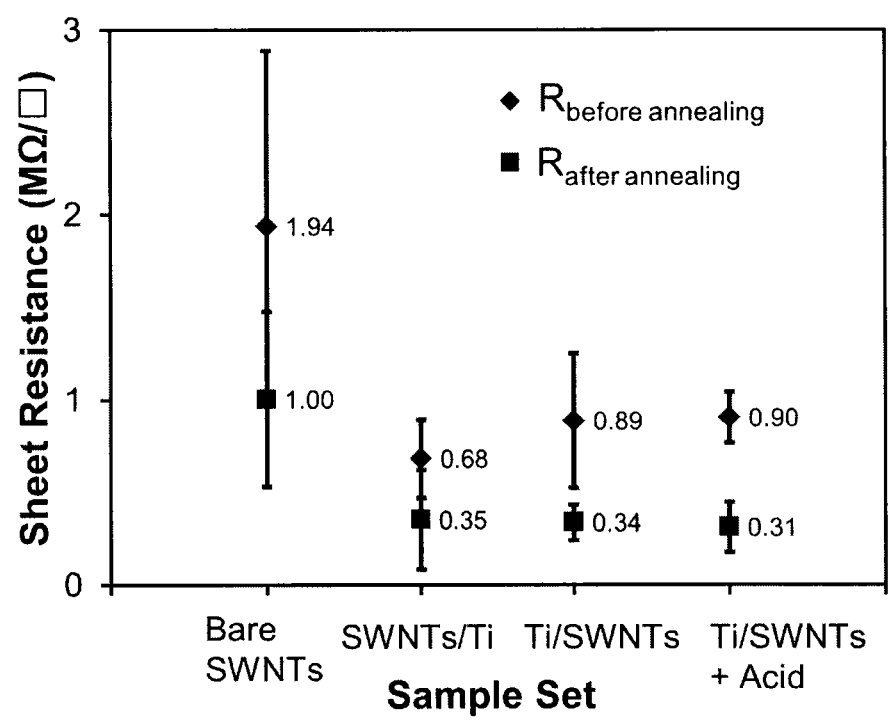
Figure 13B:
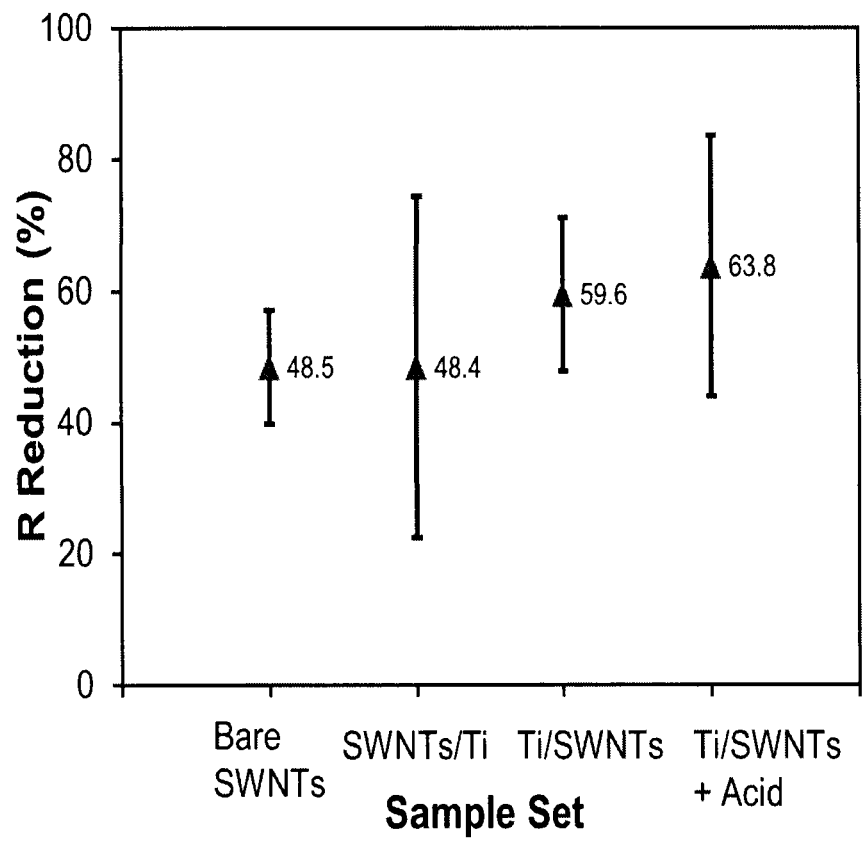

FIGS. 13A-13B illustrate (a) Low-temperature annealing was effective for the reduction of R for all four sets of samples; (b) While an about 49% reduction in $R_{sheet}$ was observed for samples either without Ti electrodes, or such electrodes deposited after the SWNTs, an about 60% reduction in R was observed for the samples that had the Ti contacts deposited prior to the SWNT networks. A mild acid treatment, followed by an additional anneal, decreased R by a statistically insignificant 4% for samples with an initial $R_{sheet}$ of 1 MΩ.

Figure 14A:
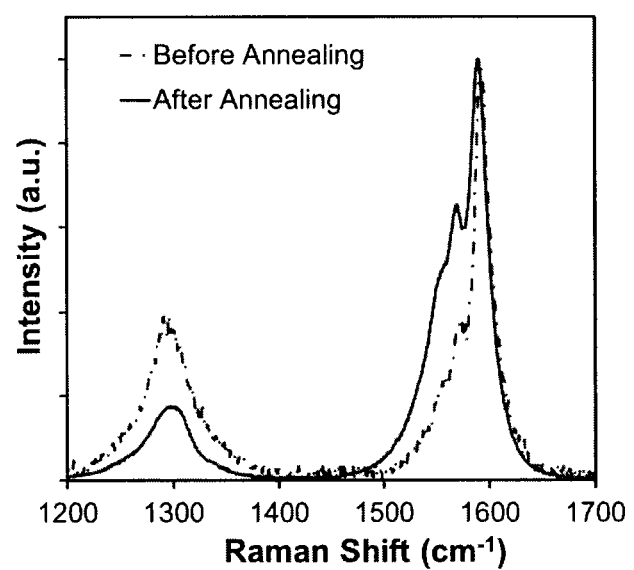
Figure 14B:
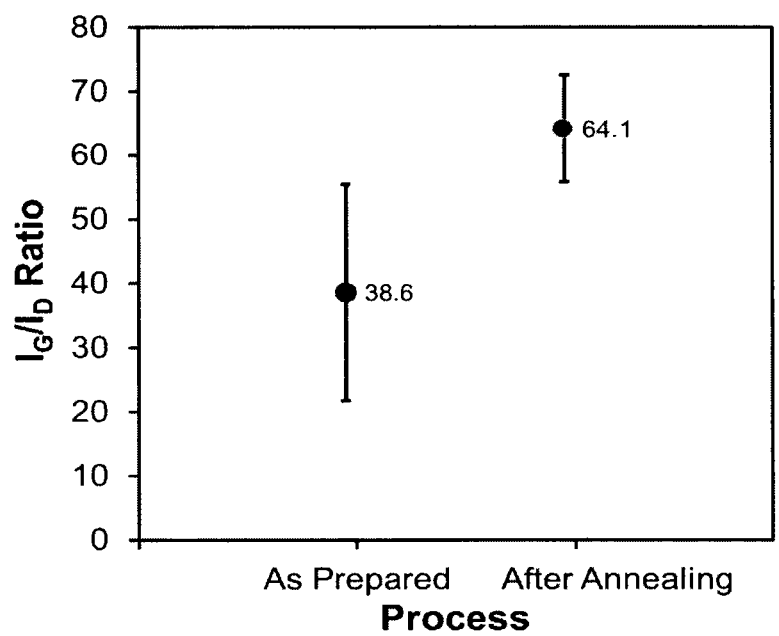

FIGS. 14A-14B illustrate (a) representative Raman microscopy spectra for samples before and after the annealing process. When the spectra are normalized to the G-band at 1590 cm$^{-1}$, the $I_G/I_D$ ratio for peak area increased from about 1.4 to 4.5, indicating a significant reduction in the level of defects on the SWNTs, (b) $I_G/I_D$ ratios obtained for multiple samples indicated a consistent decrease in the density of defects on the SWNT networks.

Figure 15:
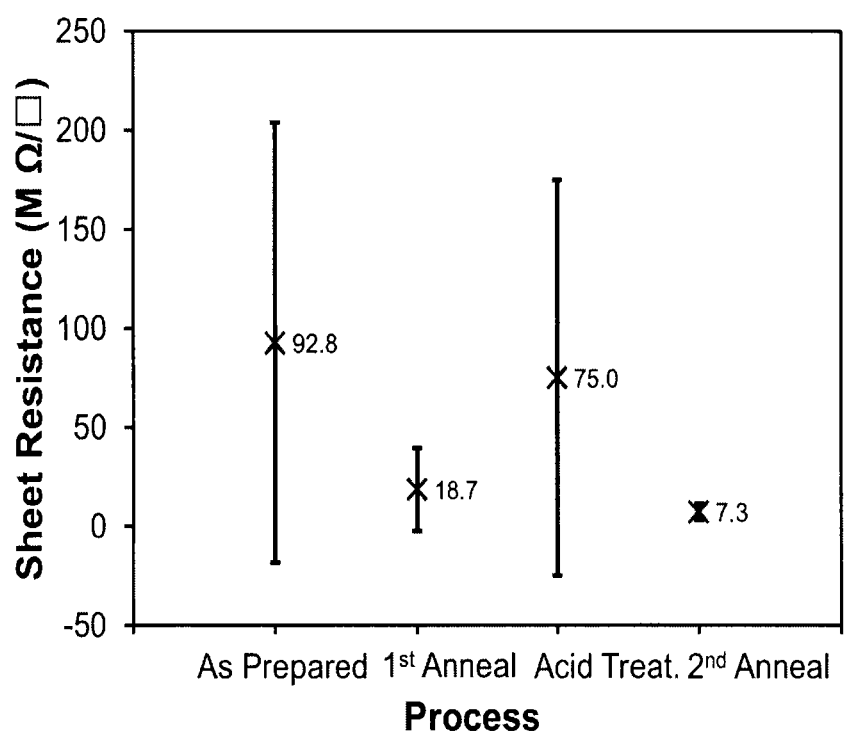

FIG. 15 illustrates each low-temperature anneal greatly decreased R. However, much of the post-anneal decrease in R was reversed upon a brief immersion of the samples in about 0.1 M HNO$_3$. However, a subsequent anneal resulted in a minimum value for R.

Figure 16:
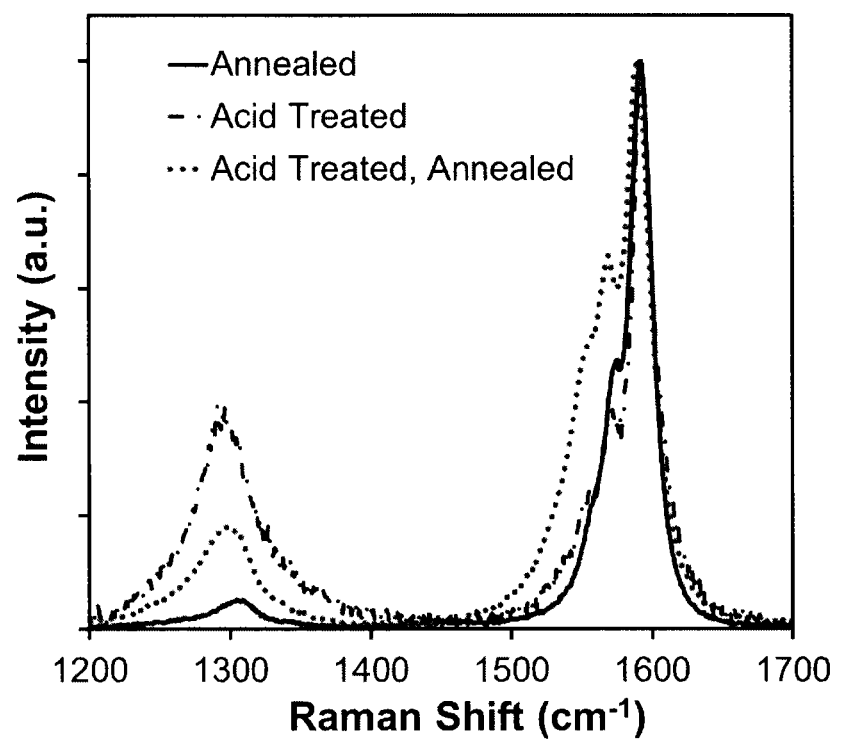

FIG. 16 illustrates representative Raman spectra (normalized to the G-band) for samples after various treatments. The initial $I_G/I_D$ ratio of about 10.1 decreased to about 1.4 after the acid treatment, and increased to about 4.2 after the final anneal. This indicates that while the low-temperature annealing process partially reversed the damage incurred by the acid treatment, a significant defect density remained.

FIGS. 17A-17D illustrate electrochemical samples comprised of (a) Ti/TiO$_x$, TiO$_x$/silane, or TiO$_x$/silane/SWNT samples of equal surface area; (b) representative cyclic voltammograms of the three surfaces showed enhanced reductive currents for the TiO$_x$/silane/SWNT surfaces, relative to the TiO$_x$/silane samples, indicating that the SWNTs facilitated the reduction of Cu; (c) i vs. t traces obtained at a constant potential of about 0.10 V vs. Ag/AgCl, for a total of about 16.7 mC of charge, displayed a sigmoidal shape for the TiO$_x$/silane/SWNT samples, indicative of enhanced instantaneous and progressive nucleation processes; (d) Raman microscopy of revealed that the Cu species varied with the nanoparticle size.

Figure 18:
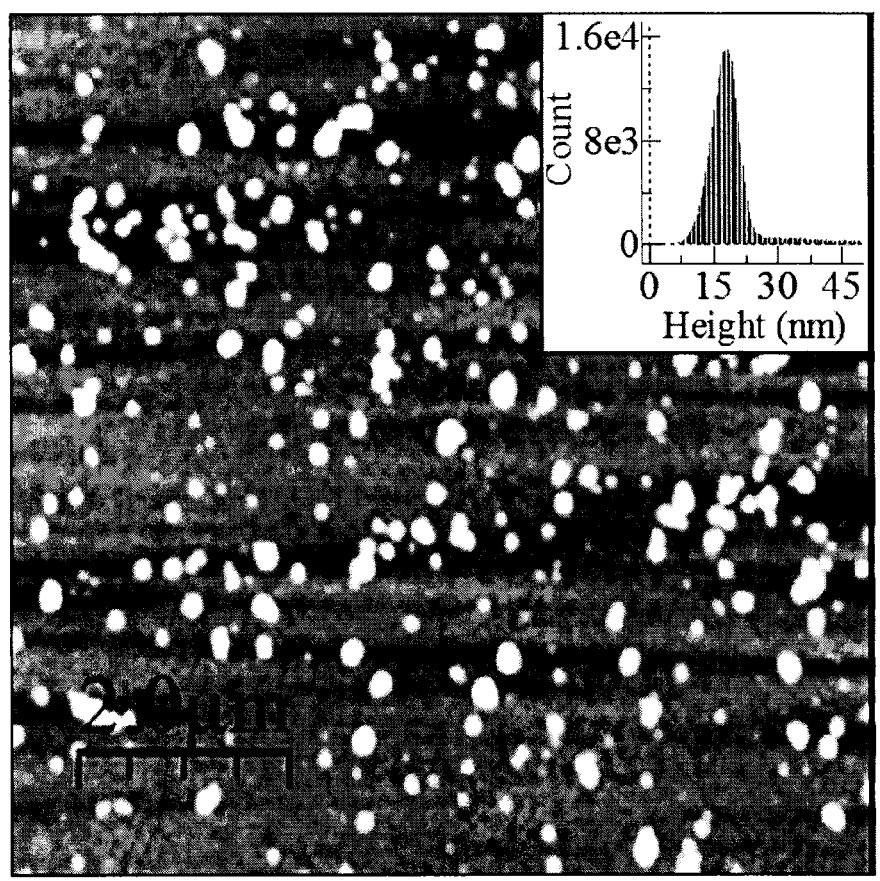

FIG. 18 illustrates representative AFM micrograph (8×8 µm) showing nanoparticle growth on the Ti/TiO$_x$ surface after deposition at about 0.10 V for a charge of about 16.7 mC. Each nanoparticle reveals the location of a conductive pinhole (low valence Ti oxide, or conductive grain boundary) through the dielectric TiO$_2$ surface.

Figure 19:
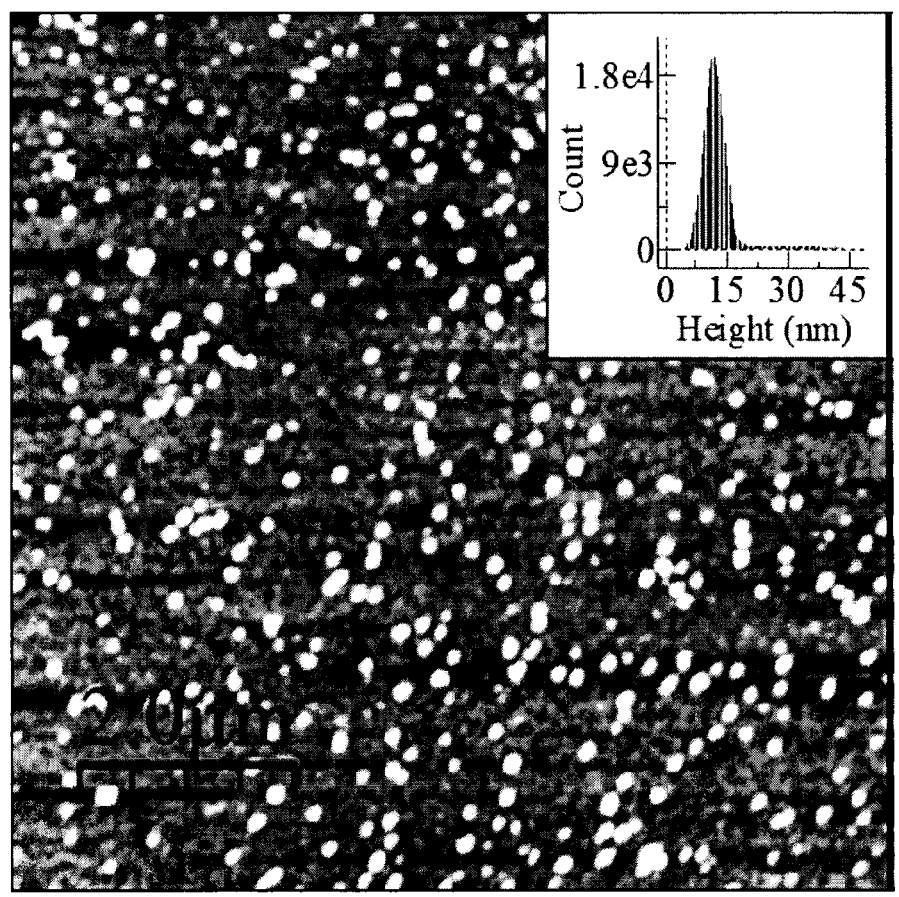

FIG. 19 illustrates representative AFM image (8×8 µm) of the TiO$_x$/silane samples showing how the addition of a silane monolayer resulted in smaller and more closely clustered nanoparticles than those observed on the Ti/TiO$_x$ surface.

Figure 20:
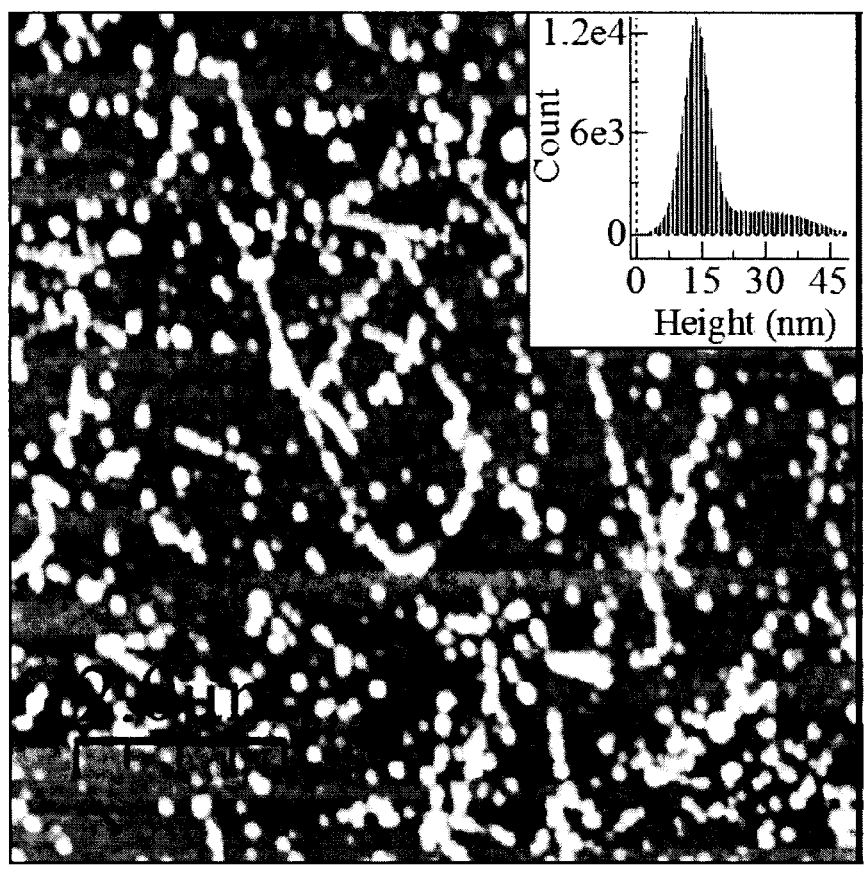

FIG. 20 illustrates a representative AFM image (8×8 µm) of a TiO$_x$/silane/SWNT sample which shows that the deposition of a low density network of SWNTs provided nucleation points for Cu$_2$O along the conductive sidewalls of the nanotubes, as observed from the greatly increased density of nanoparticles observed. This presents a unique opportunity to decrease the interfacial R at SWNT/metal electrode interfaces.

Figure 21A:
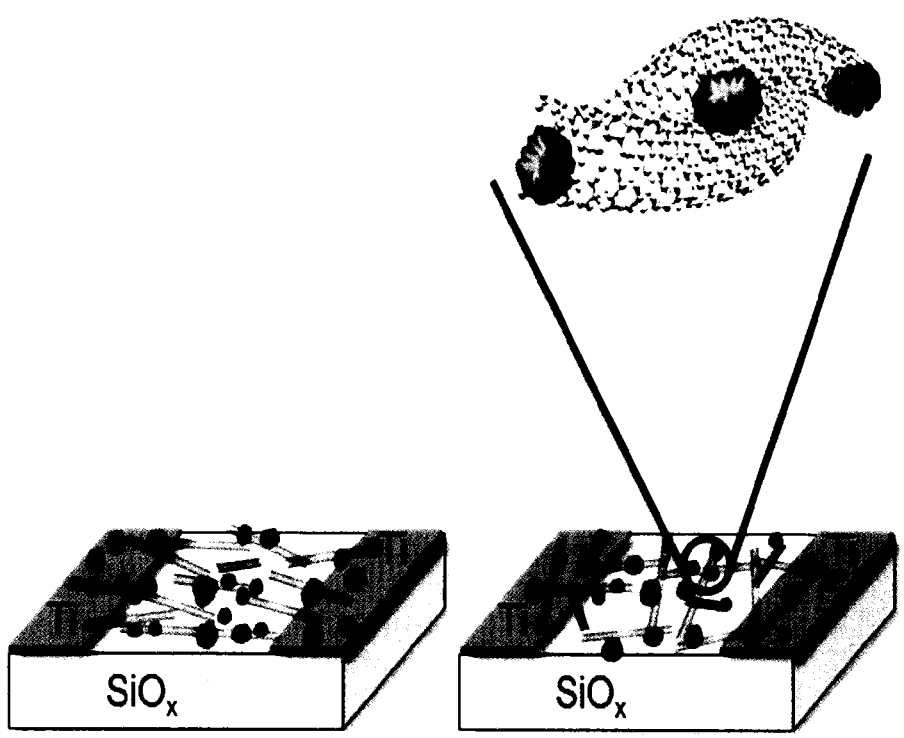
Figure 21B:
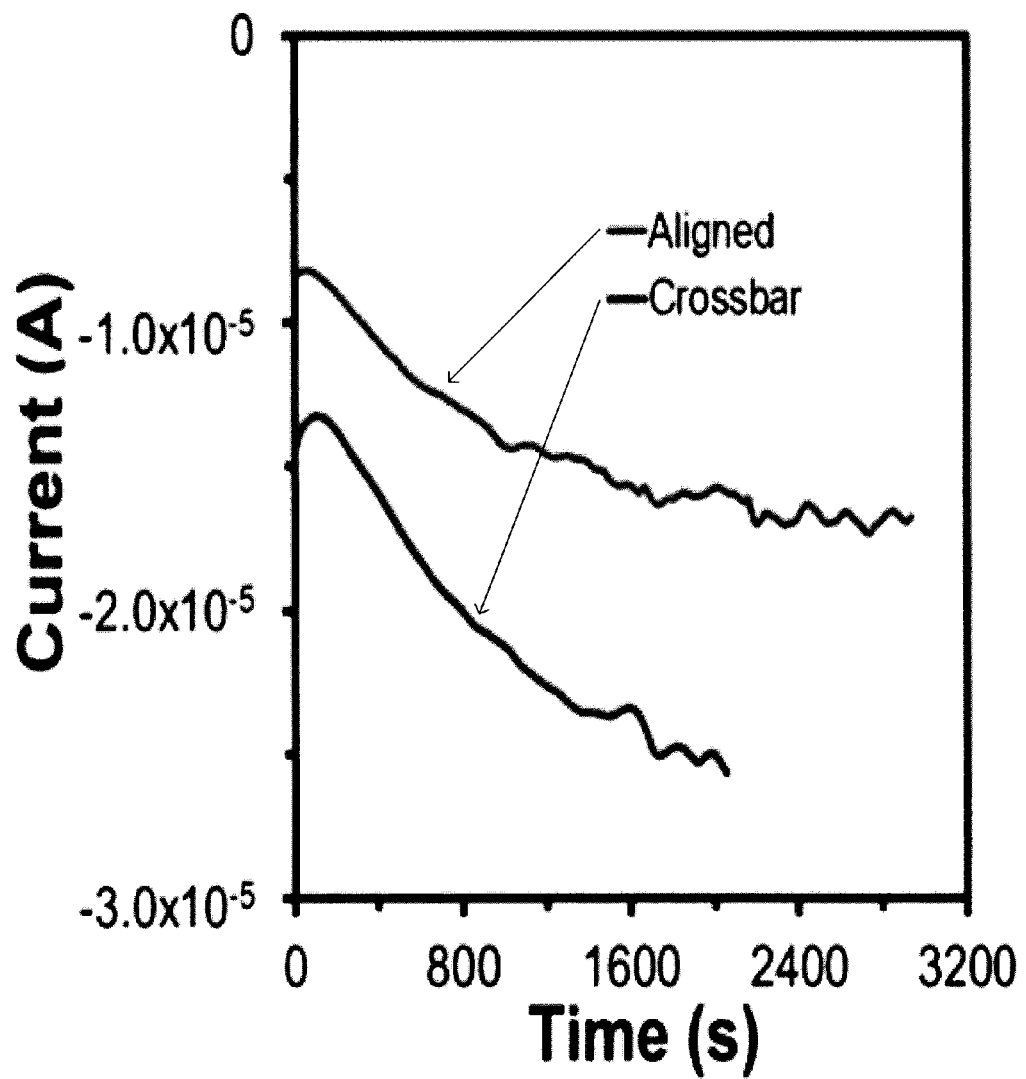

FIGS. 21A-21B illustrate (a) the effect of Cu nanoparticle deposition on the two terminal R of aligned (left), and crossbar (right) networks (schematic, not drawn to scale); (b) representative i vs. t curves for the two types of networks showed that when the charge allowed to pass was limited to about 16.7 mC, the higher current densities for the crossbar networks caused them to achieve that value at significantly shorter times.

Figure 22A:
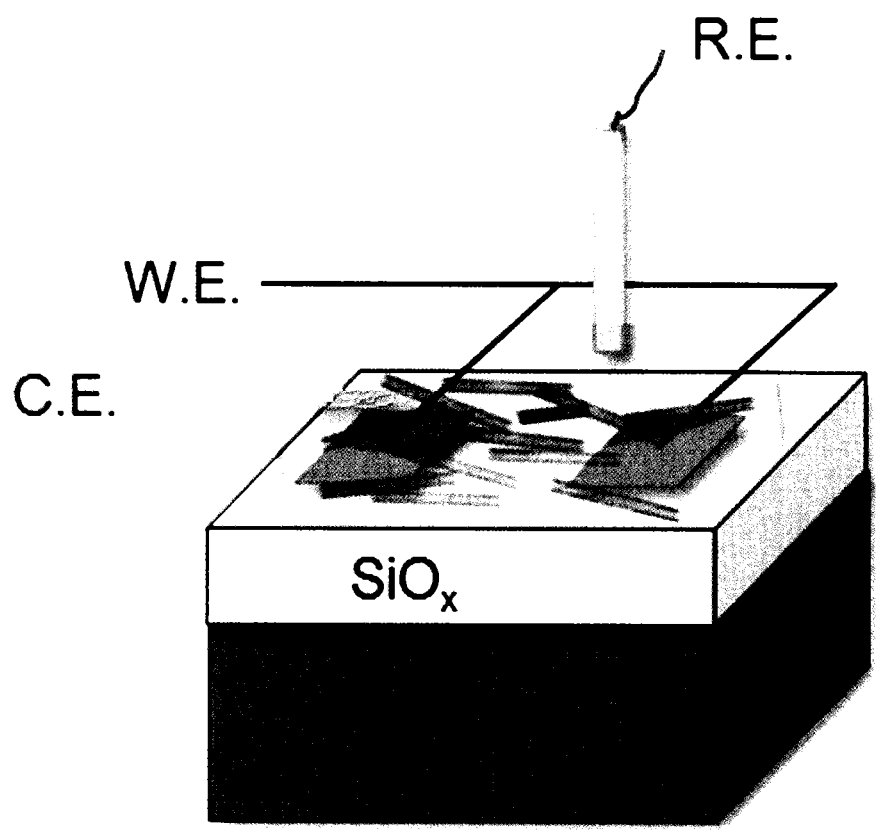
Figure 22B:
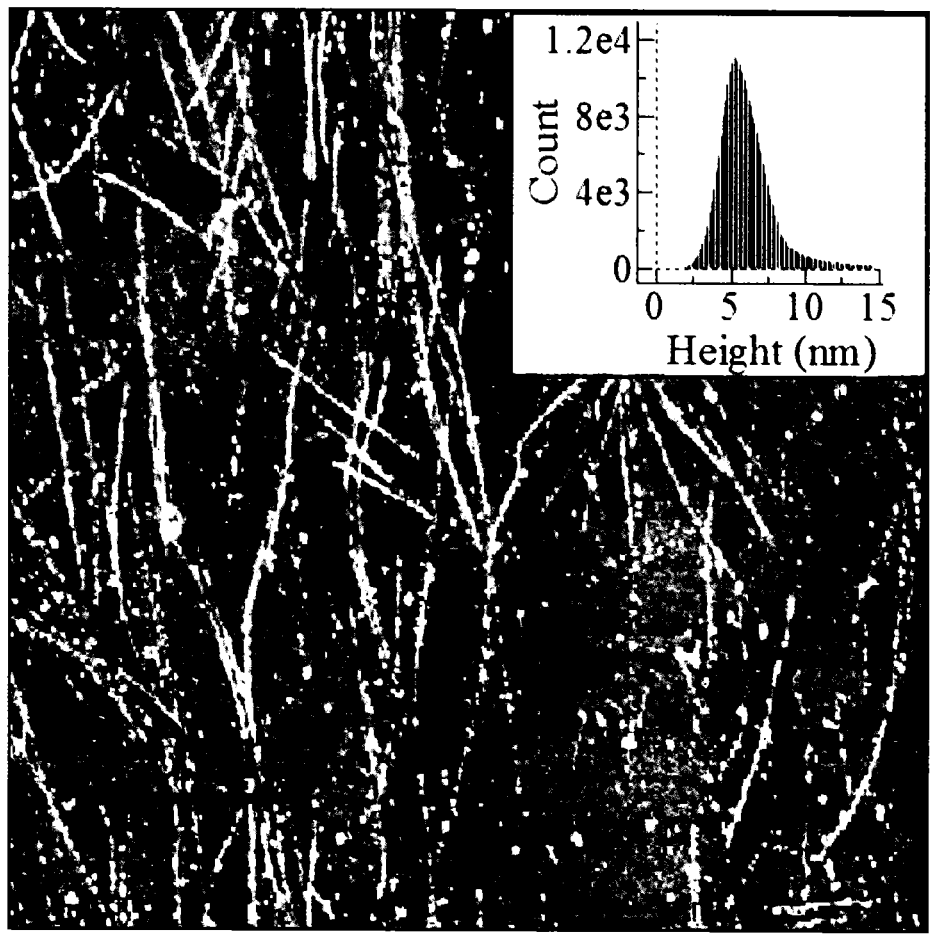

FIGS. 22A-22B illustrate (a) the source/drain electrode pair, and the SWNT network between, served as the working electrode during the electrodeposition of various amounts of Cu$_2$O nanoparticles at about 0.10 V vs. Ag/AgCl. The charge was used to tune the amount of metallization that occurred; (b) sub-10 nm sized Cu$_2$O nanoparticles were consistently observed on the SWNTs that bridged the source/drain channel between the Ti/TiO$_x$ electrodes.

Figure 23A:
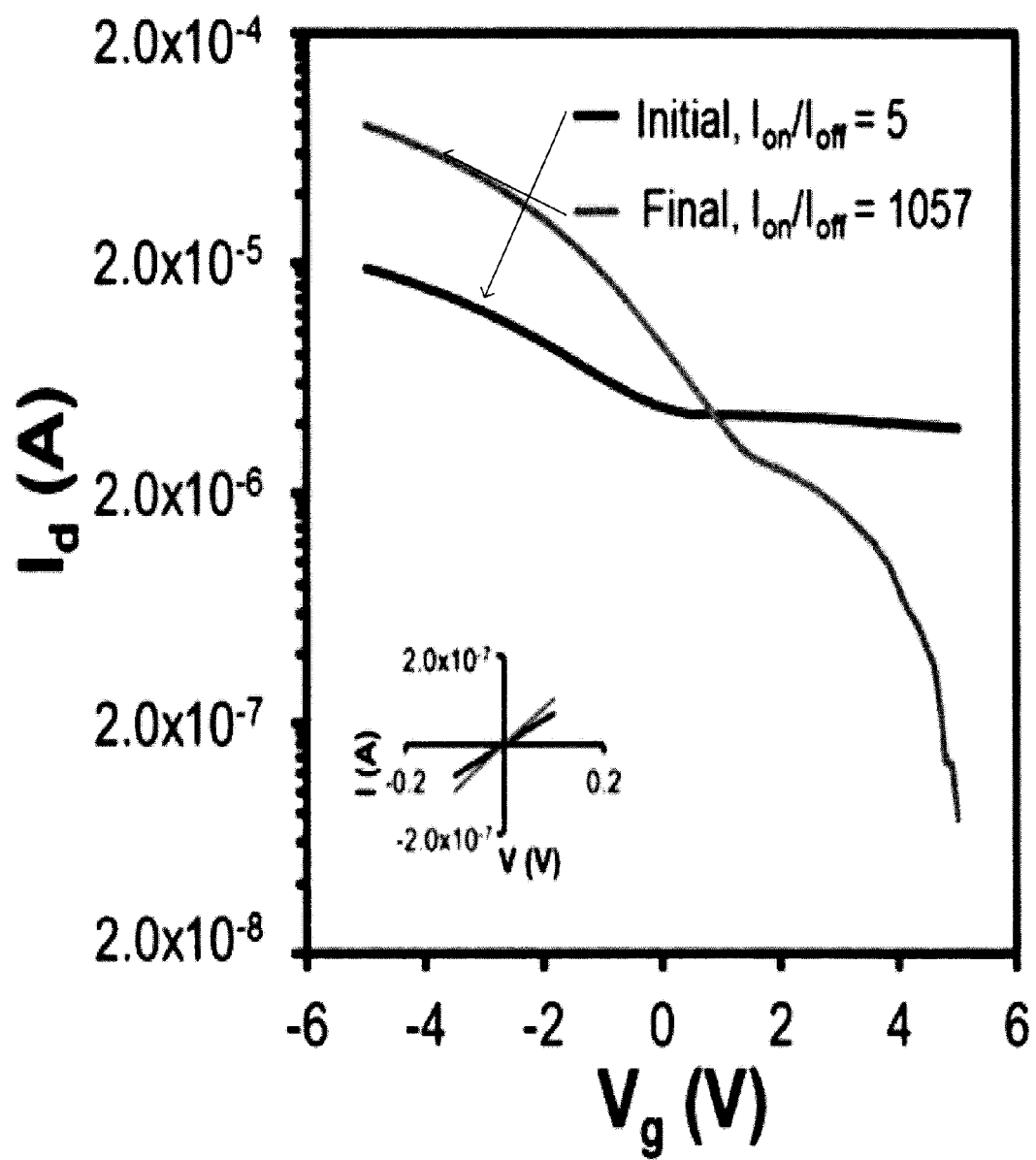
Figure 23B:
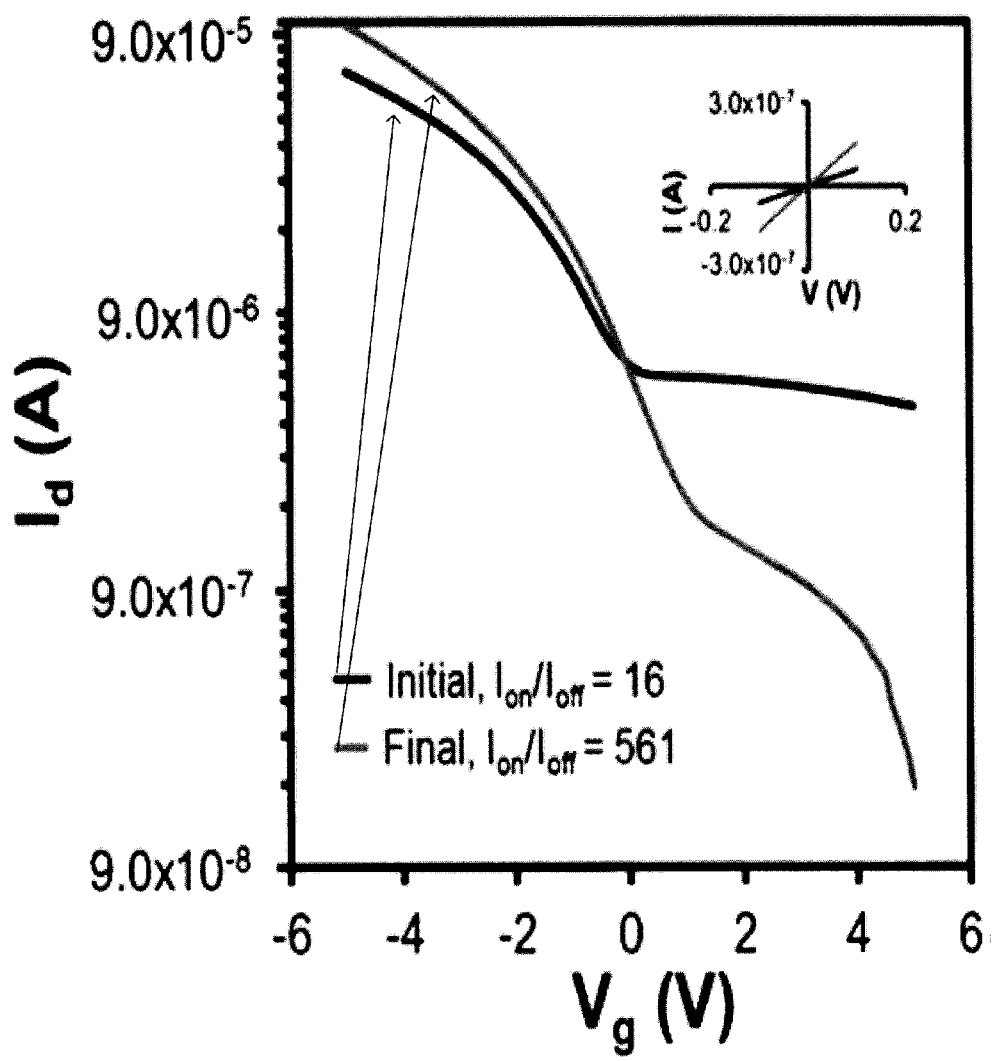

FIGS. 23A-23B illustrate representative log plots showing the dependence of the change in $I_{on}/I_{off}$ on the alignment of SWNTs comprising the network revealed that (a) partially aligned SWNTs allowed for reduced R and greater improvements in $I_{on}/I_{off}$ than (b) orthogonally oriented SWNTs, as the increase in $I_{on}/I_{off}$ observed was about 211- and 35-fold, respectively. Insets: two-terminal i vs, V curves obtained in the range of about ±0.10 V showed that a greater reduction in R was achieved for "crossbar" networks.

DETAILED DESCRIPTION

Before the present disclosure is described in greater detail, it is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

Where a range of values is provided, it is understood that each intervening value, to the tenth of the unit of the lower limit (unless the context clearly dictates otherwise), between the upper and lower limit of that range, and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

The following examples are put forth so as to provide those of ordinary skill in the art with a complete disclosure and description of how to perform the methods and use the compositions and compounds disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

It must be noted that, as used in the specification and the appended claims, the singular forms "a," "an," and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion:

In accordance with the purpose(s) of the present disclosure, as embodied and broadly described herein, embodiments of the present disclosure, in one aspect, relate to methods for reducing electrical resistance in single-walled carbon nanotube networks.

The development of scalable methods for incorporating SWNTs into a wide variety of structural and electronic materials is strongly dependent on liquid processing techniques for purifying and separating nanotubes without damaging their enhanced physical attributes. Two challenge areas with regard to forming suspensions of unbundled high aspect ratio SWNTs include removing residual catalyst nanoparticles and amorphous C without damaging the SWNTs, and forming suspensions of unbundled, high-aspect ratio SWNTs while maintaining control over the concentration and average length of the solvated nanotubes.

SWNTs have extraordinary physical and chemical properties that are expected to transform numerous fields in the electronics industry. For use in electronic materials, however, a major barrier must be addressed: the reduction of their high sheet resistance (R). Solving this issue will have a transformative effect on many contemporary and emerging technologies, such as photovoltaics, flexible displays, electromagnetic interference reduction, and electrochromic glass.

The magnitude of R, and by relation the efficiency of a nanotube network, is strongly affected by the density of defects on the nanotubes, the attributes of the junctions between SWNTs, as well as metal/SWNT contacts, residual adsorbates, and the magnitude of the Schottky barrier at the metal/SWNT interface. Understanding and optimizing all of these properties are of importance to improving the performance of electronic device structures that take advantage of the ability of SWNT networks to be used for either metallic interconnects and/or semiconductor channels, based on the density of the network.

The present disclosure includes methods for the reduction of sheet resistance in 2D networks of SWNTs via the combined use of low temperature annealing and the formation of molecular anchors on the nanotubes. The methods of the present disclosure are effective for obtaining a significant reduction in resistance, and greater reproducibility in thin-film properties. Importantly, these effects are obtained without disturbing the organization of the SWNTs in the network, so that bundling of the SWNTs will not occur.

Embodiments of the present disclosure include a method of purifying and depositing SWNT networks comprising preparing a substrate, preparing a suspension of SWNTs, and depositing the SWNT suspension, where the deposition method provides control over the density and alignment of SWNTs and prevents (e.g., substantially prevents (e.g., not only 100% prevention)) the SWNTs from forming bundles during deposition. The suspension processing method of the present disclosure purifies SWNT soot and separates long SWNTs from shorter ones, all without using oxidizing methods that damage the SWNTs and increase their resistance. In addition, depositing the SWNT suspension via a method that provides control over the density and alignment of SWNTs, while preventing them from forming bundles provides much better performance of the SWNT networks in field-effect transistors.

In an embodiment of the present disclosure, the substrate is selected from: Au, $Si/SiO_2$, Si/SiOx (e.g., x=1, x=2), TiOx (e.g., x=1, x=2), a native oxide metal, a mica, a polymer, and a combination thereof. In another embodiment, preparing the substrate comprises depositing at least one electrode on the surface of the substrate, where the at least one electrode is selected from: Ti, Al, Ta, Ni, Fe, and a combination thereof. In an embodiment, the electrodes are deposited before or after the network formation. The suspension deposition method of the present disclosure is compatible with any substrate or surface that is terminated by functional groups that serves as an adhesive layer for SWNTs to stick to (i.e., any metal with a native oxide will work to adhere the SWNTs via a silane or phosphate, and other metals will work with thiols).

Embodiments of the present disclosure include a method further comprising modifying the substrate with a self-assembled monolayer, where the monolayer serves as an adhesion layer for the SWNTs. In an embodiment, the monolayer is selected from: a silane, a thiol, a phosphate, a sulfide, a disulfide, a phosphonate, and a combination thereof (e.g., thiols on Au, phosphates on glass or metal oxide surfaces). The monolayer allows the use of surfaces that SWNTs would not normally stick to.

Embodiments of the present disclosure include using electrodeposition to form conductive shunts through the self-assembled monolayer and the metal oxide adlayers.

Embodiments of the present disclosure include a method where preparing the suspension of SWNTs comprises dispersing unmodified SWNT soot in a solution of sodium dodecyl sulfate (SDS) via probe ultrasonication to form a suspension, centrifuging the suspension for about 45 to about 90 minutes at about 18,000 g, removing at least a portion of the supernatant, and repeating the centrifugation at least one time. In an embodiment, purifying the SWNTS without oxidizing acids or vapors produces high aspect ratio SWNTs, where the high aspect ratio SWNTs comprise low defects and exhibit decreased electrical resistance (R). The purification and enrichment process of the present disclosure works to purify SWNT that has a nominal purity of down to 40 to 60% SWNTs. Purifying without oxidizing acids or vapors allows the product to be high aspect ratio SWNTs (oxidation shortens them) that conduct extremely well since they have low defects and longer tubes allow for fewer inter-SWNT junctions that increase resistance.

Embodiments of the present disclosure include a method where the deposition comprises laminar flow deposition (LFD). Embodiments of the present disclosure include a method where the LFD comprises wetting the substrate with the SWNT suspension on a sample surface, drying the sample in a stream of $N_2$ gas at a pressure of about 60 psi, rinsing the sample with nanopure water, and drying the sample in a stream of $N_2$ gas. In an embodiment, the method further comprises spinning the substrate using a spin-coater to produce SWNT networks comprising randomly oriented SWNTs. In another embodiment, the SWNT network is selected from: highly aligned SWNTs, randomly oriented SWNTs, and a combination thereof. Spinning the substrate at a high rate using a spin-coater works to deposit low densities of unbundled SWNTs. The spin cast SWNT networks have randomly oriented SWNTs, while other methods of the present disclosure provide highly aligned or randomly oriented SWNTs.

In an embodiment of the present disclosure, drying must occur quickly after wetting of the surface with the SWNT suspension to avoid bundle formation and get better semiconductive performance in field-effect transistors. The ability to tune the density and electronic properties of SWNT networks during formation is central to taking advantage of their enhanced electrical properties.

Embodiments of the present disclosure include a method further comprising annealing the coated substrate at about 100 to about 300° C. (e.g., about 300° C.). In an embodiment, the method further comprises treating the coated substrate with a mild acid selected from: dilute nitric acid, dilute nitrous acid, and a combination thereof.

Embodiments of the present disclosure include a method of reducing electrical resistance in SWNT networks, comprising selective electrodeposition of conductive nanoparticles on SWNTs in a network, where the network is bridging metal electrodes, allowing deposition on the defect sites and sidewalls of the conductive SWNTs, while avoiding metal deposition around them, where the semiconductive character of the SWNTs is preserved and electrical resistance is reduced. In an embodiment, the extent to which resistance is reduced is controlled by control of the amount of electrochemical charge, which dictates the size of the conductive nanoparticles. In another embodiment, the extent to which resistance is reduced is controlled by changing the degree of alignment in the SWNTs that comprise the network.

Embodiments of the present disclosure include methods where electrodeposition of nanoparticles occurred only at the defect sites on SWNTs. This purification technique allows the low number of the defect sites formed along the SWNTs to allow the nanoparticles to form and achieve conservation of the semiconductive properties of the SWNT network while reducing resistance through it.

Embodiments of the present disclosure include a semiconducting single-walled carbon nanotube network where the on-off current ratio is increased by reducing resistance in the network. In an embodiment, the network is used in the formation of photovoltaic material.

The retention of semiconducting properties while decreasing resistance has broad impact on electronic materials: better on/off leads to more reproducible performance, lower resistance leads to energy conservation, longer operation of battery operated devices like phones and computers, and these networks are transparent since they are comprised of low densities of nanotubes, so they have applications in displays and flexible displays when deposited on polymers.

The purification without damaging the SWNTs is central to reducing their electrical resistance. Also central is the enrichment in high aspect ratio SWNTs—the fewer inter-SWNT junctions in a network, the lower the resistance. Being able to align the SWNTs and control their density during network formation allows one to optimize the resistance by controlling the number of inter-SWNT junctions.

EXAMPLES

Example 1

Aqueous batch processing methods for the concurrent purification of single-walled carbon nanotube (SWNT) soot and enrichment in high aspect ratio nanotubes are essential to their use in a wide variety of electronic, structural, and mechanical applications. The present disclosure includes a new route to the bulk purification and enrichment of unbundled SWNTs having average lengths in excess of about 2 μm. Iterative centrifugation cycles at low centripetal force not only removed amorphous C and catalyst nanoparticles, but also allowed the enhanced buoyancy of surfactant encapsulated, unbundled, high aspect ratio SWNTs to be used to isolate them in the supernatant. UV-Vis-NIR and Raman spectroscopy were used to verify the removal of residual impurities from as-produced (AP-grade) arc discharge soot and the simultaneous enrichment in unbundled, undamaged, high aspect ratio SWNTs. The laminar flow deposition process (LFD) used to form 2-D networks of SWNTs prevents bundle formation during network growth. Additionally, it further enhances the quality of deposits by taking advantage of the inverse relationship between the translational diffusion coefficient and length for suspended nanoparticles. This resulted in preferential deposition of pristine, unbundled, high aspect ratio SWNTs over residual impurities, as observed by Raman spectroscopy and atomic force microscopy (AFM).

Introduction

Bulk processing methods for removing impurities and unbundling SWNTs, without greatly increasing sidewall defects, is crucial to obtaining a fundamental understanding of the properties of individual SWNTs. Further, the fundamental electrical, optical, and electrochemical behavior of SWNT-based composites can be more reproducibly measured and understood if the suspensions from which they are deposited are well characterized.

Therefore, the development of scalable methods for incorporating SWNTs into a wide variety of structural and electron materials is strongly dependent on the creation of new liquid-processing techniques for purifying and separating nanotubes without damaging their enhanced physical attributes. However, significant issues remain with regard to forming suspensions of unbundled high aspect ratio SWNTs. These issues can be reduced to two broad challenge areas: 1) removing residual catalyst nanoparticles and amorphous C without damaging the SWNTs, and 2) forming suspensions of unbundled, high-aspect ratio SWNTs while maintaining control over the concentration and average length of the solvated nanotubes.

Addressing the first challenge area, the ability to form bulk quantities of suspensions composed of unbundled SWNTs having known average lengths, is particularly important for forming and characterizing 2-D SWNT networks that harness the enhanced electrical and physical properties of nanotubes.[2-4] In fact, the formation of SWNT-network based transistors,[5-7] sensors[8-10] and field-emission sources are being investigated.[11,12] The electron mobility and on/off ratio of such materials is greatly hampered by residual impurities. Therefore, non-oxidizing purification methods will play a central role in SWNT-based electronics.

Methods of dealing with the second challenge area, forming suspensions of unbundled, high aspect ratio SWNTs, are also important to optimizing the performance of SWNT networks in electronic device structures. The electron mobility of SWNT networks decreases inversely with the number of SWNT-SWNT tunnel junctions. Therefore, maximizing the average length of SWNTs in a network will decrease the number of inter-SWNT tunnel junctions that must be bridged. This will allow the low resistance and near ballistic electronic transport observed for unbundled SWNTs to be exploited.[13-15]

The charge carrier mobility for SWNT networks[16-18] has been reported to exceed two commonly used systems, amorphous Si[19-21] and organic semiconductors.[22,23] A recent study has even demonstrated electron mobility approaching those observed for p-type crystalline Si.[24] This performance advantage, coupled with the mechanical flexibility and transparent nature of SWNT networks,[25-27] as well as their ability to operate at low voltages, causes great interest for their use in portable electronic devices and displays. Furthermore, the tensile strength and heat conductance are greatly improved in polymer composites that contain cross-linked high aspect ratio SWNTs.[28,29] Therefore, bulk-processing methods for forming suspensions enriched in unbundled, undamaged, high aspect ratio SWNTs plays a central role in the development of a wide variety of electronic and structural materials.

Understanding bulk solution processing methods is important to the deposition of SWNT networks on heat-sensitive substrates used in flexible electronic materials, as direct growth of nanotubes (which requires temperatures in excess of 700° C.) is not possible. For these reasons, the recent literature is replete with reports of suspension purification and processing methods, which often begin with oxidative purification treatments.[30-33] Yet, oxidation reduces the electrical conductivity of SWNTs through the introduction of sidewall defects.[8,9] Following oxidation, other suspension processing methods include density gradient ultracentrifugation (DGU),[34-36,37] and polymer wrapping.[38] While DGU has been shown to be useful for separating SWNTs based on diameter and type of conductivity, its major disadvantage is that it yields nanotubes with lengths only up to a few hundred nm, as it employs centripetal forces in excess of 100,000 G. Additionally, DGU and polymer wrapping involve the use of reagents that are difficult to remove, a requirement for electronic applications. In particular, DGU involves the use of several surfactants, as well as a density gradient medium, typically iodixanol. This compound binds strongly to SWNTs and requires a separate dialysis treatment for removal.

Therefore, while effective at reducing residual metal catalysts, the concurrent oxidation of SWNTs and the formation of highly carboxylated carbonaceous impurities which are difficult to remove are significant concerns.[33] The present disclosure demonstrates that purification through iterative low G centrifugation cycles is effective at removing residual metal catalyst and carboxylated carbonaceous impurities, without increasing the density of defects observed for SWNTs.[39-41] The present disclosure describes how this benign purification method can be used to produces stable suspensions of SWNTs having lengths in excess of about 2 μm.

The present disclosure provides insight into the separation of unbundled, surfactant encapsulated, high-aspect ratio SWNTs from impurities under relatively low centripetal force (18,000 G), and demonstrates a great improvement in the quality of deposits that can be formed. Repeated centrifugation/decantation is shown to enrich suspensions in unbundled high aspect ratio SWNTs. The hydrophobic nature of SWNTs necessitates the use of an emulsifier to support SWNT dispersion. Various species, including surfactants, DNA, polymers, and lipids, can be used to this effect. Surfactants are commonly used if the ultimate goal involves formation of electronic materials, since they can be more easily removed after the nanotubes are deposited. Of the various surfactants available, sodium dodecyl sulfate (SDS) was chosen because it has the lowest binding energy with SWNTs of the average diameter (about 1.55±0.1 nm) observed for the arc discharge soot used in this disclosure.[42] This is an important consideration, as the ultimate goal is to remove the surfactant after deposition of the SWNTs, in order to improve electronic performance and reproducibility.[43]

Although many commonly reported purification methods have the potential to address either of the two challenge areas listed earlier, the approach described in the present disclosure concurrently addresses both challenges by achieving 1) purification of SWNT soot without damaging oxidative treatments, and 2) the formation of stable suspensions of unbundled, high aspect ratio SWNTs having controlled concentration and length. Raman spectroscopy and UV-Vis-NIR spectroscopy were used to confirm that impurities were removed by each purification cycle, while SWNTs remained suspended. Atomic force microscopy (AFM) demonstrated the effectiveness of this purification method for the formation of SWNT deposits in on Si/SiO$_x$ wafer fragments.

The laminar flow deposition method ensures that nanotube bundling does not occur during the deposition process.[45-47] It has been shown to allow great control over the density and alignment of unbundled SWNTs deposited on self-assembled monolayer-modified surfaces.[47] This deposition method is an important part of the present disclosure, as the ability of the suspension processing method to remove SWNT bundles can only be ascertained by AFM if bundle formation is prohibited during the deposition process. The present disclosure's deposition method is also an important new tool in SWNT network formation, as other common deposition methods, like layer-by-layer,[48] fluidic assembly,[49] and dip-coating[50] result in bundles of SWNTs.

Experimental Details

Formation and Purification of SWNT Suspensions.

Figure 1A:
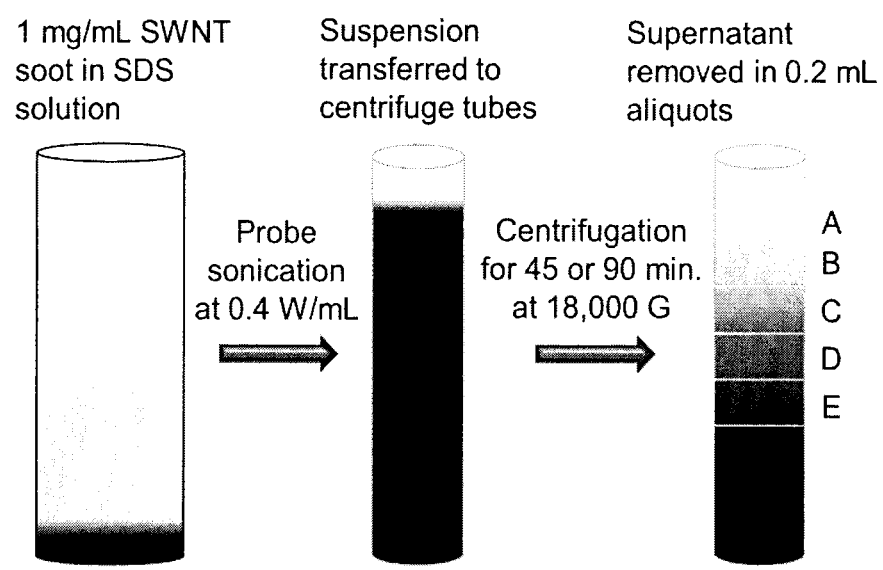
FIGS. 1A-1C illustrate a schematic for two experimental approaches employed (not to scale) by the present disclosure. Probe sonication at a power density of about 0.4 W/mL was used to form suspensions of AP-grade SWNT. Then, the suspensions were either: a) treated with centrifugation at about 18,000 G for about 45 or 90 min., followed by careful removal of the supernatant in about 0.20 mL aliquots, or; b) the upper about 50% of the supernatant was carefully removed after each of six about 45 min. centrifugation cycles; c) since the importance of shear forces is supplanted by viscous forces as the suspension thins, low densities of unbundled SWNTs are isolated and deposited via rapid evaporation, without the possibility of bundle formation. This allows the degree of SWNT bundling in the processed suspension to be assessed.

To form the suspensions, about 1 mg/mL AP grade arc discharge soot (Carbon Solutions, Inc) was dispersed in 1% SDS (J. T. Baker) solution via about 30 min. of probe ultrasonication (Fisher Model 500) at a power density of 0.4 W/mL, which imparted 21 kJ of energy to the suspension. Previous work by Vichchulada et al. has demonstrated that these conditions are optimum for the production of suspensions of unbundled SWNTs while minimizing sonication-induced damage to the SWNTs.[51] Next, SWNT suspensions were distributed into 1.5 mL centrifuge tubes and centrifuged (Beckman Microfuge) for either about 45 or 90 min. at 18,000 G, as described in FIG. 1A. After centrifugation, the supernatant was carefully removed in about 0.2 mL aliquots, labeled A, B, C, D, and E. Spectroscopic and scanning probe data was obtained for each of these aliquots.

Figure 1B:
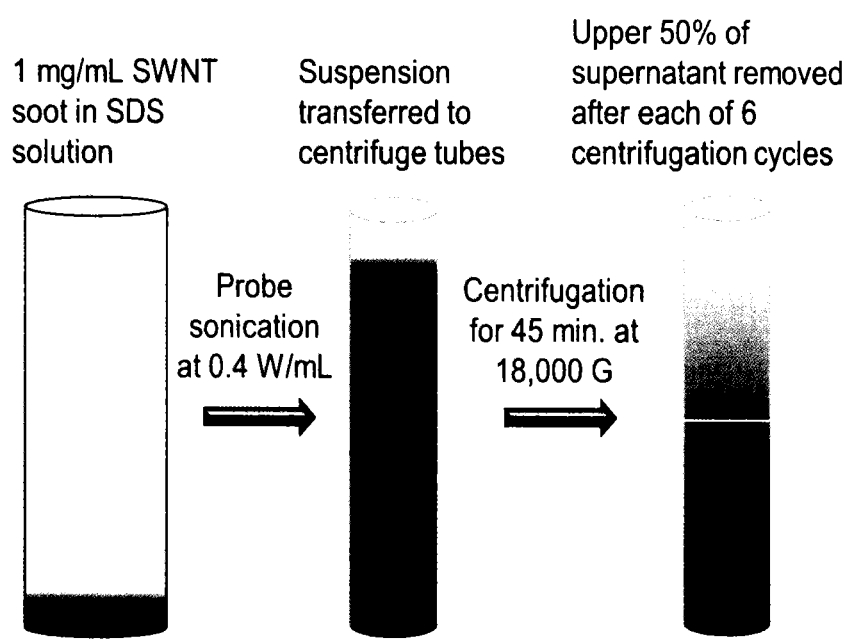

In order to determine the effect of multiple centrifugation cycles on the purity and enrichment in high aspect ratio SWNTs, the upper about 50% of the supernatant was carefully collected after each of six about 45 min. centrifugation cycles (FIG. 1B). Then, the upper fractions were placed in new centrifuge tubes, and the process was repeated. This allowed observation of the effect of iterative processing steps on the purity and average length of SWNT suspensions and deposits.

Formation of SWNT Deposits via Laminar Flow Deposition (LFD).

Si/SiO$_x$ wafers were cut into 1×1.5 cm fragments and cleaned with compressed CO$_2$. Prior to SWNT deposition, the substrates were modified with a self-assembled monolayer by an about 45 min. immersion in a solution of about 2.11 mg/mL 3-aminopropyl triethoxysilane (99%, Sigma Aldrich) in ethanol (99.5%, absolute 200 proof, ACROS). In order to ensure that only one monolayer of the silane remained, the substrates were washed with copious amounts of ethanol, and water. Then, they were dried in a stream of N$_2$ gas. Finally, they were cleaned with compressed CO$_2$, as this has been demonstrated to remove excess layers of polymerized silane.[52]

Figure 1C:
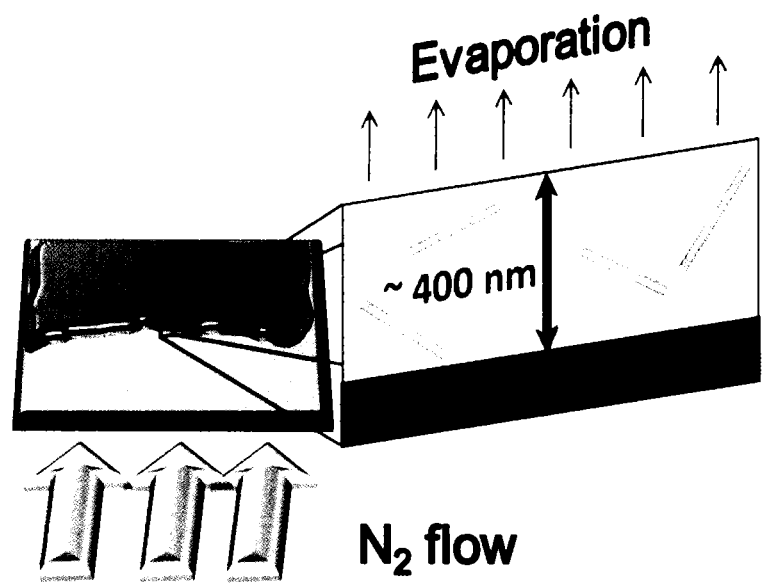

After substrate preparation, two deposition cycles, each using about 90 μL of SWNT suspension, were used to form the low-density SWNT deposits that would be used for AFM analysis. Each deposition cycle comprised wetting the silane coated Si/SiO$_x$ wafer with the SWNT suspension, followed by quick drying in a stream of N$_2$ gas at a pressure of 60 psi (FIG. 1C). The wafers were then rinsed with copious amounts of nanopure water (>18.1 MΩ) and then dried again under a stream of N$_2$ gas.

In this manner, bundle formation is prohibited during the drying process by greatly reducing the height of the suspension to a thin layer (about 400 nm in thickness) that is characterized by viscous flow, prior to nanotube deposition, as described by Zhang et. al.[45] Because the translational diffusion of these isolated SWNTs is quite low, they are deposited on the surface in low densities during a brief evaporation phase. Therefore, this deposition method facilitates the deposition of individual SWNTs, as long as they are unbundled in the processed suspension.

Characterization of SWNT Suspensions and Deposits by UV-Vis-NIR Spectroscopy, AFM, and Raman Spectroscopy.

UV-Vis-NIR spectroscopy (Cary, 5000) was performed using a quartz cell with a path length of 1 mm. An absorbance of 600 nm has been found to yield a linear relationship between SWNT concentration and absorbance.[53] This is likely due to the lower scattering efficiency of SWNTs at this wavelength and the fact that it falls between absorbance bands for semiconductive and metallic SWNTs. However, carbonaceous impurities have a maximum absorbance about 242 nm,[54] so comparison of the data obtained for these two wavelengths was used to quantitate the purity of the suspensions during processing.

AFM images were obtained via intermittent contact mode in air (Molecular Imaging, Pico Plus). Five areas of each sample were analyzed with AFM image analysis software (WSxM, v5.0)[55] to determine the effect of the separation process on the average height, and length of SWNTs, as well as the surface height and roughness. This provided information on the concentration of bundles and the degree of length separation obtained. Additionally, the change in surface height and roughness was also evaluated in order to determine the density of residual impurities.

Raman spectroscopy (Thermo Scientific, DXR SmartRaman) was performed on suspensions in a sealed capillary tube and on SWNT deposits without any further modification. A charge-coupled device (CCD) detector was used to record spectra obtained using a 532 nm diode laser excitation source. Suspensions were analyzed with a 10× objective and a source intensity of 10 mW at the sample, while for SWNT deposits, a 50× objective with 1 mW intensity at the sample was employed.

Results and Discussion

Effect of Processing Time on the Purification of SWNT Soot.

Figure 2A:
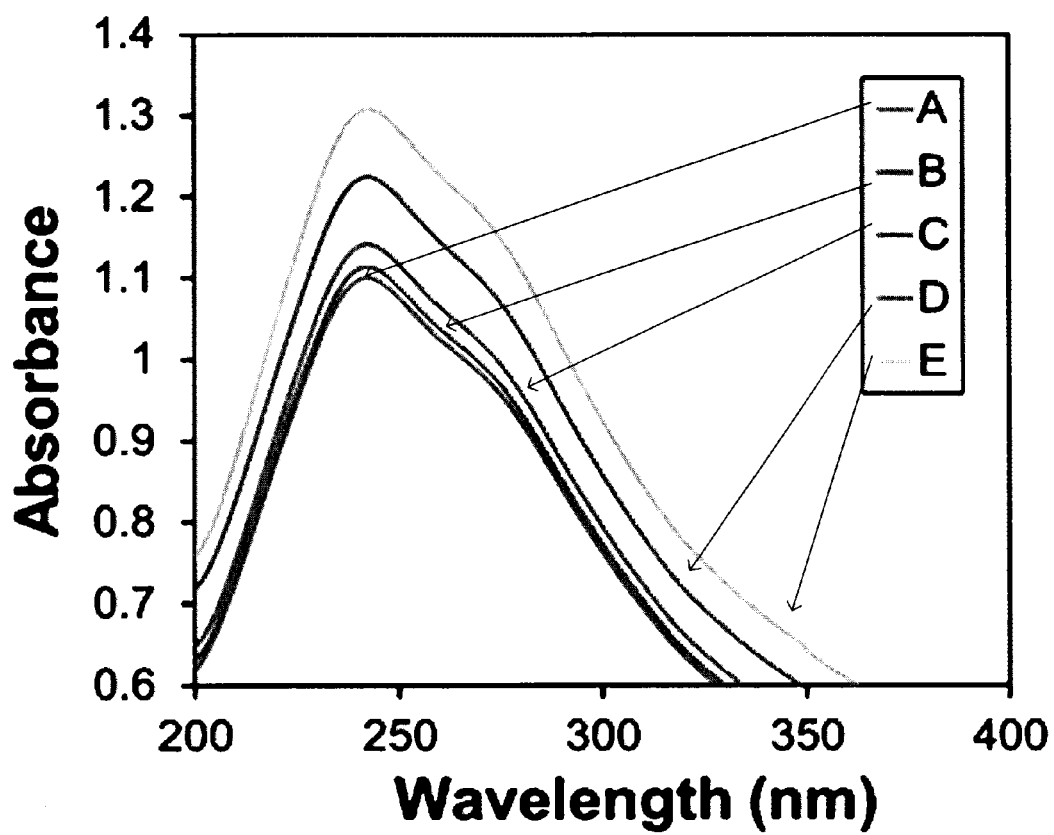
FIGS. 2A-2B are graphs that illustrate the absorbance in the UV region of the spectra for aliquots A-E increased from the top to the bottom for both processing times; a) after one about 45 min. step, the shoulder on the low energy side of the band at about 242 nm is less pronounced than; b) after processing at about 90 min.
Figure 2B:
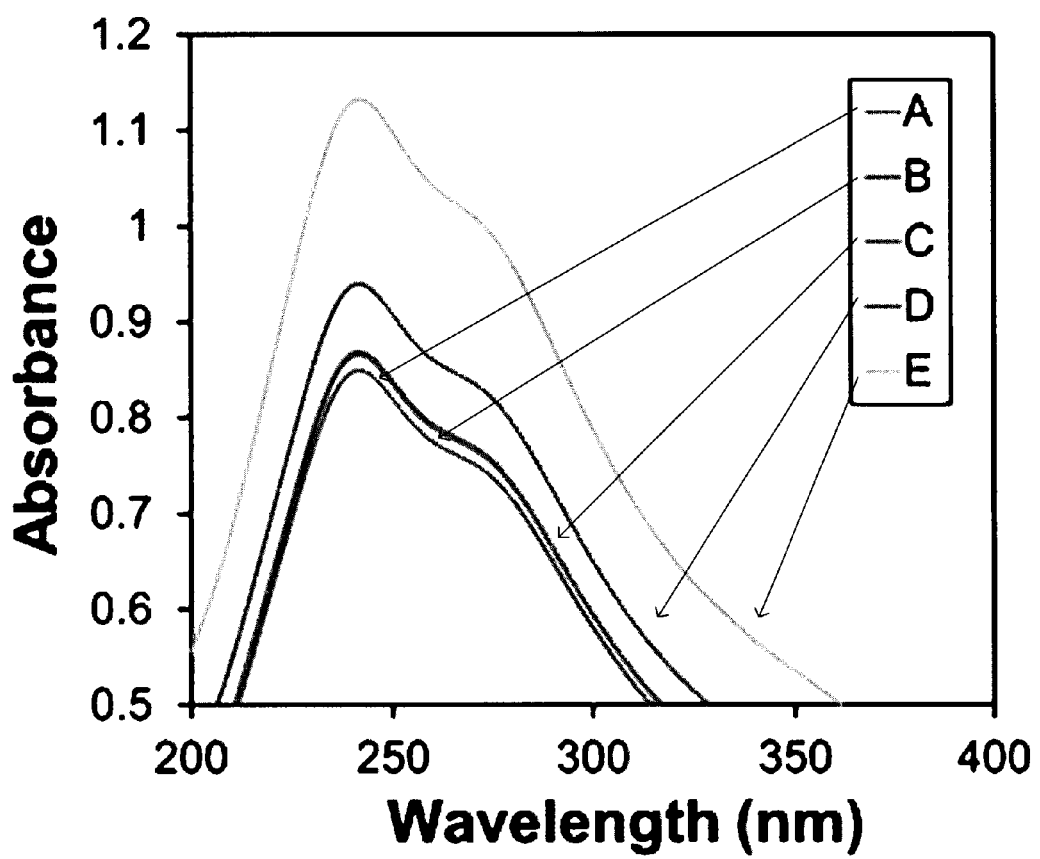

For both about 45 and 90 min. processing times, the magnitude of the UV-Vis-NIR absorbance for each suspension increased in alphabetical order with each aliquot (FIG. 2), indicating the presence of a density gradient in carbonaceous impurities. By comparison, the data for about 45 min. has a higher absorbance for every layer, relative to its counterpart in the about 90 min. data. Additionally, aliquots A for both samples had the lowest peak absorbance at about 242 nm, with values of about 1.11 and 0.86 for about 45 and 90 min., respectively. Aliquots B and C were relatively close to A in magnitude, but there is a significant increase in absorbance for D and E. As each aliquot represented about 0.2 mL of suspension, this indicates that after both processing procedures, the upper 50% of the supernatant was significantly improved in purity.

Aliquot E consistently had the greatest absorbance for all samples, achieving a peak absorbance of about 1.31 and 1.13 for about 45 and 90 min., respectively. This greater absorbance indicates that about 90 min. is more effective at isolating the amorphous carboxylated C impurities and SWNT bundles in the lower half of the centrifuge tube. Therefore, a large portion of the impurities in the SWNT soot was sequestered in the lower about 50% of the sample, culminating in a pellet at the bottom. The shoulder at about 275 nm, on the low-energy side of the peak, becomes more pronounced at longer centrifugation times. This is due to the high extinction coefficient for amorphous C impurities.[56,57]

Figure 3A:
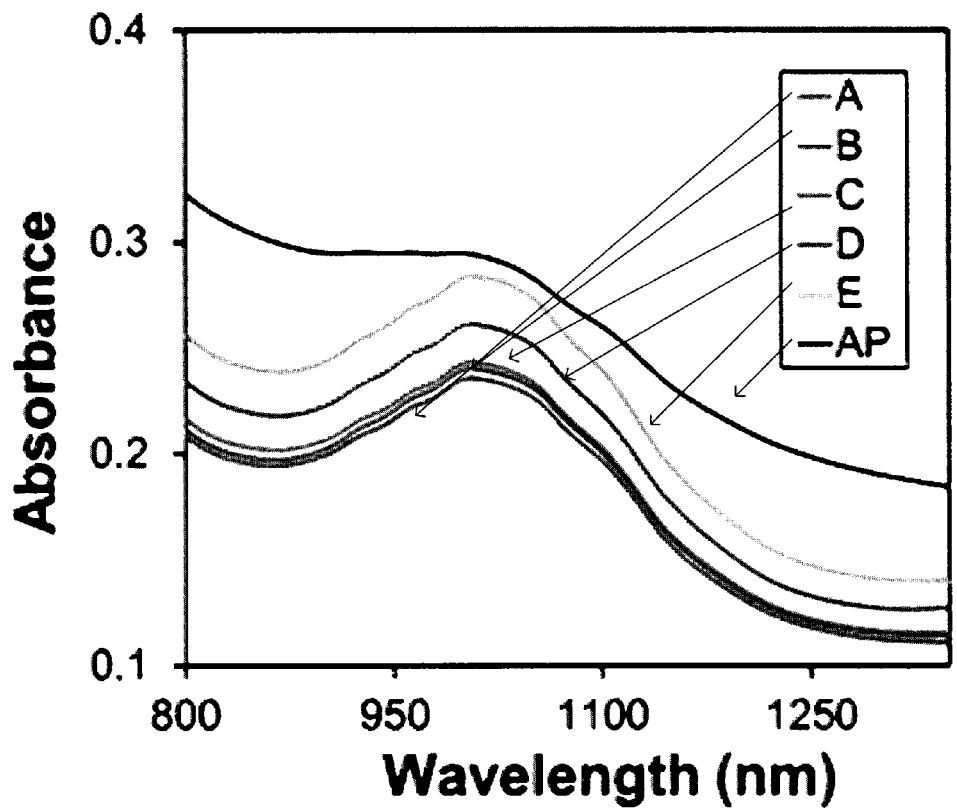
FIGS. 3A-3B are graphs that illustrate for NIR spectra of the $E_{22}$ transitions for semiconducting SWNTs, the unprocessed suspension was normalized to the peak about 1010 for sample E and then offset by about 0.1 absorbance units for clarity. a) After about 45 min. of processing, a greater absorbance, and presence of fine structure, was observed on the high-energy side of the band, while; b) for about 90 min., the absorbance was lower and a greater difference in the magnitude of the absorbance was observed between aliquots corresponding to the line between the upper and lower about 50% of the suspension (between aliquots labeled D and E).
Figure 3B:
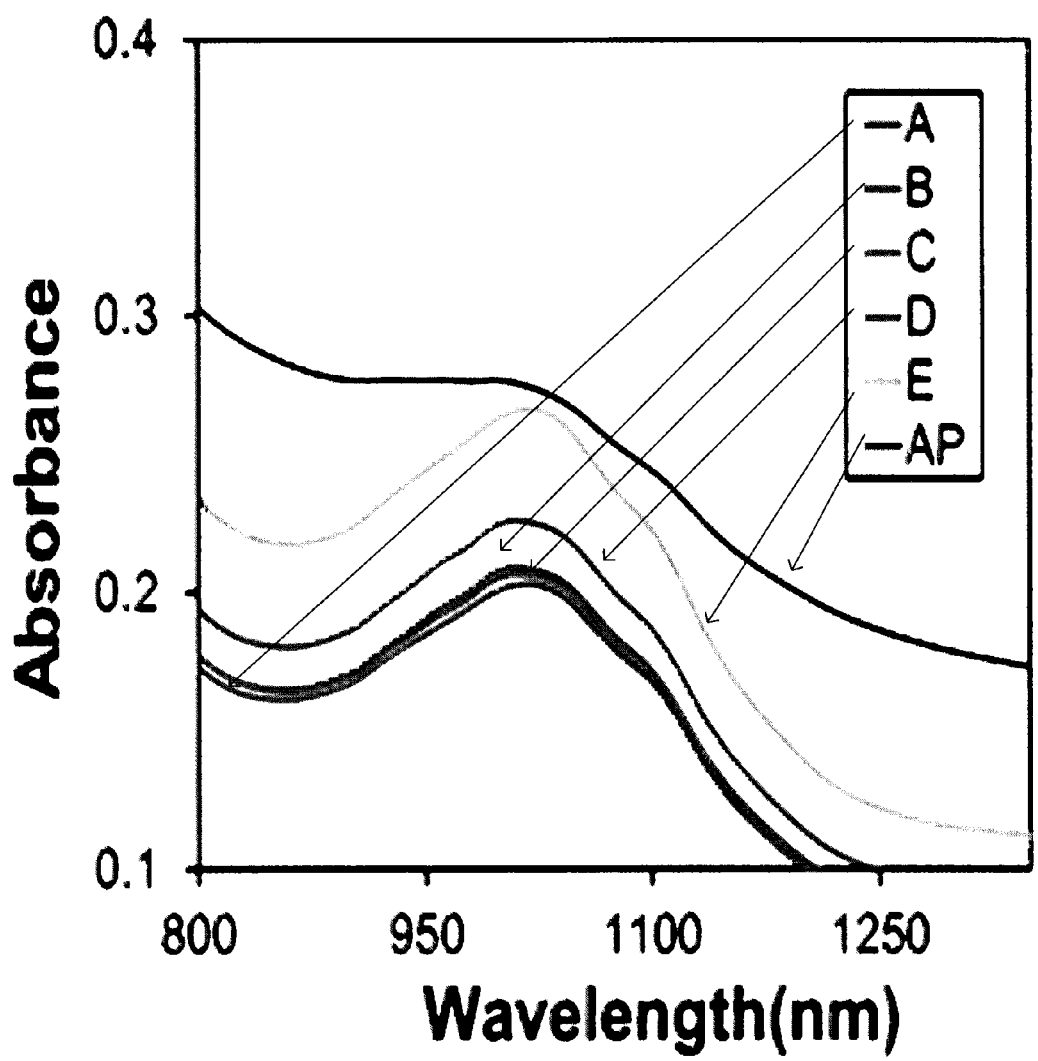

In the region of the spectra that corresponds to the second interband transitions ($E_{22}$) for semiconducting SWNTs, about 1010 nm, the absorbance decreased significantly after processing at either about 45 or 90 min. (FIG. 3). As the average absorbance observed for unprocessed suspensions was about 2.14, it was normalized to the absorbance for aliquot E and offset by 0.1 absorbance units to allow visualization of the change in the size of the peak before and after processing. This significant reduction in absorbance between AP-grade and processed suspensions is expected, due to the significant reduction in residual carbonaceous impurities, which increase the baseline of the absorbance of the suspensions throughout the visible and NIR range and bundles of SWNTs.

The increased size of the semiconducting interband transition peak relative to the baseline is indicative of the enrichment of the suspension in unbundled SWNTs, as the absorbance due to these transitions is not quenched, as in bundled SWNTs. Also of note in the NIR spectra is the presence of small waves on the low-wavelength side of the band centered at 1010 nm. These peaks are indicative of electronic transitions in SWNTs of various chirality and diameters.[58] These peaks are better resolved in suspensions of short nanotubes.

Evidently, the viscosity of the aqueous solvent used in these studies was sufficient to stabilize the density gradients such that they could be observed in each aliquot, without the need for a density gradient in the solvent. This is consistent with a recent report of a NIR fluorescence videomicroscopy study that determined the translational diffusion coefficient for unbundled, surfactant encapsulated SWNTs may range from 0.3 to 6 $\mu m^2/s$, with high aspect ratio SWNTs at the lower end of this range.[59] Short SWNTs, down to about 130 nm, were observed to have the highest translational diffusion coefficients while those of about 1 μm in length had the lowest coefficients.

Figure 4:
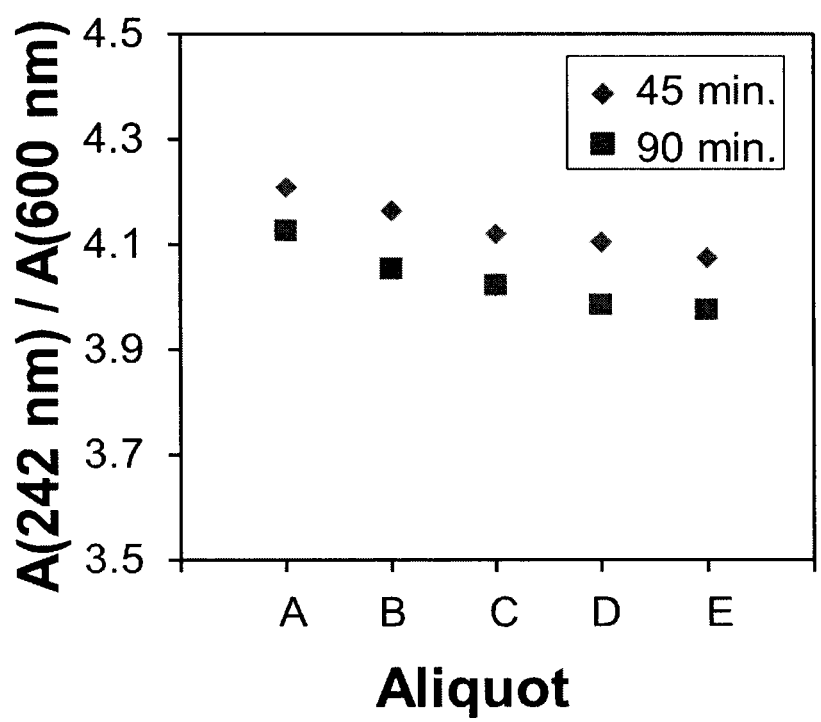
FIG. 4 illustrates that due to the high extinction coefficient of impurities at about 242 nm, relative to that of SWNTs at about 600 nm, the ratio of the absorbance at these two wavelengths is indicative of changes in the purity and concentration of SWNT after each processing step. The slighter lower ratios for about 90 min. processing periods indicate a slight increase in the ability to remove impurities.

The absorbance at 242 nm is sensitive to π electron-containing amorphous carbon impurities, as well as the plasmon resonances in the free-electron clouds of the nanotubes. The measured absorbance in this range is also augmented by scattering that occurs when short wavelength light interacts with suspensions of carbon nanotubes.[53] The absorbance at 600 nm is more sensitive to the SWNTs. This allows a qualitative estimate of the degree of purification, because a decrease in the magnitude of the ratio A(242 nm)/A(600 nm) indicates a decrease in the absorbance of carbonaceous impurities, relative to that for SWNTs (FIG. 4). Across processing times, about 90 min. was found to yield slightly lower ratios. This is likely due to the greater processing time facilitating the removal of more impurities. AFM analysis, discussed in a subsequent section, corroborates this assertion.

Figure 5A:
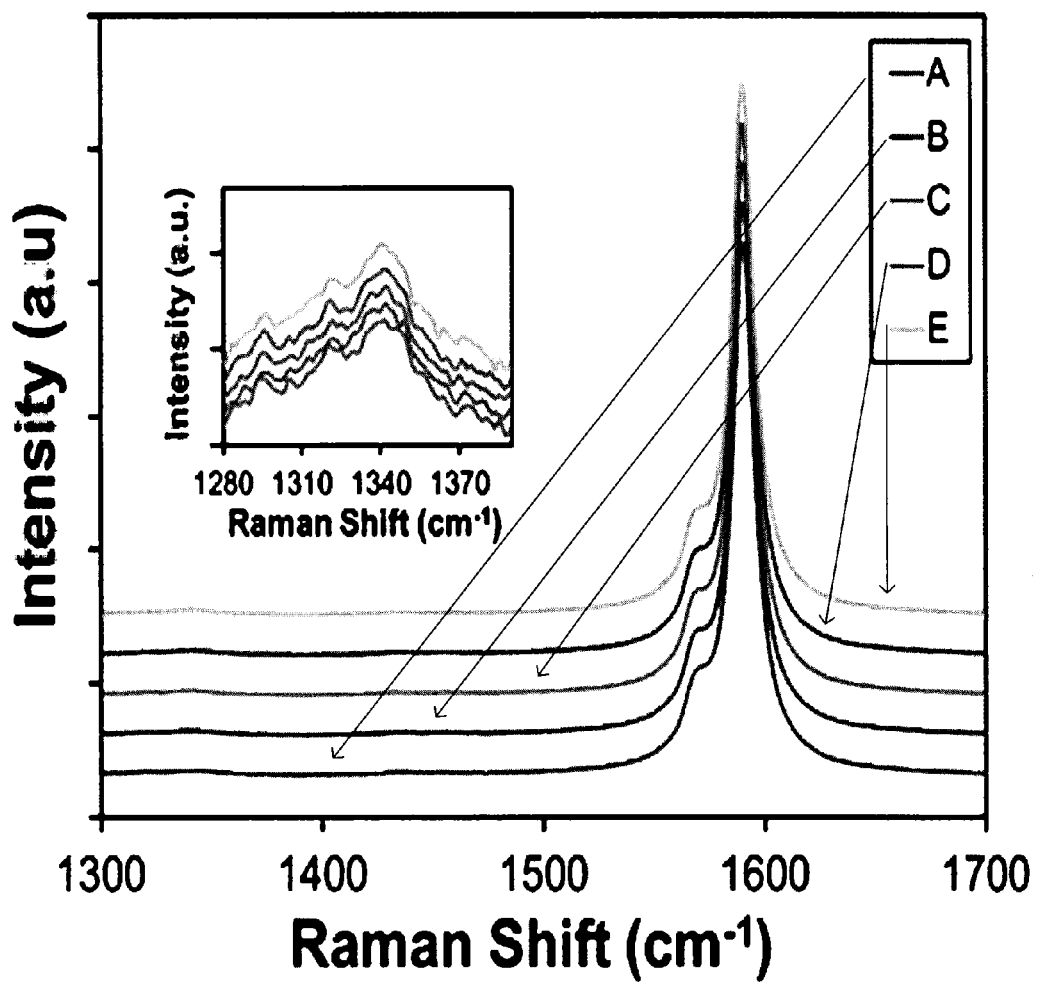
FIGS. 5A-5B are graphs that illustrate representative Raman spectra obtained after about 90 min. processing periods for: a) SWNT suspensions and b) deposits. The insets show the D-band regions.
Figure 5B:
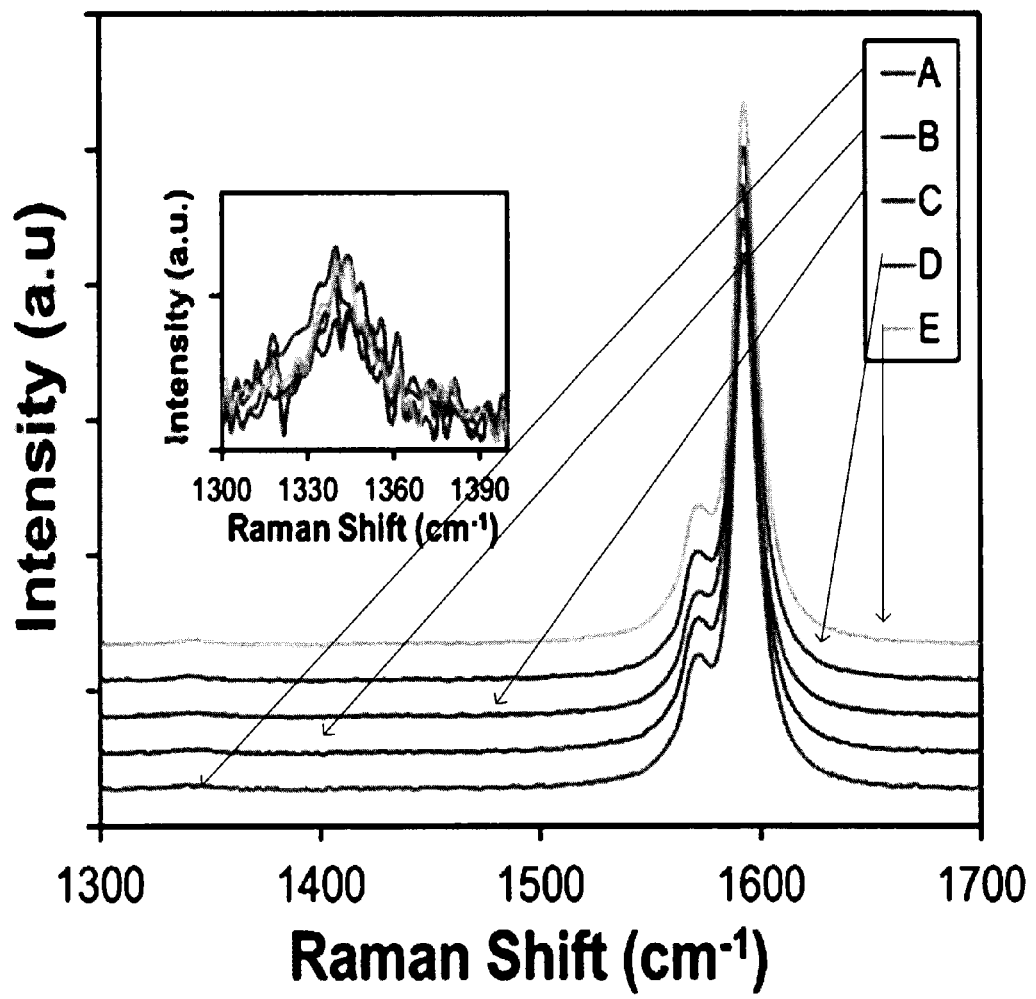

Raman spectroscopy is well suited for characterizing the relative purity of SWNT suspensions and deposits due to the high Raman scattering efficiency of both defect-free and disordered $sp^2$ hybridized carbon atoms. The graphite band (G-band), which occurs near 1590 $cm^{-1}$, is indicative of tangential phonons in the pristine nanotubes, while the disorder band (D-band), near 1370 $cm^{-1}$, is indicative of asymmetric stretching in amorphous $sp^2$ hybridized C (FIG. 5 shows Raman data for suspensions and deposits after about 90 min. processing). When the Raman spectra are normalized to the intensity of the G-band for each processing time, the ratio of the two intensities ($I_G/I_D$) is a measure of the relative enrichment of pristine SWNTs and removal of amorphous C impurities.

Figure 6A:
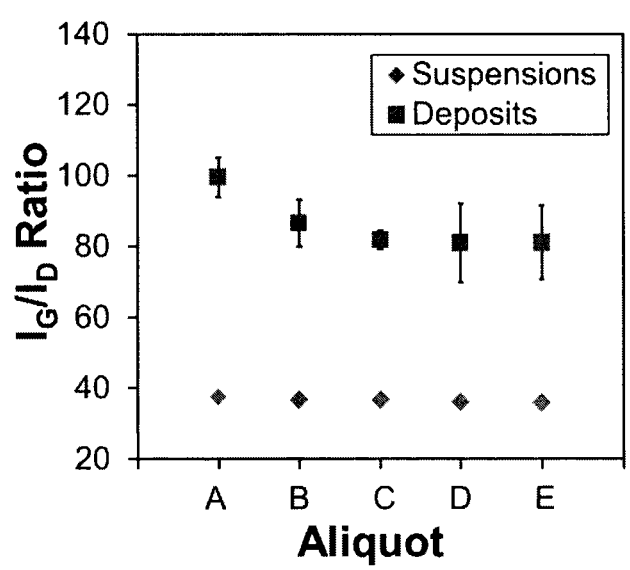
FIGS. 6A-6B are graphs that illustrate the average $I_G/I_D$ ratios observed for SWNT suspensions and deposits formed from each aliquot showed an overall decrease in magnitude with ascending order. A greater difference in the ratios for suspensions and deposits was observed for a) about 45 min.
Figure 6B:
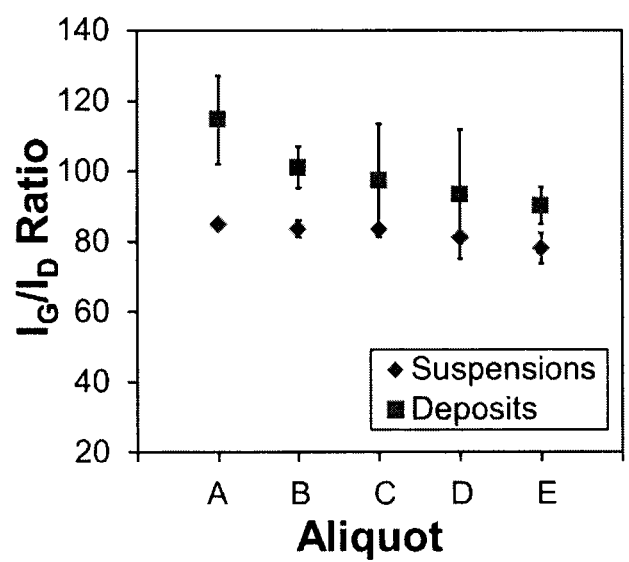
Figure 7A:
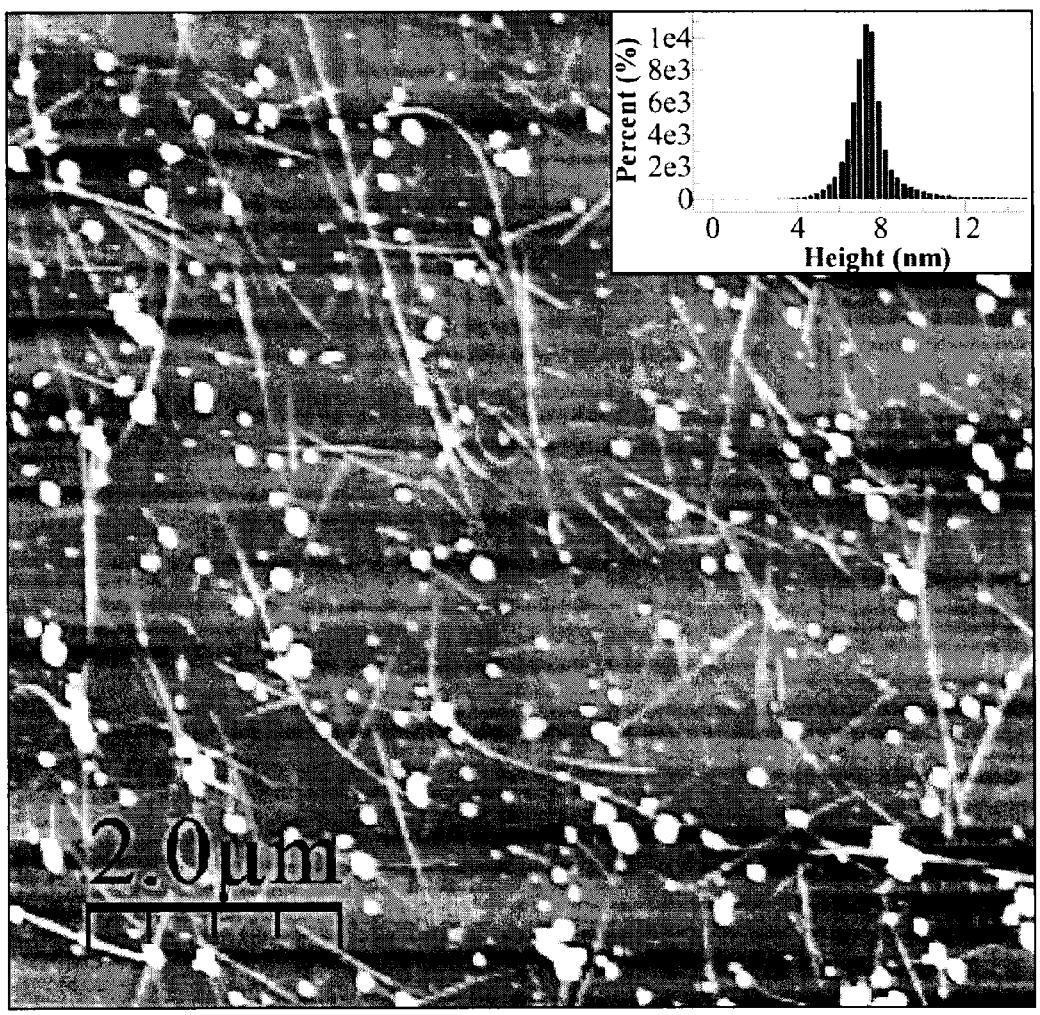
Figure 7B:
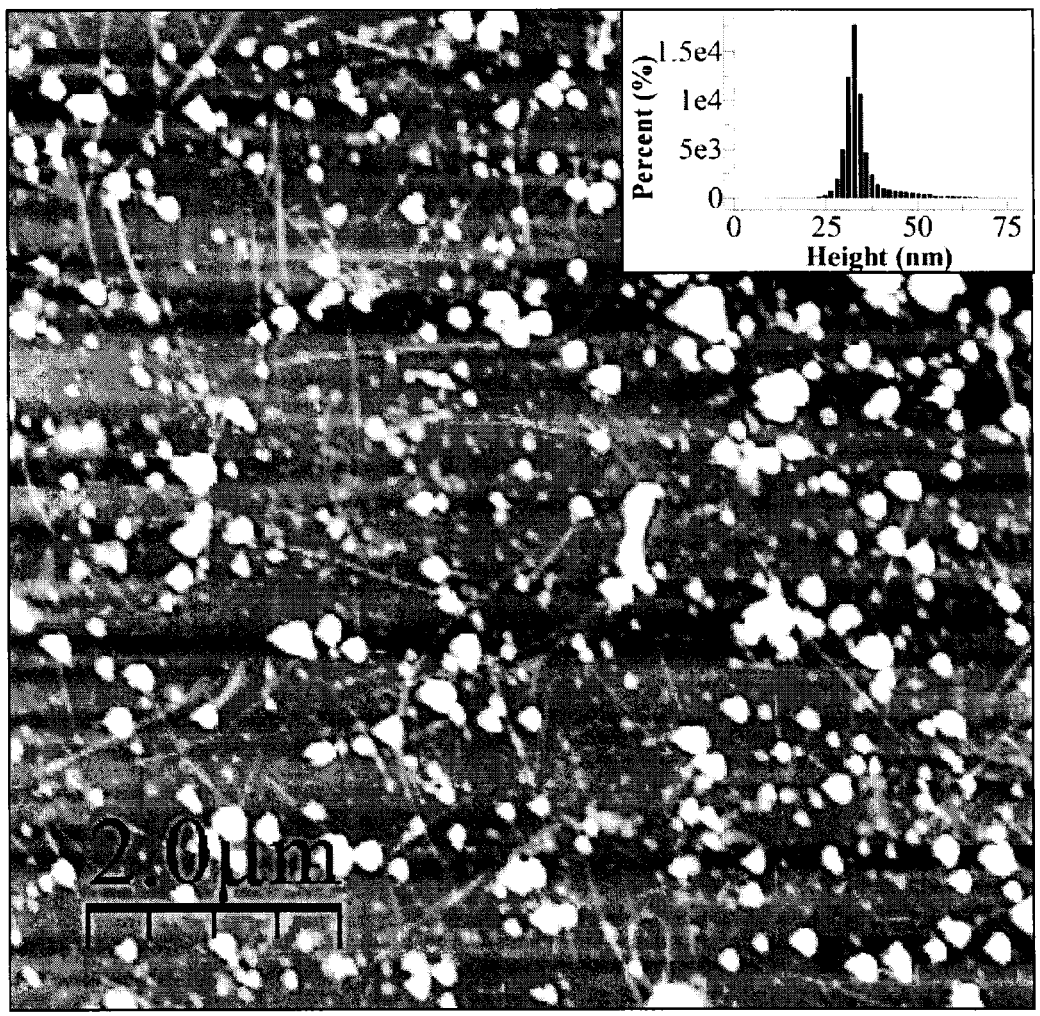
Figure 7C:
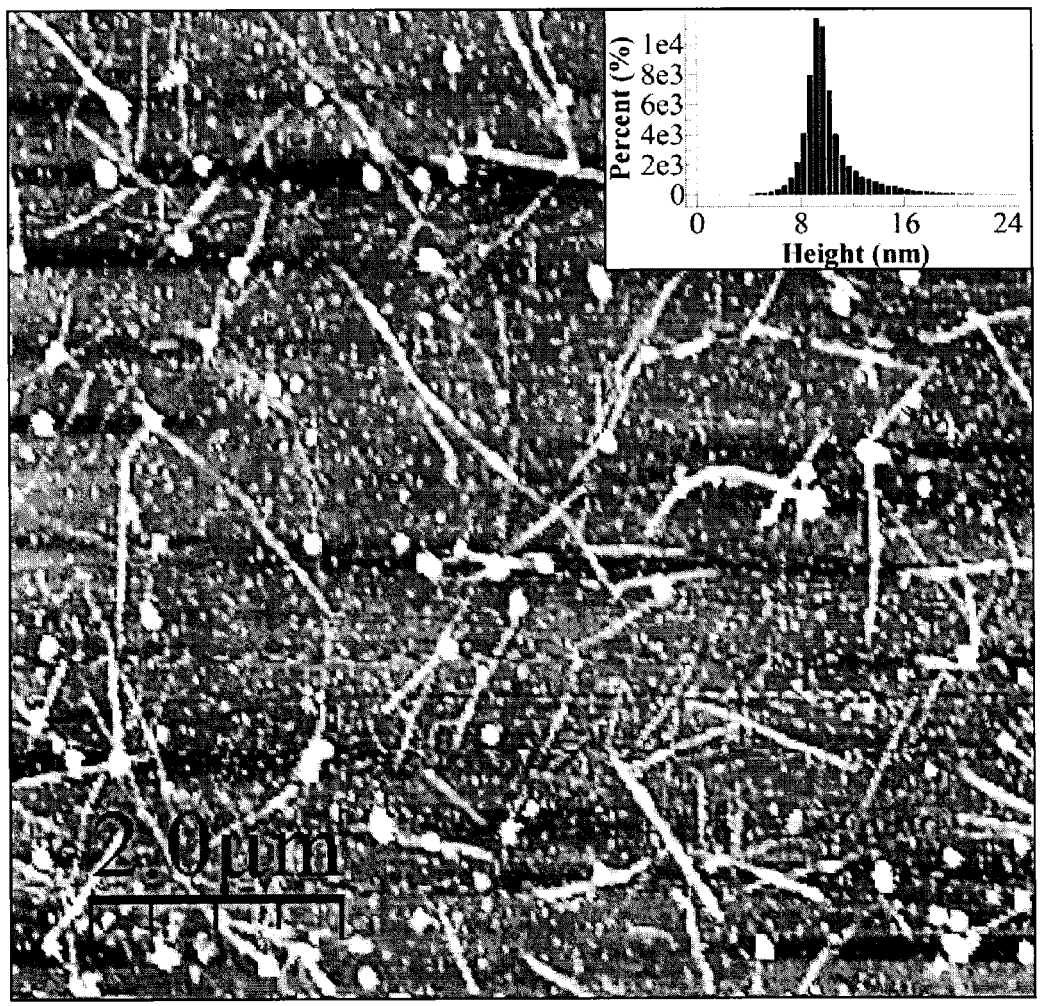
Figure 7D:
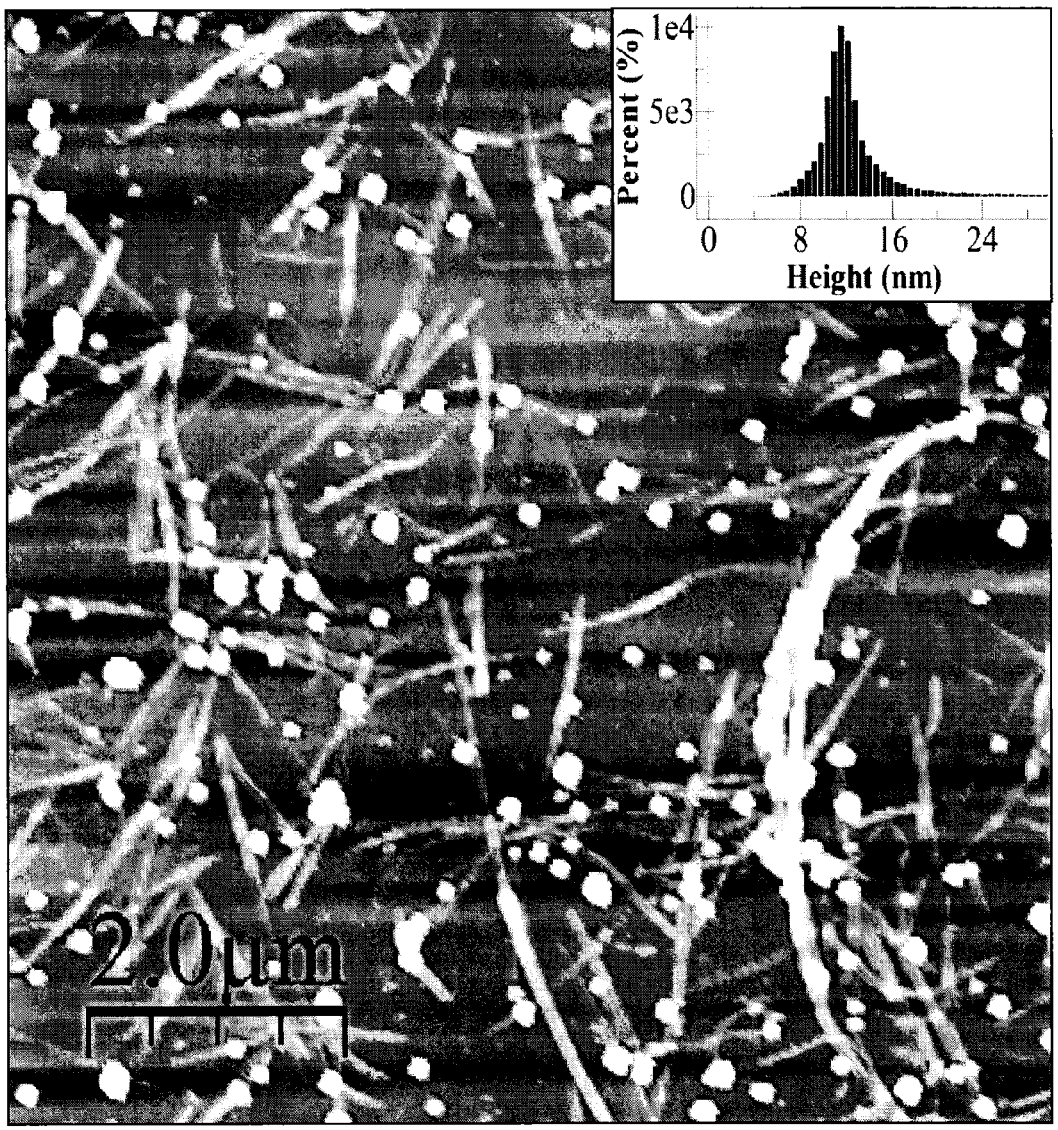

For both processing times, liquid Raman experiments exhibited a small trend toward lower $I_G/I_D$ ratios for each aliquot (FIG. 6). Yet, there was a pronounced difference between the $I_G/I_D$ ratios obtained for suspensions vs. deposits. The $I_G/I_D$ ratio for suspensions increased by more than about 100% with increased processing time, the ratio for deposits formed from those suspensions increased by only about 15%. This indicates that the LFD process is another manner by which the impurities are removed.

Effect of Processing Time on the Enrichment in High Aspect Ratio SWNTs.

AFM is indispensable in the study of purification and enrichment of SWNT soot as it allows a direct correlation between the suspension processing method and the qualities of the SWNT networks that can be formed. For both processing times, aliquot A was observed to have a higher density of SWNTs and globular impurities, with the density of impurities increasing in ascending order (FIG. 7). For about 45 min. processing times, the average length of SWNTs decreased from about 1.45±0.4 to 0.9±0.2 μm between aliquots A and E. While for about 90 min., the lengths decreased from 1.75±0.4 to 0.85±0.2. This indicated that just one processing step was sufficient to begin the process of enriching the supernatant in high aspect ratio SWNTs, although significant impurities remained.

For both processing times, the suspended high aspect ratio SWNTs remained stable in the supernatant for periods that allowed removal of each aliquot. AFM analysis indicated average lengths between about 1.2 and 2.0 μm. In order to determine the purity of each deposit, a histogram was plotted for the height, or z-range data for each AFM image. This allows quantitation of the average height, and thus level of impurities on the surface, since arc discharge nanotubes have an average height of about 1.55±0.1 nm, while impurities are generally much larger. There was a consistent trend toward a higher average height with ascending order for each aliquots, with the average height increasing from about 7.98 to 34.87 nm for suspensions processed for about 45 min., and from about 10.48 to 13.05 nm for about 90 min. Therefore, about 45 min. periods resulted in better quality deposits formed from the upper levels of the supernatant.

Within each sample, the RMS surface roughness also increased in alphabetical order within each sample, while across processing times, the RMS roughness increased at a faster rate for the samples processed for the shorter period (FIG. 8). The roughness values increased from about 3.09 to 7.29 nm, and from about 3.51 to 5.02 nm for about 45 and 90 min., respectively. This indicates that the shorter processing period allows sufficient time for separation of impurities, but is less effective at pelletization of impurities. The consistent increase in the observance of impurities with each aliquot indicates the stability of the suspensions with regard to the impurities that were sequestered near the bottom of the centrifuge tube during processing. This represents a significant advance in the separation of SWNTs from impurities, and enrichment in high aspect ratio nanotubes, as this level of separation is achieved without requiring the addition of the density gradient media like iodixanol, commonly used in DGU. This reagent is much more difficult than SDS to remove after an SWNT deposit is formed, as described in recent reports.[60,61]

Effect of Iterative Processing on the Separation of High Aspect Ratio SWNTs.

AFM analysis showed that processing periods of about 45 min. yielded the highest density of high aspect ratio SWNTs, but also resulted in deposits that had significant residual impurities. Therefore, an iterative approach (FIG. 1B) was used in order to determine the efficacy of this processing method for producing suspensions enriched in longer SWNTs, while also achieving a greater degree of purity in deposits. For these suspensions, the ratio A(242 nm)/A(600 nm) exhibited a slight increase with each processing step (FIG. 9). This indicates that although both absorbances decrease with each processing iteration, A(600 nm) is decreasing at a faster rate relative to A(242 nm), causing a slight increase in the ratio of the absorbances from processing iteration 1 to 6. This shows that most of the globular impurities are removed in the first processing step.[41] Therefore, each successive processing step refines the suspension by removing small bundles of SWNTs, as well as residual carbonaceous impurities. Since A(242 nm) is sensitive to both impurities and the free-electron clouds in the SWNTs, the loss of these bundles causes A(600 nm) to decrease at a faster rate than A(242 nm), resulting in a slight increase in the ratio A(242 nm)/A(600 nm).

AFM images of unprocessed samples exhibited a high coverage of large globular impurities and large SWNT bundles (FIG. 10). However, a dramatic improvement in the quality of the deposit can be seen after the first processing step, as most of the large impurities are removed as discussed previously. After the sixth iteration, the highest density of SWNTs, relative to impurities was observed. Semiconductive 2-D networks of SWNTs, for electronic materials applications, can be readily formed from suspensions of this quality by increasing the number of deposition cycles until the percolation threshold for semiconductive nanotubes is exceeded.

The average height was observed to decrease from about 40.00 to 1.31 nm (Table 1). This final height, which is consistent with the height of one SWNT, indicates a significant improvement over previous reports of the deposition of SWNTs. With each processing step, there was also a steady decrease in the average height and RMS roughness values, indicating that the few impurities that remained were significantly smaller than in the unprocessed sample. Importantly, there was a concurrent increase in the average length of SWNTs from about 1.18 to 2.07 μm, indicating that each iteration further enriched the supernatant in high aspect ratio SWNTs, while removing shorter nanotube fragments with other impurities.

TABLE 1

AFM analysis of the effect of iterative processing steps on low-density SWNT deposits.

| | | # Processing iterations | | | | | |
|---|---|---|---|---|---|---|---|
| | AP | 1 | 2 | 3 | 4 | 5 | 6 |
| # SWNTS/μm$^2$ | — | 0.31 | 0.42 | 0.48 | 0.54 | 0.59 | 0.79 |
| Average Length (μm) | — | 1.18 | 1.31 | 1.55 | 1.65 | 1.70 | 2.07 |
| % Standard Deviation | — | 10 | 17 | 12 | 15 | 8 | 11 |
| Average Surface Height (nm) | 40.00 | 4.89 | 4.67 | 3.38 | 3.18 | 3.48 | 1.31 |
| RMS Surface Roughness (nm) | 13.7 | 1.91 | 1.89 | 1.54 | 1.39 | 1.31 | 1.21 |

Of great significance is the fact that the average density of SWNTs in each deposit increased from about 0.31 to 0.79 SWNTs/μm$^3$, further indicative of the continued enrichment of high aspect SWNTs in the supernatant with each processing step. This can be explained by the increased buoyancy of longer SWNTs in these aqueous suspensions. Nair et al. observed that the buoyancy of a surfactant-encapsulated SWNT increases with the density of surfactant molecules adsorbed along the nanotubes length for various surfactants and chiralities.[62] Further, recent work has indicated that SDS molecules orient perpendicular to the hydrophobic sidewalls of suspended SWNTs. This increases the volume while decreasing the density of the SDS/SWNT construct.[63] Therefore, in the present disclosure, these unbundled, high aspect ratio SWNTs provide more area for the adsorption of SDS, increasing their relative buoyancy. Then, the low centripetal forces used in these studies not only removed low aspect ratio impurities, but also allowed the enhanced buoyancy of unbundled high aspect ratio surfactant-encapsulated SWNTs to isolate them in the supernatant.

The LFD Method Results in Further Purified Deposits.

The $I_G/I_D$ ratios calculated from Raman spectra of suspensions and deposits indicated an increase in the quality of the deposit relative to the suspension, as determined from the increased signal for pristine sp$^2$-hybridized C, relative to defect-containing allotropes (FIG. 11). This increase in $I_G/I_D$ ratio with increasing processing iterations is due to the enrichment of the suspensions in high aspect ratio SWNTs with pristine sidewalls, as well as the removal of amorphous carbon. For suspensions, the $I_G/I_D$ ratios increased by roughly a factor of about three over the course of the first two processing iterations. However, there was a factor of about four increase for deposits over this same range, indicating that the LFD network formation step is an additional purification step in the formation of thin-films, provided the suspension has been purified of the more dense particulates. The formation of deposits of high aspect ratio SWNTs is further facilitated by the greater translational diffusion coefficient for shorter SWNTs making it more likely that they remain in suspension during the deposition process. Therefore, the increase in the ratio for deposits relative to that observed for suspensions is also due to the decreased presence of short SWNTs that likely have oxidized ends.

Conclusions

Enrichment of high aspect ratio SWNTs was obtained via a readily scalable batch purification method. The sedimentation method of centrifugation that was used in the present disclosure differs from density gradient ultracentrifugation in that the addition of solutes to form zones of varying gradients in the solvent are not needed. This allows the purification and enrichment process to occur without the addition of additional reagents, many of which are difficult to remove in subsequent steps. The buoyancy of surfactant-encapsulated SWNTs increases with length. Then, the low centripetal forces used not only removed low aspect ratio SWNTs and impurities, but also allowed the enhanced buoyancy of unbundled high aspect ratio surfactant-encapsulated SWNTs to be used to isolate them in the supernatant. For all processing conditions, an increase in the purity deposits, relative to the suspensions, was observed via Raman spectroscopy. This indicates that the reduced translational diffusion coefficient of high aspect ratio SWNTs promotes their deposition over residual low aspect ratio impurities and nanotubes.

REFERENCES (1) Ruoff, R. S.; Yu, M.-F.; Rohrs, H.; Gdoutos, E. E., Ed.; Springer Netherlands: 2004, p 65.
(2) Bocharova, V.; Kiriy, A.; Oertel, U.; Stamm, M.; Stoffelbach, F.; Jerome, R.; Detrembleur, C. *J. Phys. Chem. B* 2006, 110, 14640.
(3) Hu, L.; Hecht, D. S.; Gruner, G. *Nano Lett.* 2004, 4, 2513.
(4) Durkop, T.; Getty, S. A.; Cobas, E.; Fuhrer, M. S. *Nano Lett.* 2004, 4, 35.
(5) Nakamura, S.; Ohishi, M.; Shiraishi, M.; Takenobu, T.; Iwasa, Y. *Appl. Phys. Lett.* 2006, 89, 013112.
(6) Bradley, K.; Gabriel, J. C. P.; Gruner, G. *Nano Lett.* 2003, 3, 1353.
(7) Wildoer, J. W. G.; Venema, L. C.; Rinzler, A. G.; Smalley, R. E.; Dekker, C. *Nature* 1998, 391, 59.

(8) Weber, J.; Kumar, A.; Kumar, A.; Bhansali, S. *Sens. Actuator B-Chem.* 2006, 117, 308.
(9) Kwon, J.-H.; Lee, K.-S.; Lee, Y.-H.; Ju, B.-K. *Electrochem. Solid-State Lett.* 2006, 9, H85.
(10) Pengfei, Q. F.; Vermesh, O.; Grecu, M.; Javey, A.; Wang, O.; Dai, H. J.; Peng, S.; Cho, K. J. *Nano Lett.* 2003, 3, 347.
(11) Patra, S. K.; Rao, G. M. *J. Appl. Phys.* 2006, 100, 024319.
(12) Wang, M. S.; Peng, L. M.; Wang, J. Y.; Jin, C. H.; Chen, Q. *J. Phys. Chem. B* 2006, 110, 9397.
(13) Newson, R. W.; Green, A. A.; Hersam, M. C.; van Driel, H. M. *Phys. Rev. B* 2011, 83, 115421.
(14) Li, E. Y.; Marzari, N. *Acs Nano* 2011, 5, 9726.
(15) Javey, A.; Guo, J.; Wang, Q.; Lundstrom, M.; Dai, H. J. *Nature* 2003, 424, 654.
(16) Zhao, J.; Lin, C.; Zhang, W.; Xu, Y.; Lee, C. W.; Chan-Park, M. B.; Chen, P.; Li, L.-J. *J. Phys. Chem. C* 2011, 115, 6975.
(17) Sarker, B. K.; Shekhar, S.; Khondaker, S. I. *Acs Nano* 2011, 5, 6297.
(18) Engel, M.; Small, J. P.; Steiner, M.; Freitag, M.; Green, A. A.; Hersam, M. C.; Avouris, P. *Acs Nano* 2008, 2, 2445.
(19) Cheon, J. H.; Bae, J. H.; Jang, J. *Solid-State Electron.* 2008, 52, 473.
(20) Gleskova, H.; Hsu, P. I.; Xi, Z.; Sturm, J. C.; Suo, Z.; Wagner, S. J. *Non-Cryst. Solids* 2004, 338, 732.
(21) Schmidt, J. A.; Hundhausen, M.; Ley, L. *Phys. Rev. B* 2001, 64.
(22) Sato, S.; Seki, S.; Honsho, Y.; Wang, L.; Nikawa, H.; Luo, G.; Lu, J.; Haranaka, M.; Tsuchiya, T.; Nagase, S.; Akasaka, T. *J. Am. Chem. Soc.* 2011, 133, 2766.
(23) Heremans, P.; Cheyns, D.; Rand, B. P. *Acc. Chem. Res.* 2009, 42, 1740.
(24) Rouhi, N.; Jain, D.; Burke, P. J. *Acs Nano* 2011, 5, 8471.
(25) Jeong, H. J.; Jeong, H. D.; Kim, H. Y.; Kim, J. S.; Jeong, S. Y.; Han, J. T.; Bang, D. S.; Lee, G. W. *Adv. Funct. Mater.* 2011, 21, 1526.
(26) Kim, S.; Park, J.; Ju, S.; Mohammadi, S. *Acs Nano* 2010, 4, 2994.
(27) Jiao, L. Y.; Xian, X. J.; Wu, Z. Y.; Zhang, J.; Liu, Z. F. *Nano Lett.* 2009, 9, 205.
(28) Gonzalez-Dominguez, J. M.; Gonzalez, M.; Anson-Casaos, A.; Diez-Pascual, A. M.; Gomez, M. A.; Martinez, M. T. *J. Phys. Chem. C* 2011, 115, 7238.
(29) Shim, B. S.; Zhu, J.; Jan, E.; Critchley, K.; Ho, S.; Podsiadlo, P.; Sun, K.; Kotov, N. A. *Acs Nano* 2009, 3, 1711.
(30) Porro, S.; Musso, S.; Vinante, M.; Vanzetti, L.; Anderle, M.; Trotta, F.; Tagliaferro, A. *Physica E* 2007, 37, 58.
(31) Holzinger, M.; Hirsch, A.; Bernier, P.; Duesberg, G. S.; Burghard, M. *Appl. Phys. A* 2000, 70, 599.
(32) Li, J. X.; Chajara, K.; Lindgren, J.; Grennberg, H. *J. Nanosci. Nanotechnol.* 2007, 7, 1525.
(33) Worsley, K. A.; Kalinina, I.; Bekyarova, E.; Haddon, R. C. *J. Am. Chem. Soc.* 2009, 131, 18153.
(34) Hersam, M. C. *Nat. Nano.* 2008, 3, 387.
(35) Tabakman, S. M.; Welsher, K.; Hong, G.; Dai, H. *J. Phys. Chem. C* 2010, 114, 19569.
(36) Carvalho, E. J. F.; dos Santos, M. C. *Acs Nano* 2010, 4, 765.
(37) Ghosh, S.; Bachilo, S. M.; Weisman, R. B. *Nat Nano* 2010, 5, 443.
(38) Yi, W.; Malkovskiy, A.; Chu, Q.; Sokolov, A. P.; Colon, M. L.; Meador, M.; Pang, Y. *J. Phys. Chem. B* 2008, 112, 12263.
(39) Vichchulada, P.; Shim, J.; Lay, M. D. *J. Phys. Chem. C* 2008, 112, 19186.
(40) Vairavapandian, D.; Vichchulada, P.; Lay, M. D. *Anal. Chim. Acta* 2008, 626, 119.
(41) Shim, J.; Vichchulada, P.; Zhang, Q.; Lay, M. D. *J. Phys. Chem. C* 2010, 114, 652.
(42) Carvalho, E. J. F.; dos Santos, M. C. *ACS Nano* 2010, 4, 765.
(43) Valcarcel, M.; Cardenas, S.; Simonet, B. M. *Anal. Chem.* 2007, 79, 4788.
(44) Zhang, Q.; Vichchulada, P.; Shivareddy, S. B.; Lay, M. D. *J. Mat. Sci.* 2012, 47, 6812.
(45) Zhang, Q.; Vichchulada, P.; Lay, M. D. *J. Phys. Chem. C* 2010, 114, 16292.
(46) Vichchulada, P.; Zhang, Q.; Duncan, A.; Lay, M. D. *ACS Appl. Mater. Interfaces* 2010, 2, 467.
(47) Zhang, Q.; Vichchulada, P.; Cauble, M. A.; Lay, M. D. *J. Mater. Sci.* 2009, 44, 1206.
(48) Zhu, J.; Shim, B. S.; Di Prima, M.; Kotov, N. A. *J. Am. Chem. Soc.* 2011, 133, 7450.
(49) Jaber-Ansari, L.; Hahm, M. G.; Somu, S.; Sanz, Y. E.; Busnaina, A.; Jung, Y. J. *J. Am. Chem. Soc.* 2009, 131, 804.
(50) Jang, E. Y.; Kang, T. J.; Im, H. W.; Kim, D. W.; Kim, Y. H. *Small* 2008, 4, 2255.
(51) Vichchulada, P.; Cauble, M. A.; Abdi, E. A.; Obi, E. I.; Zhang, Q.; Lay, M. D. *J. Phys. Chem. C* 2010, 114, 12490.
(52) Chow, B. Y.; Mosley, D. W.; Jacobson, J. M. *Langmuir* 2005, 21, 4782.
(53) Priya, B. R.; Byrne, H. J. *J. Phys. Chem. C* 2008, 112, 332.
(54) Rance, G. A.; Marsh, D. H.; Nicholas, R. J.; Khlobystov, A. N. *Chem. Phys. Lett.* 2010, 493, 19.
(55) Horcas, I.; Fernandez, R.; Gomez-Rodriguez, J. M.; Colchero, J.; Gomez-Herrero, J.; Baro, A. M. *Rev. Sci. Instrum.* 2007, 78.
(56) Ryabenko, A. G.; Dorofeeva, T. V.; Zvereva, G. I. *Carbon* 2004, 42, 1523.
(57) Hare, J. P.; Kroto, H. W.; Taylor, R. *Chem. Phys. Lett.* 1991, 177, 394.
(58) Bachilo, S. M.; Strano, M. S.; Kittrell, C.; Hauge, R. H.; Smalley, R. E.; Weisman, R. B. *Science* 2002, 298, 2361.
(59) Tsyboulski, D. A.; Bachilo, S. M.; Kolomeisky, A. B.; Weisman, R. B. *Acs Nano* 2008, 2, 1770.
(60) Arnold, M. S.; Green, A. A.; Hulvat, J. F.; Stupp, S. I.; Hersam, M. C. *Nature Nanotechnology* 2006, 1, 60.
(61) Kavan, L.; Frank, O.; Green, A. A.; Hersam, M. C.; Koltai, J. n.; Zólyomi, V.; Kürt, J.; Dunsch, L. *J. Phys. Chem. C* 2008, 112, 14179.
(62) Nair, N.; Kim, W.-J.; Braatz, R. D.; Strano, M. S. *Langmuir* 2008, 24, 1790.
(63) Duque, J. G.; Densmore, C. G.; Doorn, S. K. *J. Am. Chem. Soc.* 2010, 132, 16165.

Example 2

Density control during the formation of 2-D networks of single-walled carbon nanotubes (SWNTs) allows their macroscopic electrical properties to be tuned from semiconductive to metallic conduction, allowing their use in numerous new materials applications. However, the resistance of such thin-films is generally non-optimal, dominated by the effects of inter-SWNT tunneling junctions, metal/SWNT contacts, sidewall defects, and the presence of residual dopants. The present disclosure provides insight into the relative contributions of these various items to the overall resistance of an SWNT network contacted by Ti electrodes, and ways to reduce these effects via changing the structure of the metal/SWNT contact, and annealing at low-temperature. Further, the addition of a mild-acid treatment was found to cause a 13-fold reduction in resistance and much greater reproducibility in inter-network conductivity.

Introduction

Single-walled carbon nanotubes (SWNTs) have extraordinary physical and chemical properties that are expected to transform numerous fields in the electronics industry. Due to the enhanced current-carrying properties of 2-D networks of SWNTs, such thin-films are being investigated for numerous materials that require high mechanical flexibility, robustness, and optical transparency.[1-3] All of these electronic materials will require addressing a major barrier: the reduction of their high sheet resistance (R). Solving this issue will have a transformative effect on many contemporary and emerging technologies such as photovoltaics,[4,5] flexible displays,[6] electromagnetic interference reduction,[7,8] and electrochromic glass.[9,10]

The magnitude of R, and by relation the efficiency, of a nanotube network is strongly affected by the density of defects on the nanotubes, the attributes of the junctions between SWNTs, as well as metal/SWNT contacts, residual adsorbates, and the magnitude of the Schottky barrier at the metal/SWNT interface. Understanding and optimizing all of these properties is of importance to improving the performance of electronic device structures that take advantage of the ability of SWNT networks to be used for either metallic interconnects and/or semiconductor channels, based on the density of the network.[11]

The present disclosure involves methods for the reduction of sheet resistance in 2-D networks of SWNTs via the combined use of low-temperature annealing and the formation of molecular anchors on the nanotubes. This method is effective for obtaining a significant reduction in resistance, and greater reproducibility in thin-film properties. Importantly, these affects are obtained without disturbing the organization of the SWNTs in the network, so bundling of SWNTs will not occur.

Previous approaches to reducing the metal/nanotube contact resistance include nano-welding,[12] high-temperature annealing,[13,14] conductive polymer wrapping,[15] local joule heating,[16] ultrasonic bonding[17] and electrical stressing.[18] However, the present disclosure is a scalable, high-throughput method involving the use of low-temperature annealing. Further, the low-temperature used in the present disclosure is compatible with substrates typically used for flexible electronic materials, like poly(ethyleneterephthalate) and polyimide.[19]

Within a network, interfacial Schottky barriers, which are largest for semiconductive/metallic nanotube junctions, greatly increase R.[20-22] Recent work has shown that the inter-SWNT tunnel junction between bundles of SWNTs was the largest contributor to network resistance.[23] This R increase was found to scale with the number of inter-SWNT junctions for spray-coated arc discharge SWNTs. Other studies have shown that when the layer-by-layer deposition process was used to form 3-D films of bundles of SWNTs, annealing between 200 and 300° C. greatly increased conductivity.[24,25]

Graphitization of the metal electrode via annealing above 600° C. has been shown to increase the quality of platinum/SWNT contacts for metallic, but not semiconductive nanotubes.[26] However, semiconductive tubes are the active element in important device structures like transistors and diodes. Additionally, the development of low-temperature methods will facilitate the development materials that use well-established, lightweight, and flexible microelectronic substrates.

Additionally, electronic charge transfer between SWNTs and metal surfaces depends on both the electronic structures of the adsorbed nanotubes and the work function of the metal surface,[27] with the metal/SWNT network Schottky junction playing a large role in overall device performance.[28] Ti is a good choice for contacting SWNT networks because of its low Schottky barrier height[28] and high cohesive strength[29] with carbon. Further, due to the native oxide on titanium (Ti) surfaces, an adhesion layer, similar to that used on silica surfaces, can be used attach the SWNTs.[30,31] Additionally, a Ti carbide may form during annealing processes[32] and SWNTs adsorbed on Ti surfaces may become metallic,[33] resulting in a lowering of any electrostatic barrier for electron transport from the nanotube to the metal electrode.

Recent work by Lay and coworkers has demonstrated the efficacy of a new liquid-deposition method for the creation of networks with tunable SWNT densities,[34] orientations[35] and macroscopic electrical properties.[36] Yet, inter-SWNT contact resistance and the formation of Schottky barriers between metal electrodes and SWNT networks remain significant barriers to the mass production of real-world electronic device structures. Hence, the study of methods to reduce resistance in SWNT networks is critical.

Experimental Section

Substrate Preparation

For the studies to determine the effect of low-temperature annealing on inter-SWNT resistance, 1×2 cm Si/SiO$_x$ wafer fragments were produced using the scribe-break method. Then, the substrates were cleaned with a snow-jet (compressed $CO_2$ gun), and coated with one monolayer of a (3-aminopropyl)triethoxysilane (3-APTES, 99%, Aldrich) via immersion in a solution of 100 µL 3-APTES in 20 mL ethanol (99.5%, absolute 200 proof, ACROS).[37] After an about 45 min. immersion, the Si/SO$_x$ wafer fragments were cleaned in a stream of fresh ethanol and water. A final snow-jet cleaning ensured that only one monolayer of the silane remained on the surface.

A dual-filament thermal evaporator (Thermionics), operating under high vacuum (P<1×10$^{-6}$ torr), was used to deposit Ti (99.995% pure, ⅛" diameter pellets, Kurt J. Lesker Company) electrodes on a 4" Si/SiO$_x$ wafer (p-type, 5000 Å thermal Oxide, Montco Silicon Technologies Inc.). During the deposition process, a homemade stainless steel stencil was placed between the deposition source and Si/SO$_x$ wafer fragments to serve as a shadow mask to deposit 2 mm dia. circles spaced 1 cm apart. The thickness of the Ti electrodes was verified to be 0.5 µm via AFM imaging (Molecular Imaging, PicoPlus). The Ti electrodes were either deposited prior to, or after SWNT network formation, as described below. When the nanotubes were deposited after the Ti electrodes, the silane monolayer was deposited after Ti deposition. In this case, the silane coated the Ti and silica surface, as the passive Ti oxide that forms in air behaves similarly to SiO$_x$ with regard to self-assembled monolayer formation by silanes.

SWNT Suspension and Network Formation

The SWNT suspension purification method includes the following.[38,39] Briefly, a known mass of arc discharge SWNT soot (AP grade, Carbon Solutions, Inc.) was dispersed in an aqueous 1% sodium dodecyl sulfate (SDS) solution via probe ultrasonication. Then, repeated centrifugation/decantation cycles were used to form stable suspensions. UV-Vis-NIR, Raman, and AFM were used to confirm that the deposition suspension was enriched in unbundled, undamaged, high-aspect ratio SWNTs.

For network deposition, the substrate was briefly immersed in the purified SWNT suspension. Next, $N_2$ flow (p=60 psi) was applied to quickly dry the suspension and deposit the SWNTs without allowing bundle formation. Each deposition cycle resulted in the deposition of a small density of SWNTs. Then, the substrates were rinsed with copious 18.2 MΩ water and dried under flowing nitrogen. Each iteration of the above process deposited reproducible densities of SWNTs.[34,37] After network formation, each sample was tested to confirm the absence of short circuits to the Si below by measuring the current through two electrodes positions at either end of the network while the voltage was scanned on a third electrode connected to the Si substrate.

Sample Annealing Process

All samples were purged under high-purity Ar (flow rate=80 sccm) in a 1" dia. quartz tube furnace (Lindberg/Blue, Mini-Mite) for about 30 min. Then, the temperature was raised to about 300° C. at the rate of about 20° C./min., where the samples were annealed for about 60 min. Then, the system was cooled to room temperature under high-purity Ar.

Characterization Methods

A semiconductor characterization system (Keithley, 4200SCS) and probe station (Signatone, S-1160A) were used for electrical measurements. As all R measurements were made in air, any change in conductivity due to $O_2$ adsorption/desorption is minimal. To determine the effect of low-temperature annealing on the inter-SWNT junction resistance, samples without prefabricated Ti electrodes were examined using a four-point probe method. However, for the samples on which Ti electrodes were deposited, a two-point probe method was sufficient to provide an accurate measure of the change in resistance of the SWNT networks.[36,40]

The effect of each treatment on the density of defects on the SWNTs was measured with Raman spectroscopy (Thermo Scientific, DXR Raman Microscope) using a 532 nm solid-state laser excitation source with 7 mW power at the sample. A 50× objective was used to obtain Raman scattering data for several areas across each sample. Then, the effect of each treatment on the level of defects in the SWNTs was quantitated by calculating the average ratio of the graphite band (G-band) with respect to the disorder band (D-band) in several areas for each sample.

Results and Discussion

An annealing temperature of about 300° C. was found to work well. Lower temperatures showed little change in $R_{sheet}$, yet higher temperatures actually increased $R_{sheet}$. The increase in $R_{sheet}$ observed at higher temperatures is likely due to decomposition of the silane adhesion layer, as previous reports have shown that self-assembled silane monolayers are stable up to only about 350° C.[41]

To determine the effects of low-temperature annealing on both inter-SWNT and Ti/SWNT contact resistance in networks, four methods were investigated (FIG. 12): 1. The first set of samples was comprised of low-density SWNT networks, to elucidate the effect of the annealing treatment on inter-SWNT contacts, 2. The second set of samples had Ti electrodes deposited after the formation of the SWNT network to ascertain the effect of the annealing process on Ti/SWNT contacts, 3. The third set of samples had Ti electrodes deposited prior to SWNT network formation to understand the effect of the treatment on the Ti/SWNT interface, 4. Finally, a fourth set of samples was treated similarly to the third set of samples, with the addition of a mild acid treatment and an additional low-temperature annealing step. This allowed the effect of inter-junction molecular anchor formation to be examined.

For each treatment, the percentage decrease in resistance for five samples was calculated using Equation 1.

$$\frac{(R_{initial} - R_{final})}{R_{initial}} \cdot 100\% \qquad \text{(Equation 1)}$$

Effect of Low-Temperature Annealing on Intra- and Inter-SWNT Resistance in Bare Networks A four-point probe measurement method was used on bare low-density SWNT networks to gain insight into the effect of the annealing process on inter-SWNT contact resistance. For these samples, an about 48.5% decrease in $R_{sheet}$ was observed (FIG. 13). This represents a nearly two-fold reduction in R, in line with previous results obtained for the removal of the surfactants from SWNTs using photocatalytic reactions in the presence of ZnO nanoparticles.[42] The $R_{sheet}$ measured is the sum of two major contributing factors: $R_{sheet}$ due to intra-SWNT effects as charge is propagated along each individual SWNT and inter-SWNT effects as charge traverses the tunnel junction between nanotubes. The relative contribution of each of these effects is not readily measured in large networks, therefore the effect of the sum of these two effects will be considered.

The volatilization of any residual adsorbates on the SWNTs, remaining after the deposition process, will likely contribute to both $R_{sheet}$ effects. When adsorbates remaining after the liquid deposition process are removed from the sidewalls of the SWNTs, any reduction in charge transport due to doping from molecular adsorbates will be alleviated. Additionally, volatilization of molecular adsorbates will result in a closing inter-SWNT packing distance, thus reducing the charge transfer barrier between nanotubes.

Moreover, intra-SWNT R is reduced via the removal of defects in the $sp^2$-hybridized lattice of the nanotubes during the annealing process, as the highly conductive conjugated π-bonding network is partially restored. Further, the inter-SWNT R is reduced by the formation of covalent bonds at defect sites located near SWNT junctions as they are annealed.[43] The combined effect of these two modes of defect reduction lowers the resistance at the tunnel junctions between nanotubes, resulting in enhanced conductivity throughout the film.

Raman spectroscopy is useful for determining the change in defect density on the SWNTs because of its sensitivity to symmetric vibrational modes induced by graphitic $sp^2$ hybridized bonds (observed as the G-band about 1590 $cm^{-1}$) and asymmetric modes due to defects in the conjugated graphene lattice (indicated by the D-band about 1300 $cm^{-1}$). Therefore, to correlate the change in the density of SWNT defects to the changes in network resistance, Raman spectra (FIG. 14A) were obtained at five locations for each sample.

The G-band at about 1590 $cm^{-1}$ in the Raman microscopy spectra is split into two waves: the high-frequency $G^+$ peak that corresponds to semiconductive nanotubes, and the a peak, which appears as a shoulder on the low energy side of the $G^+$ peak. The $G^-$ peak, which is sensitive to SWNT diameter, has been ascribed to metallic SWNTs.[44] Although the $G^+$ peak is relatively insensitive to adsorbates, the $G^-$ band is highly sensitive to doping from adsorbed protons as well as the sulfate group of SDS.[45,46] Additionally, it has been reported that SDS creates a mildly acidic environment around the suspended SWNTs, with a corresponding narrowing, reduction in intensity, and blue-shifting of the $G^-$ peak.[47] Therefore, the desorption of non-covalently bound protons and residual surfactant during the annealing process caused the observed increase in intensity for the $G^-$ peak (FIG. 14).

The change in the ratio of the peak areas for the G- and D-bands, $I_G/I_D$, was used as an indicator for the effect of the annealing process on the level of defects observed (FIG. 14B). A nearly 70% increase in $I_G/I_D$ ratio was observed after the low-temperature annealing process, indicating that the reduction in the density of defects on the SWNTs played a significant role in the observed improvement in conductivity.

Effect of Low-Temperature Annealing on Ti-SWNT Contact Resistance: Ti Above

The effect of having Ti electrodes deposited either on top or below the SWNT network on the change in R was investigated. Samples labeled SWNTs/Ti were comprised of electrically continuous nanotube networks with similar $R_{sheet}$ as those used for the bare SWNT network studies. When Ti electrodes were vapor deposited on these samples, the average R decreased from about 1.9 to 0.68 MΩ before the annealing process. Since the same number of deposition cycles was used to form all networks, resulting in samples with similar densities,34,36,37 this lower R in the presence of the Ti electrodes is due to the larger surface area in contact with the SWNT network yielding more conductive pathways. For a network of conducting sticks, more pathways results in greater conductance.

After the annealing process, an about 48.4% (nearly 2-fold) reduction in R was observed. As this value is similar to that for the bare SWNT network, this reduction in R can be ascribed to the effects described above: enhanced inter-SWNT tunnel junctions, defect reduction, and dopant volatilization. Evidently, when the Ti coats part of the pre-deposited network, this precludes any further reduction in interfacial contact resistance.

Effect of Low-Temperature Annealing on Ti-SWNT Contact Resistance: Ti Below

Samples labeled Ti/SWNTs were designed to determine the effect of low-temperature annealing on the Ti/silane/SWNT network interface. These nanotube networks were deposited onto substrates that contained prefabricated Ti electrodes and silane monolayers. In this case, the tunnel junction between the SWNT network and Ti electrode was bridged by a silane monolayer, which acted as a spacer at the metal/SWNT interface, introducing a significant level of capacitance between the SWNTs and Ti electrodes.[48,49,50] Thus, the starting R for these samples was slightly higher than in the case where Ti was deposited directly onto the SWNT network, about 0.89 vs. about 0.68 MΩ, respectively. Such an increase in Ti/SWNT contact resistance would contribute to power dissipation in SWNT-based device structures.[51]

These samples (FIG. 13B) had an additional about 11% reduction in R relative to samples with post-fabricated Ti contacts, corresponding to an about 2.6-fold decrease in R. Therefore, the low-temperature annealing method was effective for reducing the interfacial tunnel barrier at the Ti/silane/SWNT interface to a level slightly greater than that observed for samples with Ti contacts fabricated on top of the SWNT network. Therefore, this process has the potential to allow the formation of device structures on pre-fabricated Ti electrodes to achieve the same level of performance as those that require a post-network formation high-vacuum metal deposition step.

Effect of a Mild Acid and Low-Temperature Annealing on the Resistance of SWNT Thin-Films: Ti Below For the set of samples labeled Ti/SWNTs+Acid, after the annealing process, each sample was immersed in about 0.1 M $HNO_3$ for about 1 min, and rinsed with copious 18.2 MΩ water. This additional treatment had a statistically insignificant effect on samples with an initial $R_{sheet}$ of about 1 MΩ, resulting in an about 4% additional reduction in $R_{sheet}$ (FIG. 13B). Overall, there was an about 3-fold decrease in R. Recently, theoretical work by Matsuda and coworkers demonstrated that —COOH defects on SWNTs could act as "molecular anchors," reducing the Cu/SWNT interfacial contact resistance by a factor of about 275,[52] so the effect of this mild acid treatment was investigated for more highly resistive samples, as discussed below.

Effect of a Mild Acid and Low-Temperature Annealing on Highly Resistive SWNT Thin-Films: Ti Below As the combined $HNO_3$/annealing process used in these studies was sufficient to form molecular anchors, the effect of this process on a new set of more highly resistive samples was investigated. For these highly resistive networks, the decreased number of electrical pathways enhances the importance of inter-SWNT contact resistance, relative to the previously examined samples.

Consistent with the prior observation of the efficacy of the annealing process for reducing contact resistance, these highly resistive samples exhibited an about 80% reduction in R (FIG. 15), corresponding to an about 5-fold decrease in R. This greater decrease in R, relative to less resistive samples, is due to the lower number of electrical pathways having the effect of increasing the importance of changes in the quality of the tunnel junctions.

The subsequent mild acid treatment and annealing resulted in an about 4-fold increase in R. This increase in resistance is due to several effects. Firstly, the adsorbed protons deplete charge carriers in the p-type semiconductive SWNTs. Secondly, there is a reversible disruption of the conductive π system of the SWNTs by the adsorbed protons. Additionally, the protonation of the amine-terminated self-assembled monolayer provided additional electrostatic doping by reducing charge carriers in the p-type semiconductive SWNTs.

The reduction in the electrical performance of the SWNT networks after the acid treatment was reversed via a second annealing process that decreased the R to an average of about 7.3 MΩ. This is a total reduction in R of about 92% over the as-prepared samples, corresponding to an about 13-fold decrease in R for this set of highly resistive samples. Evidently, the formation of defects on the SWNTs during the acid treatment and the subsequent restoration of the conjugated network during annealing resulted in enhanced conduction at junctions between the SWNTs in the network, as well as at the SWNT/Ti interface. Additionally, the volatilization of residual protons and SDS adsorbed on the SWNTs increased conductivity.

The variance in the R measurements for the samples greatly decreases after each annealing process, indicating that improving the quality of inter-SWNT contacts is crucially important for increasing the reproducibility of SWNT device structures. As the overall density of SWNTs was similar for these highly resistive samples, the observed decrease in variance can be attributed to the formation of enhanced inter-tube contacts diminishing the effects of Schottky barriers between semiconductive and metallic SWNTs. Therefore, the variance in the measurements indicate the precision with which the density of SWNTs could be controlled, rather than fluctuations in inter-SWNT contacts.

The increased defect density on the SWNTs, as observed from Raman spectra (FIG. 16) contribute to the increased R observed after acid treatment. The Raman microscopy data obtained for six samples (each measured in five areas) indicated a profound effect of acid treatment on the $I_G/I_D$ ratio. The average initial $I_G/I_D$ ratio increased from about 39 to 65 after the first anneal. The acid treatment reduced this value to about 41. The final anneal increased the average $I_G/I_D$ ratio to about 53. This increase is due to the annealing process reducing the level of defects on the SWNTs and increasing the relative intensity of the G-band by desorbing $HNO_3$.

Although the final $I_G/I_D$ ratio remained significantly lower than the initial value after the first anneal, the negative effect of any remaining defects on conductance is clearly overcome by the formation of molecular anchors that greatly reduce the inter-SWNT contact resistance.

In addition to increasing the density of defects on the SWNTs, with a commensurate increase in the D-band, exposure to $HNO_3$ has also been shown to dope nanotubes, resulting in suppression of the G-band.[53] Annealing at about 400° C. was found to evaporate the $HNO_3$, thus enhancing the G-band. Therefore, doping from residual adsorbed $HNO_3$ is partially responsible for the dramatic reduction in $I_G/I_D$ ratio observed in these experiments. Additionally, the intensity of the G⁻ peak was observed to decrease after exposure to acid, while an increase in intensity and blue-shift was observed after annealing. This indicates the adsorption and desorption of protons during each treatment.

Conclusion

The macroscopic electrical resistance of SWNT networks was greatly decreased via low-temperature annealing and mild acid treatment, two methods that are compatible with currently established substrates used for flexible electronic materials. The combined annealing/acid-treatment process yielded a reduction in R that was most pronounced for highly resistive samples, where an about 13-fold decrease in R was observed. Additionally, an about 28-fold decrease in the standard deviation of the devices was observed. Therefore, when the SWNT/metal contacts were exposed to further chemical treatment, they could be optimized, greatly increasing the overall performance. This additional increase in conductivity came from a reduction in interfacial R at metal/SWNT junctions, due to Schottky barriers and poor electrical contacts.

REFERENCES

1. Kim, S.; Park, J.; Ju, S.; Mohammadi, S., Fully Transparent Pixel Circuits Driven by Random Network Carbon Nanotube Transistor Circuitry. *Acs Nano* 2010, 4 (6), 2994-2998.
2. Jeong, H. J.; Jeong, H. D.; Kim, H. Y.; Kim, J. S.; Jeong, S. Y.; Han, J. T.; Bang, D. S.; Lee, G. W., All-Carbon Nanotube-Based Flexible Field-Emission Devices: From Cathode to Anode. *Adv. Funct. Mater.* 2011, 21 (8), 1526-1532.
3. Xiao, G. Z.; Tao, Y.; Lu, J. P.; Zhang, Z. Y.; Kingston, D., Efficient fabrication of highly conductive and transparent carbon nanotube thin films on polymer substrates. *J. Mater. Sci.* 2011, 46 (10), 3399-3404.
4. Li, Z. R.; Kunets, V. P.; Saini, V.; Xu, Y.; Dervishi, E.; Salamo, G. J.; Biris, A. R.; Biris, A. S., Light-Harvesting Using High Density p-type Single Wall Carbon Nanotube/ n-type Silicon Heterojunctions. *Acs Nano* 2009, 3 (6), 1407-1414.
5. Chaudhary, S.; Lu, H. W.; Muller, A. M.; Bardeen, C. J.; Ozkan, M., Hierarchical placement and associated optoelectronic impact of carbon nanotubes in polymer-fullerene solar cells. *Nano Lett.* 2007, 7 (7), 1973-1979.
6. Sekitani, T.; Nakajima, H.; Maeda, H.; Fukushima, T.; Aida, T.; Hata, K.; Someya, T., Stretchable active-matrix organic light-emitting diode display using printable elastic conductors. *Nat. Mater.* 2009, 8 (6), 494-499.
7. Yang, S. Y.; Lozano, K.; Lomeli, A.; Foltz, H. D.; Jones, R., Electromagnetic interference shielding effectiveness of carbon nanofiber/LCP composites. *Compos. Pt. A-Appl. Sci. Manuf.* 2005, 36 (5), 691-697.
8. Das, N. C.; Maiti, S., Electromagnetic interference shielding of carbon nanotube/ethylene vinyl acetate composites. *Journal of Materials Science* 2008, 43 (6), 1920-1925.
9. Arsenault, E.; Soheilnia, N.; Ozin, G. A., Periodic Macroporous Nanocrystalline Antimony-Doped Tin Oxide Electrode. *Acs Nano* 2011, 5 (4), 2984-2988.
10. Chang, X. T.; Sun, S. B.; Li, Z. J.; Xu, X. A.; Qiu, Y. Y., Assembly of tungsten oxide nanobundles and their electrochromic properties. *Appl. Surf. Sci.* 2011, 257 (13), 5726-5730.
11. Lipscomb, L. D.; Vichchulada, P.; Zhang, Q.; Bhatt, N. P.; Lay, M. D., Methods for Enhanced Control over the Density and Electrical Properties of SWNT Networks. *J. Mat. Sci.* 2011, 46, 6812-6822.
12. Song, X. H.; Liu, S.; Gan, Z. Y.; Yan, H.; Ai, Y., Contact configuration modification at carbon nanotube-metal interface during nanowelding. *Journal of Applied Physics* 2009, 106 (12), 4.
13. Lu, R. T.; Xu, G. W.; Wu, J. Z., Effects of thermal annealing on noise property and temperature coefficient of resistance of single-walled carbon nanotube films. *Appl. Phys. Lett.* 2008, 93 (21).
14. Woo, Y.; Duesberg, G. S.; Roth, S., Reduced contact resistance between an individual single-walled carbon nanotube and a metal electrode by a local point annealing. *Nanotechnology* 2007, 18 (9), 7.
15. Ma, Y. F.; Cheung, W.; Wei, D. G.; Bogozi, A.; Chiu, P. L.; Wang, L.; Pontoriero, F.; Mendelsohn, R.; He, H. X., Improved conductivity of carbon nanotube networks by in situ polymerization of a thin skin of conducting polymer. *Acs Nano* 2008, 2 (6), 1197-1204.
16. Dong, L. F.; Youkey, S.; Bush, J.; Jiao, J.; Dubin, V. M.; Chebiam, R. V., Effects of local Joule heating on the reduction of contact resistance between carbon nanotubes and metal electrodes. *Journal of Applied Physics* 2007, 101 (2), 7.
17. Chen, C. X.; Liu, L. Y.; Lu, Y.; Kong, E. S. W.; Zhang, Y. F.; Sheng, X. J.; Ding, H., A method for creating reliable and low-resistance contacts between carbon nanotubes and microelectrodes. *Carbon* 2007, 45 (2), 436-442.
18. Ryan, P. M.; Verhulst, A. S.; Cott, D.; Romo-Negreira, A.; Hantschel, T.; Boland, J. J., Optimization of multi-walled carbon nanotube-metal contacts by electrical stressing. *Nanotechnology* 21 (4), 6.
19. Hu, A.; Guo, J. Y.; Alarifi, H.; Patane, G.; Zhou, Y.; Compagnini, G.; Xu, C. X., Low temperature sintering of Ag nanoparticles for flexible electronics packaging. *Appl. Phys. Lett.* 2010, 97 (15).
20. Yang, M. H.; Teo, K. B. K.; Milne, W. I.; Hasko, D. G., Carbon nanotube Schottky diode and directionally dependent field-effect transistor using asymmetrical contacts. *Appl. Phys. Lett.* 2005, 87 (25), 3.
21. Lu, C. G.; An, L.; Fu, Q. A.; Liu, J.; Zhang, H.; Murduck, J., Schottky diodes from asymmetric metal-nanotube contacts. *Appl. Phys. Lett.* 2006, 88 (13), 3.
22. Fuhrer, M. S.; Nygard, J.; Shih, L.; Forero, M.; Yoon, Y. G.; Mazzoni, M. S. C.; Choi, H. J.; Ihm, J.; Louie, S. G.; Zettl, A.; McEuen, P. L., Crossed nanotube junctions. *Science* 2000, 288 (5465), 494-497.
23. Nirmalraj, P. N.; Lyons, P. E.; De, S.; Coleman, J. N.; Boland, J. J., Electrical Connectivity in Single-Walled Carbon Nanotube Networks. *Nano Lett.* 2009, 9 (11), 3890-3895.
24. Ravi, S.; Kaiser, A. B.; Bumby, C. W., Improved conduction in transparent single walled carbon nanotube networks drop-cast from volatile amine dispersions. *Chem. Phys. Lett.* 2010, 496 (1-3), 80-85.
25. Xue, W.; Cui, T. H., Characterization of layer-by-layer self-assembled carbon nanotube multilayer thin films. *Nanotechnology* 2007, 18 (14).

26. Kane, A. A.; Sheps, T.; Branigan, E. T.; Apkarian, V. A.; Cheng, M. H.; Hemminger, J. C.; Hunt, S. R.; Collins, P. G., Graphitic Electrical Contacts to Metallic Single-Walled Carbon Nanotubes Using Pt Electrodes. *Nano Lett.* 2009, 9 (10), 3586-3591.
27. Okada, S.; Oshiyama, A., Electronic structure of semiconducting nanotubes adsorbed on metal surfaces. *Phys. Rev. Lett.* 2005, 95 (20), 4.
28. Heinze, S.; Tersoff, J.; Martel, R.; Derycke, V.; Appenzeller, J.; Avouris, P., Carbon nanotubes as Schottky barrier transistors. *Phys. Rev. Lett.* 2002, 89 (10), 4.
29. Tersoff, J., Contact resistance of carbon nanotubes. *Appl. Phys. Lett.* 1999, 74 (15), 2122-2124.
30. Chen, Q.; Yakovlev, N. L., Adsorption and interaction of organosilanes on TiO2 nanoparticles. *Appl. Surf. Sci.* 2010, 257 (5), 1395-1400.
31. Gamble, L.; Hugenschmidt, M. B.; Campbell, C. T.; Jurgens, T. A.; Rogers, J. W., Adsorption and Reactions of Tetraethoxysilane (TEOS) on Clean and Water-Dosed Titanium-Dioxide (110). *J. Am. Chem. Soc.* 1993, 115 (25), 12096-12105.
32. Matsuda, Y.; Deng, W. Q.; Goddard, W. A., Contact resistance properties between nanotubes and various metals from quantum mechanics. *J. Phys. Chem. C* 2007, 111 (29), 11113-11116.
33. Meng, T. Z.; Wang, C. Y.; Wang, S. Y., First-principles study of contact between Ti surface and semiconducting carbon nanotube. *Journal of Applied Physics* 2007, 102 (1), 4.
34. Zhang, Q.; Vichchulada, P.; Cauble, M. A.; Lay, M. D., Percolation in networks of aligned SWNTs formed with laminar flow deposition. *J. Mater. Sci.* 2009, 44 (5), 1206-1211.
35. Zhang, Q.; Vichchulada, P.; Lay, M. D., Effect of deposition conditions on percolation in single-walled carbon nanotube networks. *physica status solidi (a)* 2009, 9999 (9999), in press.
36. Vichchulada, P.; Zhang, Q.; Duncan, A.; Lay, M. D., Macroscopic Electrical Properties of Ordered Single-Walled Carbon Nanotube Networks. *ACS Appl. Mater. Interfaces* 2010, 2 (2), 467-473.
37. Zhang, Q.; Vichchulada, P.; Lay, M. D., Length, Bundle, and Density Gradients in Spin Cast Single-Walled Carbon Nanotube Networks. *J. Phys. Chem. C* 2010, 114 (39), 16292-16297.
38. Vichchulada, P.; Shim, J.; Lay, M. D., Non-Oxidizing Technique for Bulk Purification of Long, Undamaged Single-Walled Carbon Nanotubes *J. Phys. Chem. C* 2008, 112 (49), 19186-19192.
39. Vichchulada, P.; Cauble, M. A.; Abdi, E. A.; Obi, E. I.; Zhang, Q.; Lay, M. D., Sonication Power for Length Control of Single-Walled Carbon Nanotubes in Aqueous Suspensions Used for 2-Dimensional Network Formation. *The Journal of Physical Chemistry C* 2010, null-null.
40. Trionfi, A.; Scrymgeour, D. A.; Hsu, J. W. P.; Arlen, M. J.; Tomlin, D.; Jacobs, J. D.; Wang, D. H.; Tan, L. S.; Vaia, R. A., Direct imaging of current paths in multiwalled carbon nanofiber polymer nanocomposites using conducting-tip atomic force microscopy. *J. Appl. Phys.* 2008, 104 (8), 083708.
41. Chandekar, A.; Sengupta, S. K.; Whitten, J. E., Thermal stability of thiol and silane monolayers: A comparative study. *Appl. Surf. Sci.* 2010, 256 (9), 2742-2749.
42. Wang, J. P.; Sun, J.; Gao, L.; Wang, Y.; Zhang, J.; Kajiura, H.; Li, Y. M.; Noda, K., Removal of the Residual Surfactants in Transparent and Conductive Single-Walled Carbon Nanotube Films. *J. Phys. Chem. C* 2009, 113 (41), 17685-17690.
43. Kyung, S. J.; Lee, Y. H.; Kim, C. W.; Lee, J. H.; Yeom, G. Y., Effect of pretreatment on the deposition of carbon nanotubes by using atmospheric-pressure plasma-enhanced chemical-vapor deposition. *J. Korean Phys. Soc.* 2005, 47 (3), 463-468.
44. Dresselhaus, M. S.; Dresselhaus, G.; Saito, R.; Jorio, A., Raman spectroscopy of carbon nanotubes. *Physics Reports-Review Section of Physics Letters* 2005, 409 (2), 47-99.
45. Moonoosawmy, K. R.; Kruse, P., Cause and Consequence of Carbon Nanotube Doping in Water and Aqueous Media. *J. Am. Chem. Soc.* 2010, 132 (5), 1572-1577.
46. Ramesh, S.; Ericson, L. M.; Davis, V. A.; Saini, R. K.; Kittrell, C.; Pasquali, M.; Billups, W. E.; Adams, W. W.; Hauge, R. H.; Smalley, R. E., Dissolution of Pristine Single Walled Carbon Nanotubes in Superacids by Direct Protonation. *The Journal of Physical Chemistry B* 2004, 108 (26), 8794-8798.
47. Blackburn, J. L.; Engtrakul, C.; McDonald, T. J.; Dillon, A. C.; Heben, M. J., Effects of Surfactant and Boron Doping on the BWF Feature in the Raman Spectrum of Single-Wall Carbon Nanotube Aqueous Dispersions†. *The Journal of Physical Chemistry B* 2006, 110 (50), 25551-25558.
48. Flavel, B. S.; Yu, J. X.; Shapter, J. G.; Quinton, J. S., Electrochemical characterisation of patterned carbon nanotube electrodes on silane modified silicon. *Electrochim. Acta* 2008, 53 (18), 5653-5659.
49. Flavel, B. S.; Yu, J. X.; Shapter, J. G.; Quinton, J. S., Patterned attachment of carbon nanotubes to silane modified silicon. *Carbon* 2007, 45 (13), 2551-2558.
50. Roth, K. M.; Yasseri, A. A.; Liu, Z. M.; Dabke, R. B.; Malinovskii, V.; Schweikart, K. H.; Yu, L. H.; Tiznado, H.; Zaera, F.; Lindsey, J. S.; Kuhr, W. G.; Bocian, D. F., Measurements of electron-transfer rates of charge-storage molecular monolayers on Si(100). Toward hybrid molecular/semiconductor information storage devices. *J. Am. Chem. Soc.* 2003, 125 (2), 505-517.
51. Geng, H. Z.; Kim, K. K.; So, K. P.; Lee, Y. S.; Chang, Y.; Lee, Y. H., Effect of acid treatment on carbon nanotube-based flexible transparent conducting films. *J. Am. Chem. Soc.* 2007, 129 (25), 7758-+.
52. Matsuda, Y.; Deng, W. Q.; Goddard, W. A., Improving contact resistance at the nanotube-Cu electrode interface using molecular anchors. *J. Phys. Chem. C* 2008, 112 (29), 11042-11049.
53. Itkis, M. E.; Perea, D. E.; Jung, R.; Niyogi, S.; Haddon, R. C., Comparison of analytical techniques for purity evaluation of single-walled carbon nanotubes. *J. Am. Chem. Soc.* 2005, 127 (10), 3439-3448.

Example 3

Field-effect transistors (FETs) that incorporate single-walled carbon nanotube (SWNT) networks experience decreased on-off current ratios (Ion/Ioff) due to the presence of metallic nanotubes. The present disclosure describes a method to increase Ion/Ioff without the need for either specialized SWNT growth methods or post growth processing to remove metallic nanotubes. SWNTs that were grown using conventional arc discharge methods were deposited from aqueous suspension. Then, the SWNTs in the network were decorated with $Cu_2O$ nanoparticles that acted as controllable valves that restricted current flow at positive gate voltages. This resulted in an unprecedented reduction in Ioff, as about sub-10 nm sized electrodeposited nanoclusters acted as numerous tunable valves, providing greatly improved network sensitivity to gate voltages in the relatively small range of about ±5 V. Larger nanoclusters were found to increase network conductivity, but not Ion/Ioff. The ability to convert metallic SWNTs to semiconducting without removing them allows for enhanced $I_{on}$, and lower noise while still achieving greater magnitudes of $I_{off}$.

Introduction

Pristine, individual single-walled carbon nanotubes (SWNTs) have excellent electrical properties that far exceed those of semiconductors and metals currently used in microchip manufacturing. Depending on chirality and diameter, individual SWNTs may be semiconductive (s-SWNT) or metallic (m-SWNT). For s-SWNTs, the electron mobility is orders of magnitude greater than that for Si and GaAs.[1] While in m-SWNTs, the mean free path for an electron can exceed about 2 μm, making them prime candidates for use as electrical interconnects. Additionally, since conduction occurs via an extended π bonding network, they are not susceptible to electromigration, the movement of metal nuclei in response to momentum transfer from electrons during current flow. This is an increasingly significant failure mechanism as device structures decrease in size.[2] Therefore, both varieties of SWNTs have great potential in many microelectronics applications.

However, significant challenges remain for developing manufacturable electronic materials that make use of an individual SWNT as the active component, as one of the most notable characteristics of SWNTs is their polydispersity: for bulk growth processes, $\frac{1}{3}^{rd}$ are m-SWNTs, while the other $\frac{2}{3}^{rd}$ are s-SWNTs. Approaches to dealing with this problem include attempts at selective growth of s-SWNTs,[3-5] or post growth solution processing to remove m-SWNTs.[6-9] Even amongst s-SWNTs, the band gap varies with diameter and chirality from near 0 to about 1.8 eV. Therefore, even after the separation of SWNTs based on their type of electrical conductivity, widely varying band gaps remain in the semiconductive portion, causing semiconductor device structures formed from individual SWNTs to be highly irreproducible. Additionally, the current drive through an individual SWNT is limited to the nA range, while higher current drives are needed by modern electronic devices. Further, device structures based on individual SWNTs will require significant advances in the ability to control the length, orientation, and location of SWNTs during their growth or deposition.

Therefore, 2-D SWNT networks are the proximate route to their widespread use. In a 2-D array, the nanotube density and alignment largely dictate performance. Also, multiple SWNTs connected in parallel provide orders of magnitude more current than an individual SWNT. Further, unlike Si-based electronic materials, SWNT networks have great potential in transparent, lightweight, and flexible electronic materials, especially as new aqueous suspension-based deposition methods are developed for the polymer substrates used in these applications.

A drawback to the use of SWNT networks is their greatly reduced performance, relative to that observed for single-SWNT systems. This reduced performance is due to several factors that are addressed in the present disclosure: (i) Inter-device precision is low in field-effect transistors (FETs) based on SWNT networks in part because changes in the Schottky barrier height between s-SWNTs in direct contact with the metal source and drain electrodes dictate much of the response to the gate voltage ($V_g$),[10-12] leaving the semiconductive channel largely unaffected. Also, the OFF-state current of SWNT network-based FETs is limited by the presence of the metallic pathways provided by m-SWNTs and small band gap s-SWNTs, since they are largely unaffected by $V_g$. These effects combine to increase the OFF-state source/drain currents in SWNT-based devices, greatly reducing their energy efficiency. (ii) Due to the inter-SWNT tunnel junctions that must be traversed in a network, their electron mobility decreases up to three orders of magnitude, relative to that for individual nanotubes.[1,13] (iii) The poor attractive forces between metals and the π bonding network in nanotubes results in non-Ohmic contacts, increasing contact π and thereby reducing the level of ON-state current efficiency that can be achieved at a given source/drain voltage, reducing the ON-STATE/OFF-STATE current ratio ($I_{on}/I_{off}$). The approach to overcoming these three challenges is described in detail below.

To address issues related to the variability in conduction for SWNTs (i), electrodeposition was used to form numerous $V_g$-tunable contacts composed of high work function nanoclusters along the SWNT sidewalls. This facilitated much greater coupling between the nanotube network and $V_g$, as occurs in conventional Si-based FETs, allowing several orders magnitude in the reduction of $I_{off}$ that could be achieved. This was facilitated by decorating the network with nanoclusters of the high work function species $Cu_2O$ (φ=about 4.9 eV).[14] This value is slightly higher than the experimentally determined work function of about 4.6-4.8 eV for SWNT films.[15] High work function adsorbates withdraw electron density from s-SWNTs at the point of contact, increasing their band gap on a local level and increasing their sensitivity to gate voltages. $Cu_2O$ is readily formed via electrochemical methods and has been widely investigated for use in solar cells,[16,17] sensors[18,19] and catalysis.[20,21] The π network in SWNTs is strongly affected by molecular adsorbates, with a molecular electron-withdrawing species increasing the nanotube's semiconductive character by increasing its band gap on a local level.

The present disclosure also teaches that a band gap can be opened in m-SWNTs, obviating the need to separate them from s-SWNTs before network formation. This will greatly simplify network formation and optimization. In fact, OFF-state source/drain leakage currents were greatly reduced, facilitating an about 211-fold increase in $I_{on}/I_{off}$. As the effect of metallic pathways on Ioff is reduced, networks of increased density may be deposited without sacrificing $I_{on}/I_{off}$, facilitating the advantages in reproducibility and current drive provided by greater numbers of SWNTs.[22] This apparent conversion of m-SWNTs is attributed to the fact that they are not true metals, but in fact zero band gap semiconductors, or semimetals, like graphene.[23,24] Therefore, our deposition method for metal oxide nanoclusters is an effective way to open a band gap in m-SWNTs by inserting a point where conductivity can be controlled along an otherwise conductive nanotube.[25]

The inter-SWNT tunnel junction (ii) is unique to network devices. At these junctions, surface-bound SWNTs have a slightly increased contact area to each other due to a slight deformation of the tubes caused by van der Waals attractions. However, since the tunneling probability for an electron decays exponentially with distance, the 3.5 Å van der Waals spacing between crossed nanotubes presents a non-trivial barrier. Additionally, Schottky barriers between m- and s-SWNTs present numerous high-R barriers in a network.[26-28]

In the present disclosure, inter-SWNT R was reduced by depositing low-defect, unbundled nanotubes in a manner that allowed control over the density and alignment of SWNTs in the network. Inter-SWNT R is greatly increased for a network comprised of bundles of nanotubes, compared to individuals.[29] Therefore, a new method for producing suspensions of unbundled high aspect ratio SWNTs and depositing them without allowing bundle formation,[30] while maintaining strict density control over the network during all states of its formation[31,32] was employed. Density control is important because as density increases, conductivity, current drive, in $I_{on}/I_{off}$, and reproducibility increase. However, at very high nanotube density, the electron mobility and in $I_{on}/I_{off}$ begin to decrease due to bundle formation and charge shielding.[33] Further, this deposition method allowed large number of SWNTs to be deposited either in a random orientation, or with partial alignment.[34] The ability to increase the SWNT alignment allowed the number of inter-SWNT tunnel junctions to be reduced, maximizing the advantages in electron mobility provided by the SWNT.

Recent computational studies by Li and Marzari found that while the inter-SWNT van der Waals distance is 3.5 Å, the C-transition metal atom distance is 2.4 Å.[35] This is a significant reduction in distance, considering the exponential dependence of tunneling current on barrier distance. They also reported that the Cu—C bond was found to have a very low binding energy (0.38 eV), due to the full d-orbitals in Cu, and that transition metals with low binding energies with C had greater quantum conductance near the Fermi level between crossed s-SWNTs. Therefore, the electrodeposition of randomly distributed Cu-containing nanoparticles produces nanoparticles that fortuitously bridge inter-SWNT junctions and reduce inter-SWNT R by reducing the tunneling barrier height between s-SWNTs, and the Schottky barrier height between m-SWNTs and s-SWNTs.

Optimizing electron transfer across heterojunctions (iii), is an important consideration for incorporating any nanomaterial into conventional device structures. For SWNTs, this is complicated by difficulties with forming low-resistance metal-C bonds due to the poor "wetting" of $sp^2$-hybridized C by most transition metals, and Schottky barriers between s-SWNTs and metals.[36] This reduced attraction between metals and SWNTs leads to an increased electron tunnel barrier, increasing the R between source and drain contacts. An additional obstacle to interfacial transport is presented by the semiconductive variety of SWNTs, due to the formation of a Schottky barrier at their contacts to metal electrodes severely limiting the transistor ON-state current $I_{on}$.

Interfacial R was reduced as electrodeposited nanoclusters effectively nanosoldered the metal/SWNT junctions, providing an increased contact area to all SWNTs, and a reduced Schottky barrier height to s-SWNTs. The reduced C-transition metal atom distance expected for the Cu oxides allowed them to act as low resistance "shunts" that facilitated electron transfer from/to metal source and drain electrode pairs. This addresses a critical concern, as interfacial contacts often dictate the electrical properties of SWNT-based systems, rather than the enhanced properties of nanotubes.[37]

Previous efforts to reduce the interfacial R between SWNTs and metals often involve high temperature annealing. For example, chemical reactions between SWNTs and various metal carbides were driven at temperatures above about 900° C. to form nanotube-carbides, reducing R to about ¼[th] of its original value.[38] In another instance, resistive heating of a gold electrode was used to effect "local melting," in order to embed multi-walled carbon nanotubes (MWNTs) into the electrodes.[39] The R was reduced by 60%, with the effect being attributed to increased interfacial contact area to the MWNT. A 5-fold increase in current was also achieved by using the electron beam in a scanning electron microscope to solder MWNTs to Au electrodes by decomposing a gas phase gold-C precursor.[40]

As discussed above, controlled chemical oxidation, followed by annealing at just about 300° C. could greatly improve conductivity in SWNT networks.[41] The order in which the various device structures were formed played a role in the extent to which R could be reduced during post-fabrication treatments. When electrical contacts were deposited on top of pre-existing networks, a moderate level of R reduction was observed. This indicates that if the metal/SWNT contacts are closed to further chemical reactions, the only reduction in R observed is that due to the enhanced inter-SWNT contacts formed during annealing. This was confirmed by Raman microscopy, which indicated a reduction in the density of sidewall defects in SWNTs, and desorption residual dopants. However, when the network was deposited on top of prefabricated Ti electrodes, an about 13-fold reduction in R and an about 18-fold increase in the Inter-device precision could be ascribed to the formation of "molecular anchors" at the inter-SWNT and metal/SWNT junctions. Evidently, the large contact area over which there was chemical access to the metal/SWNT interface, relative to device structures with nanotubes buried in metal electrodes, allowed for greater optimization of the interface. The chemical access provided by depositing SWNTs onto prefabricated Ti electrodes provides a unique opportunity to use electrodeposition to increase electronic transport.

Ti electrodes were formed on a variety of silica-terminated surfaces. SWNTs do not readily adhere to native silica or Ti surfaces. However, the native oxide that formed on Ti in air resulted in a titania-terminated surface, which like silica was amenable to modification via self-assembled monolayer formation by a silane. Therefore, all surfaces were treated with a silanization agent to form a self-assembled monolayer that served as an adhesion layer. Then, electrodeposition was used to form conductive shunts through the silane and the native $TiO_x$ adlayers, bridging the gap between SWNTs and the conductive Ti below. To simplify the discussion of the titania surfaces, they will be referred to as $Ti/TiO_x$. Although $Ti/TiO_x$ was used, one skilled in the art would understand that this method can significantly improve interfacial electron transport between SWNTs and other metals that form native oxides, like Al, Ta, Ni and various ferrous systems. $Cu^{2+}$ was used for electrodeposition since its oxides form readily in an electrochemical environment, and they are p-type, wide band gap semiconductors, like SWNTs. Also, the copper oxides have high work functions, which allow them to serve as electron withdrawing dopants when in direct contact with nanotubes.

The electrochemical nanosoldering method described in this manuscript is a room temperature, inexpensive, and facile route to obtaining great gains in conductance and in $I_{on}/I_{off}$ since it specifically decorates the SWNTs and metal electrodes with nanoclusters of controllable size distributions. This is facilitated by control over the magnitude of the driving force for the metal deposition (via the electrochemical potential), and precise control over the average size of the nanoparticles (via the charge that is allowed to pass). Further, electrodeposition is a non-line-of-sight deposition method that prohibits deposition on nonconductive parts of the surface, allowing preferential deposition on individual SWNTs dispersed on insulating substrates. These abilities provide distinct advantages over physical vapor deposition methods, which indiscriminately deposit molten metal nanoparticles over the entire sample.

Experimental Details

Substrate Preparation

A dual-filament thermal evaporator (Thermionics), operating under high vacuum ($P<1\times10^{-6}$ torr), was used to deposit about 150 nm of Ti (99.995% pure, ⅛" diameter pellets, Kurt J. Lesker Company) onto either Ti-coated glass slides or photoresist-coated, lithographically patterned $Si/SiO_x$ wafers. Then, the substrates were cleaned with a compressed $CO_2$ snow-jet. The entire samples, including the $Ti/TiO_x$ electrodes were modified with a silane monolayer that served as an adhesion layer for the SWNTs.[30,31] Briefly, samples were immersed for about 45 min. in a solution of 10 mM 3-(aminopropyl)triethoxysilane (3-APTES, 99%, Aldrich) in ethanol (99.5%, absolute 200 proof, ACROS). Next, the samples were cleaned in a stream of fresh ethanol and then water. In order to ensure that excess layers of the silane were removed, the surfaces were cleaned with compressed $CO_2$ from a snow-jet as this has proven effective for removing excess silane, leaving only a strongly bound monolayer on the surface.[42]

For testing the effect of nanocluster formation on SWNT network FETs, source and drain electrode pairs were formed using standard optical lithography methods. UV-light exposure through a patterned quartz mask was used to project the pattern for the electrodes onto photoresist-coated Si/SiOx wafers. This was followed by Ti physical vapor deposition and photoresist lift-off to yield about 150 nm-thick source/drain electrode pairs on top of an about 500 nm thick dielectric $SiO_x$ layer. Prior to SWNT network deposition, these samples were modified with a silane layer, as described above.

SWNT Suspension and Network Formation

Arc discharge soot (AP grade, Carbon Solutions, Inc.) was dispersed into an aqueous 1% sodium dodecyl sulfate (SDS, J. T. Baker) solution via probe ultrasonication (Fisher Model 500) at a power density of about 0.4 W/mL. These conditions are effective at forming stable suspensions of high aspect ratio SWNTs, while minimizing sonication induced damage to the nanotube sidewalls. Next, a low relative centrifugal force (RCF) processing method was used to separate the undamaged, high aspect ratio SWNTs from amorphous C and residual catalyst contaminates.[30]

A SWNT network formation method that uses iterative deposition cycles to grow a network from the bottom up, while avoiding SWNT bundle formation was used.[34] To deposit reproducible densities of unbundled SWNTs bridging the electrodes, the silanized surfaces were wet with a purified SWNT suspension and immediately dried in a unidirectional stream of $N_2$ and rinsed with copious amounts of $H_2O$. This deposition cycle was repeated about eight times for all samples to build networks that were composed of similar densities of unbundled SWNTs.[31,32,34] For samples designated "aligned," one drying direction was used to deposit SWNTs, while for "crossbar" samples an equal number of orthogonal drying steps were used. The initial R, prior to electrochemical experiments, for all samples was about 1 MΩ.

Electrochemical Setup

In order to determine the effect of the area of the SWNT network relative to the contact area provided by the metal electrodes ($A_{network}/A_{Ti}$) on the electrochemical response and change in two-terminal R, samples of various dimensions were analyzed in either sealed glass beakers, or homemade glass electrochemical cells, as described below. The glass cells employed a Viton gasket at the bottom that restricted the working electrode area to an about 1.0 cm diameter disk. All cells were purged with high-purity $N_2$ for at least about 30 minutes prior to all experiments. Solutions were comprised of about 0.1 M $CuSO_4$ and 0.5 M $H_2SO_4$ (Aldrich) in ultrapure water (18.2 MO, Millipore). Standard three-electrode electrochemical cells, with each sample serving as the working electrode, were connected to a potentiostat (CH Instruments, 600C), with a Au wire serving as a counter electrode, and a Ag/AgCl reference electrode (3 M KCl, BASi). A scan rate of about 50 mV/s was used for all cyclic voltammetry (CV).

Analytical Methods

Atomic force microscopy (AFM) was performed in air using intermittent contact mode (Molecular Imaging, Pico-Plus). To determine the effect of various electrodeposition conditions on the density and height of the nanoclusters, at least about five areas of each sample were analyzed with AFM image analysis software (WSxM, v5.0).[44] Raman spectroscopy (Thermo Scientific, DXR SmartRaman) was performed on samples using a 532 nm laser excitation source with 5 mW intensity at the sample, 100× objective, and a charge-coupled (CCD) detector. A semiconductor characterization system (Keithley, 4200SCS) and probe station (Signatone, 5-1160A) were used to ascertain the effect of nanoparticle size on two-terminal R and transistor performance.

Results and Discussion

Electrochemistry of $Cu^{2+}$ on $Ti/TiO_x$ Surfaces

The about 20 Å thick native oxide that spontaneously forms on fresh Ti surfaces is largely comprised of $TiO_2$, which is essentially an insulator having a band gap of about 3.7 eV.[45] Crystalline forms of this passivation layer are of interest as a dielectric material in electronic device structures.[46] Thermal evaporation was used to form amorphous Ti layers with native oxides that were highly inhomogeneous, characterized by numerous grain boundaries and defects. Previously reported conductive atomic force microscopy (C-AFM) studies of polycrystalline $Ti/TiO_x$ electrodes demonstrated that grain boundaries between crystals in the underlying Ti exhibit more than an about 200-fold increase in conductivity compared to $TiO_2$ layers over crystal facets.[47,48] They were only able to estimate the size of these conductive hotspots at about <50 nm, due to the resolution limits imposed by the C-AFM probe. The electrochemical response of Ta electrodes (terminated by an about 25 Å thick native oxide) was also found to be defined by similar microscopic electrochemically active low-valence-oxide defects in a largely dielectric layer.[47]

In the case of the Ti surfaces described herein, low valence Ti oxides ($Ti_2O_3$ and nonstoichiometric TiO) existed as shunts through the dielectric $TiO_2$ adlayer. Metallic conduction is observed for the nonstoichiometric Ti oxides which have a Ti/O ratio of about 0.8 to 1.7.[49] The amorphous $Ti/TiO_x$ surfaces used in these studies are expected to have numerous sub-nm sized electrochemically active hotspots that represent conductive shunts to the underlying Ti. These shunts, when electrically connected to SWNTs, provide a valuable route to reducing the interfacial R in device structures.

The $TiO_2$ oxide caused the $Ti/TiO_x$ samples to have a smaller electrochemically active surface area, as the conductive defects acted as an array of connected nanoelectrodes. This resulted in the nucleation and growth of numerous nanoparticles, rather than the formation of the conformal monolayers observed on noble metals. $Ti/TiO_x$ surfaces were investigated at every step of the surface preparation process as follows (FIG. 17A): the unmodified $Ti/TiO_x$ surface, the silane-modified $Ti/TiO_x$ surface ($TiO_x$/silane), and the silane-modified $Ti/TiO_x$ surface in the presence of adsorbed SWNTs ($TiO_x$/silane/SWNTs).

Figure 17A:
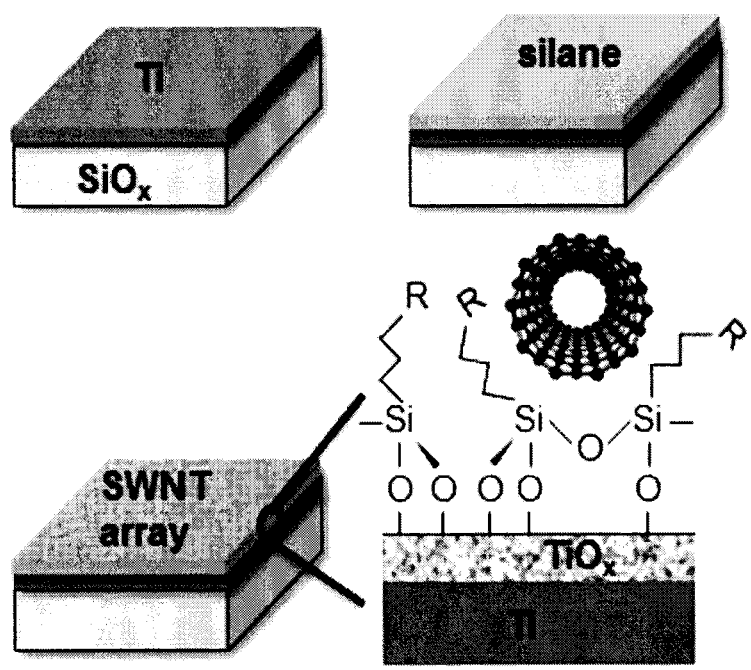
Figure 17B:
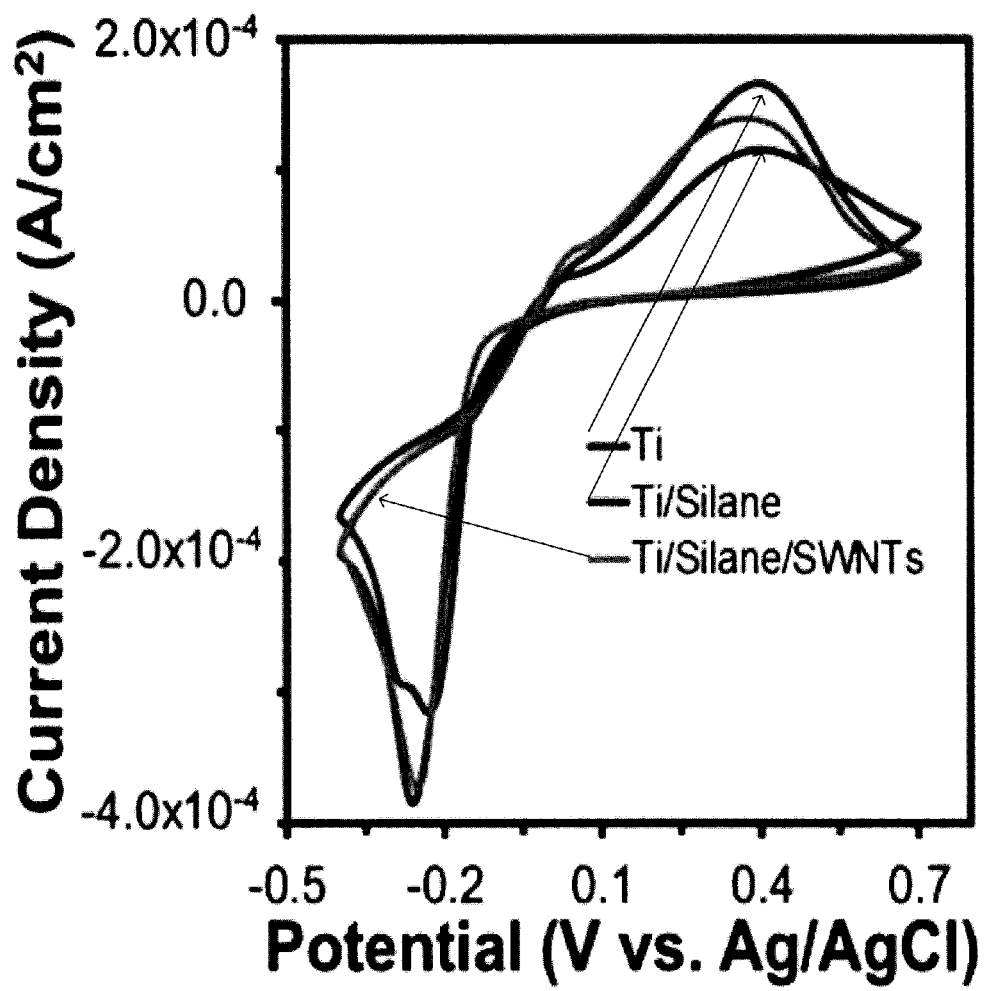

Numerous $Ti/TiO_x$ samples were prepared as described above and mounted in a cell that restricted the electrochemically active area to about 3.14 $cm^2$. Freshly made samples were used for each electrochemical experiment and AFM analysis of deposits demonstrated that the density of nucleation points was similar for all samples of Ti/TiO$_x$. As each CV started at the open circuit potential, about 0.315 V, and progressed at about 50 mV/s in the negative (cathodic) direction, a large peak between about −0.20 and −0.30 V corresponded to the reductive deposition of copper oxide nanoclusters (FIG. 17B). The TiO$_x$/silane/SWNTs samples had increased electrochemical current for these cathodic waves, relative to the TiO$_x$/silane samples. Evidently, the presence of the highly conductive SWNTs provided an increased density of nucleation points, resulting in the deposition of greater densities of nanoparticles, and commensurately higher current.

Each cathodic scan ended at about −0.4 V, where the scan direction was reversed, and an anodic scan (toward positive potentials) began. Initially, the magnitude of reductive current remained high enough to cause each anodic curve to cross the cathodic scan at two points, near about −0.16 and 0.02 V. While this behavior would be unusual for the electrodeposition of a conformal layer on a flat, noble metal surface, it is commonly observed for electrodeposition on metal oxide-terminated surfaces. Such crossover points are caused by nucleation and growth processes enhancing the electrode area, and thus the deposition current.[50,51]

As the anodic scans continued, large waves around about 0.4 V represented the oxidation of Cu$_2$O to form CuO$_{(s)}$. For the Ti/TiO$_x$ samples, the amount of charge flow was about 9,539 and 1,300 mC in the cathodic, and anodic waves, respectively. The larger magnitude of anodic current indicated that the CuO remained stable on the surface. The oxidative dissolution of CuO was not observed since potentials positive enough to facilitate this would have further oxidized the Ti/TiO$_x$ surface,[50,52] increasing the thickness of its native oxide and the interfacial R between the SWNTs and electrode. The amount of current for the deposition of nanoparticles decreased notably for the TiO$_x$/silane samples, relative to the Ti/TiO$_x$ samples. This was due in part to the silane effectively reducing the active electrode area by inhibiting access to the conductive shunts in the Ti/TiO$_x$ surface.

Figure 17C:
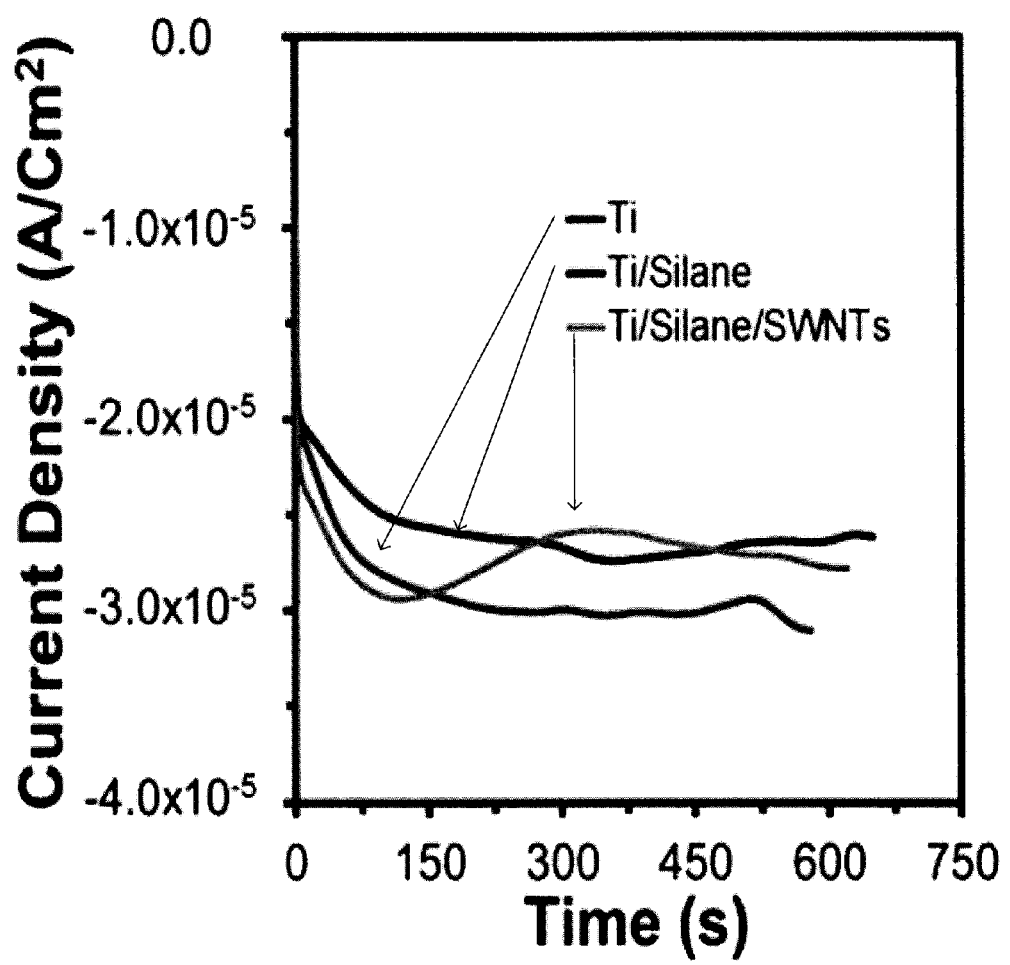

After CV revealed the potentials at which nanoparticle deposition occurred, constant potential deposition (chronoamperometry) at about 0.10 V vs. Ag/AgCl was used to obtain information about the reaction rate on each surface. The amount of charge allowed to flow was limited to about 16.7 mC for each surface, as this allowed the growth of nanoparticles of sufficient size to be characterized with AFM, as discussed subsequently. As about 0.10 V is just negative of the equilibrium potential (about 0.35 V), the reaction rate was slow and the shape of the extended i vs. t curves could be examined (FIG. 17C). The Ti/TiO$_x$ samples had the highest current density, followed by the TiO$_x$/silane samples due to inhibition of electron transfer caused by the silane monolayer, as observed for CVs. However, the TiO$_x$/silane/SWNT samples differed markedly with respect to the other samples, as the i vs. t curves had a sigmoidal shape that indicated that the initial nucleation process was enhanced. Then, the current reached a brief diffusion-limited regime that was followed by a broad wave of increasing current density. Additional experiments revealed that this increase in current continued indefinitely for the TiO$_x$/silane/SWNT samples.

Metals that are not terminated by oxide layers (i.e., Au, or Pt) typically have i vs. t traces with an initial spike in current, followed by an extended region of steady-state current. This initial current spike is due to the charging of the electric double-layer and the immediate reaction of electroactive species at the electrode's surface, while in the steady-state region, deposition is limited by the rate of diffusion of the analyte to the electrode. Alternatively, unique chronoamperometric current transients are often observed during electrodeposition at heterogeneous metal oxide surfaces,[53] where an initial spike in current indicates instantaneous nucleation. This is followed by a broad sigmoidal feature that is typical of progressive nucleation (the density of nucleation sites increases with time), in addition to growth, resulting in continually increasing current density. This sigmoidal feature is typically observed at high driving forces (more negative potentials) for the reaction, so its observation for the TiO$_x$/silane/SWNT samples indicated that the SWNT enhanced the nucleation process. Then, at longer deposition times continually increasing current is expected due to the continuously increasing electrode area.

Figure 17D:
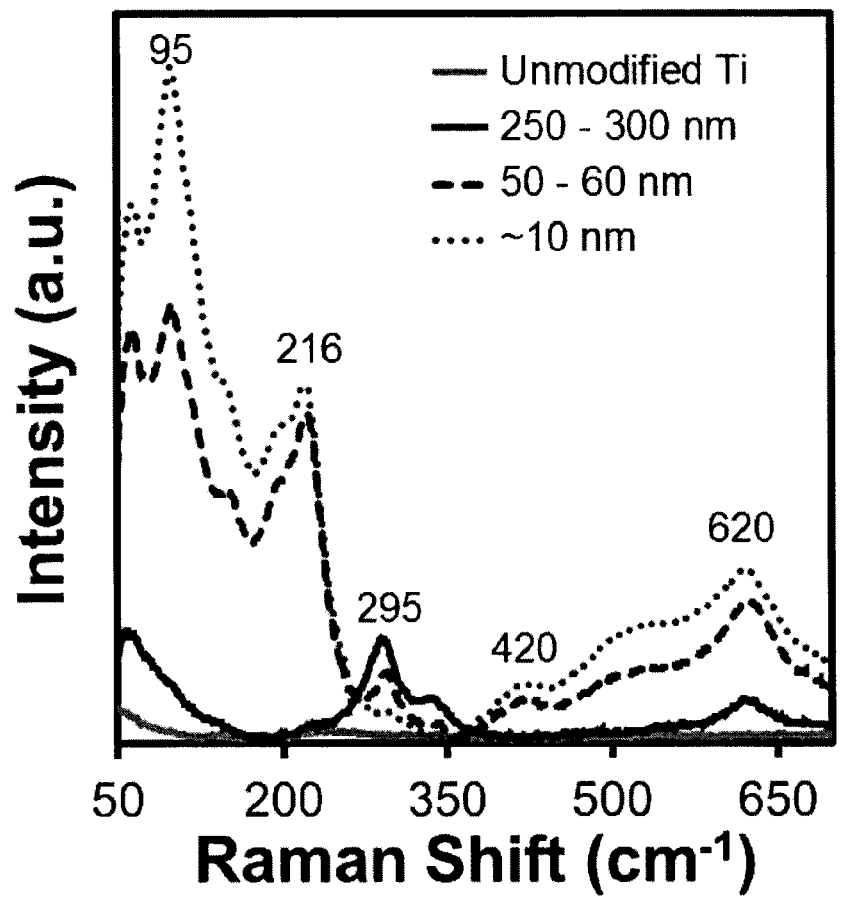

Electrodeposited Cu microstructures are known to exist as composites of Cu, Cu$_2$O, and CuO, with Cu$_2$O being the dominate species.[54,55] In the present disclosure, Raman microscopy indicated that the nanoparticles existed as Cu$_2$O, CuO, or Cu nanoparticles for small, intermediate, and large charge densities, respectively (FIG. 17D). For electrodeposition on Ti/TiO$_x$ substrates, size gradients were observed for the nanoparticles, with the size decreasing with increasing distance from the point of contact for the working electrode. This can be attributed to the electrical resistance in the Ti/TiO$_x$ samples caused by numerous grain boundaries in these amorphous samples, and the various inclusions and defects at the surface. For the smaller nanoparticles, confocal Raman spectra had peaks expected for scattering at phonons in Cu$_2$O, at 95, 216, and 420 cm$^{-1}$.[18,56] As the size of the nanoclusters increased, these peaks decreased in intensity and a wave at 295 cm$^{-1}$, indicative of CuO,[57] increased in prominence. Cu$_2$O and CuO have overlapping Raman active phonons at 620 cm$^{-1}$. While an observable spectrum was not obtainable for the sub-10 nm clusters that were deposited in these studies, they are assumed to be largely composed of Cu$_2$O.

The inhomogeneous nature of the native oxide layer in these samples resulted in conductive TiO and Ti$_2$O$_3$ shunts through the nonconductive TiO$_2$ adlayer. TiO, in particular, exhibits metallic conduction,[58] but defects at grain boundaries in these samples also provided conductive shunts to the underlying Ti. The examination of numerous Ti/TiO$_x$ deposits with AFM allowed visualization of the density of conductive shunts, as evidenced by the presence of nanoparticles (FIG. 18). A histogram of the height information obtained in every pixel of the image, or z-range, revealed that the average height increased from about 6.83 nm (image not shown), to about 20.69 nm, with a maximum height of about 115.27 nm.

For the TiO$_x$/silane samples, a larger density, but smaller size of nanoparticles was observed under identical deposition conditions. Also, their spatial distribution decreased, with closely spaced clusters appearing throughout each AFM image (FIG. 19). The average height in this representative image decreased to about 13.97 nm, with a maximum of about 84.51 nm. These observations can be explained by the silane monolayer acting as a defect-prone dielectric atop the conductive shunts in the electrode, increasing the electrode/electrolyte separation by about 7 Å,[59] the monolayer thickness for 3-APTES. Due to the surface roughness of the Ti/TiO$_x$ samples, the silane was expected to have few crosslinkages between monomers and to be characterized by a high defect density. This resulted in a larger number of smaller diameter conductive pinholes through the silane, which were revealed by the location of the nanoparticles. This resulted in closely spaced clusters of smaller Cu$_2$O nanoparticles, relative to those observed on the Ti/TiO$_x$ surface.

While the presence of a silane monolayer inhibited electrodeposition on Ti/TiO$_x$, the TiO$_x$/silane/SWNT samples had much larger nanoparticles, with many observed to preferentially deposit the sidewalls of the nanotubes (FIG. 20). The average height observed in a representative image increased from about 13.97 for the TiO$_x$/silane samples, to about 18.85 nm, with a maximum of about 111.11 nm. AFM image analysis software allows the estimation of the volume occupied by the nanoclusters by multiplying the distance information obtained for the x, y and z data for each point higher than about 1 nm across the surface. As the same charge and electrochemical conditions were used to form these three types of deposits, they are expected to have similar amounts of material deposited, despite their clear differences in morphology. Analyzing the volume occupied by these nanoclusters provides insight into the effect of surface properties on the charge efficiency for deposition on each surface. The volume occupied by deposits for the three surfaces were about 1.3, 0.83, and 1.1 μm$^3$, for the Ti/TiO$_x$, TiO$_x$/silane, and TiO$_x$/silane/SWNT surfaces, respectively. The decreased amount of nanoclusters on the TiO$_x$/silane samples may be attributed in part to strong silane/surface bond disrupting the local oxidation state of the Ti/TiO$_x$ surface, thus increasing the density of conductive shunts. Also, the silane monolayer increased the distance between the electrolyte/electrode interface. This would effectively decrease the interfacial capacitance and result in the need for greater charging current to achieve the applied electrochemical potential, decreasing the current efficiency for nanoparticle formation. This effect is expected to be lessened for the TiO$_x$/silane/SWNT samples since the nanotubes provided a high capacitance electrode through which more efficient electrodeposition could occur. The formation of these conductive nanoclusters presents an important opportunity to reduce the interfacial R caused by the weak attraction between sp$^2$ hybridized C and metal electrodes.

Electrochemistry of SWNT Networks

In order to investigate the effect of the electrodeposition of nanoparticles on the two-terminal R of networks, an SWNT network was deposited across two Ti/TiO$_x$ electrodes that were bridged by an insulating glass substrate (FIG. 21A). This configuration approximates that of the source and drain electrodes found in field-effect transistors. The devices were constructed so that two Ti/TiO$_x$ electrodes with a combined area of about 1.5 cm$^2$ were separated by an about 1.0 cm insulating gap with an area of about 2.5 cm$^2$. After each sample was silanized, a network comprised of similar densities of either partially aligned or crossbar oriented SWNTs was deposited. Finally, electrodeposition at about 0.10 V was performed until a total charge of about 16.7 mC passed (FIG. 21B). The aligned network reached this charge at about 2,908 s, while the crossbar network required only about 2,026 s. Chronoamperometry curves for the two types of networks differed, with the crossbar networks having higher current densities.

At the instant a macroscopic planar electrode is polarized to a potential at which an electroactive species is reduced, there is a spike in current as the electroactive species in the immediate vicinity of the electrode is consumed. Then, the magnitude of the current decays until a steady-state level is reached. This decay in current is described by the Cottrell equation,[60]

$$i=nFACD^{1/2}\pi^{-1/2}t^{-1/2}$$

where i is current, n is the number of electrons transferred per electroactive ion or molecule, F is Faraday's constant, A is the area of the electrode, C is the bulk concentration of the electroactive species, D is its diffusion coefficient, and t is the time in seconds. This equation demonstrates how the diffusion limited current decays as a function of the inverse square root of time as the other factors are constants. Then, a plot of i vs. t$^{1/2}$ is expected to lead to a linear regression with a current that approaches zero at very long times. Even though the Ti/TiO$_x$ electrodes are electrochemically active only at the conductive shunts through the TiO$_2$ adlayer, at long times (i.e., small values of t$^{-1/2}$) they behaved as planar macroscopic electrodes of an area that included the shunts and insulating part of the surface as the diffusion layers for each conductive shunt grew and overlapped to form one large zone from which the Cu$^{2+}$ could diffuse[61] The slight non-linearity at long times is due to convective currents. However, at short times, the current density was affected by the much smaller diffusion fields that surrounded each conductive shunt, reducing the effective area of the electrode. Also, at short times, capacitive currents (non-Faradaic) contribute significantly to the current response as the volume of electrolyte that contributes to them are much larger than the diffusion layer. However, at longer times, the capacitive currents decay exponentially, while the diffusion layer grows to encompass a larger volume. So at short times, the current essentially represents the combined area of the each isolated shunt, and non-Faradaic processes, while at longer times, the current is more indicative of the diffusion-limited reduction of Cu$^{2+}$ at a homogeneous macroscopic planar electrode.

Comparison of the regressions for the SWNT networks and the Ti/TiO$_x$ electrodes at long times provides a clear indication of the difference in electrochemical performance of the two systems. The Cottrell equation assumes that planar diffusion is the only significant contributor to mass transport.

However, the current response of an SWNT array approximates that of an array of interconnected nanoscaled cylindrical nano-electrodes, where hemispherical diffusion dominates. Further, although the entire electrode is conductive, the reduction of Cu$^{2+}$ only occurs at electrochemically active defect sites. Therefore, hemispherical diffusion is responsible for mass transport to these isolated active sites. The small potential, relative to the equilibrium potential, applied in these studies resulted in the diffusion-limited regime not being achieved for the networks, resulting in a linear response curves. Unlike the case for planar diffusion at a macroscopic electrode, hemispherical diffusion is characterized by continuing growth of the diffusion layer, allowing each defect site to draw from an ever-expanding zone of the bulk solution. Then, at long times, convection currents in the solution begin to result in the increase in current observed for 0<t$^{-1/2}$<1.3 s$^{-1/2}$. The effect of convective currents is more pronounced for the SWNT network electrodes because of their ever-expanding diffusion zone. This situation can be described by the equation $$i=nFACD^{1/2}\pi^{-1/2}t^{-1/2}+2nFACDr^{-1}\ln(4Dtr^{-2})^{-1}$$

where r is the radius of the electrode. Then, the first term is important at very short times, when planar diffusion dominated, and the second term describes the steady-state current observed at long times, when hemispherical diffusion dominated. As the radius of the electrode decreases to the nm-regime, the time it takes the second term to dominate, and thus the time to reach a steady state, is very short and a steady state current is observed for much of the plot.

Electrochemical Growth of Nanoclusters on SWNT Networks

The reduction of defect density in suspension processed SWNTs is an important consideration for their ultimate use in electronic and structural materials. Recently, Fan and coworkers found that 3.5 M HCl treatments increased sidewall defect density at a rate of about 1/μm/hr for chemical vapor deposition-grown nanotubes, and that suspension processed arc discharge SWNTs had a defect density exceeding 1 per 100 nm, due to the harsh ultrasonication and acid treatments used to suspend and purify the nanotubes.[62] In order to minimize defect density, the arc discharge soot used in these studies was processed using low power ultrasonic agitation for dispersion, followed by iterative centrifugation at low G to separate high aspect ratio SWNTs.[30] This resulted in stable suspensions of high aspect ratio SWNTs having low defect densities, while acid purification methods would have imparted defects that increase electron scattering along the length of each SWNT, thus increasing R. Additionally, because defect sites are preferred locations for nanoparticle nucleation on SWNTs, reducing the sidewall defect density increased the spacing between $Cu_2O$ nanoparticles to a level that allowed each to act as a discrete, tunable valve. Therefore, varying the ultrasonication or chemical conditions used during suspension formation presents a powerful opportunity to control the overall density of nanoparticles for other electronic applications. Then, control over the density of SWNTs in the network and their defect density obviates the need to control the location of defect sites. Additionally, inter-SWNT conduction is facilitated by conductive nanoparticles that fortuitously bridge such junctions.

In order to investigate the effect of electrodeposited metal oxide nanoclusters on the $I_{on}/I_{off}$ of SWNT network-based FETs, standard lithographic methods were used to form $Ti/TiO_x$ electrodes on $Si/SiO_x$ substrates, so that the conductive Si could be used as a gate electrode during device testing. Then, $Ti/TiO_x$ electrodes served as source and drain electrodes that were bridged by SWNT networks. These FETs had a channel length and width of about 300 and 100 μm, respectively. While methods for aligning and coating SWNTs with metals have microelectronic applications, the focus of these investigations was the effect of $Cu_2O$ nanoparticles on the semiconductive character of a network comprised of a mixture of s- and m-SWNTs. Therefore, a deposition voltage of about 0.10 V vs Ag/AgCl and charge flow limits were used to control the size of the nanoparticles. The use of potentials increasingly negative of the equilibrium potential on these $Ti/TiO_x$ surfaces were found to increase the size of the nanoparticles until they coalesced and completely coated the individual SWNTs comprising the network.

The electrode area was an about 1.0 cm diameter disc that encompassed the $Ti/TiO_x$ electrodes (FIG. 22A). This was accomplished by mounting each sample in a homemade glass cell that housed the reference and counter electrodes. Then, the electrochemically active area was defined by the $TiO_x$/silane electrodes and the SWNTs in the macroscopic network that bridged the electrodes. A deposition charge of about 16.7 mC resulted in the growth of nanoparticles on the SWNTs within the network that bridged the source/drain channel (FIG. 22B). Although they are highly conductive like metals, the sidewalls of SWNTs are generally inert toward electrochemical deposition of adsorbates. Therefore, deposits generally form via nucleation and growth at defects at the ends and sidewalls of the nanotubes. On graphite, this type of preferential nucleation at defects has been attributed to the higher coordination provided by oxygen-containing defects.[63] For SWNTs, the nanoclusters nucleated at defects, and then grew into nm-sized clusters having their size predetermined by the amount of electrochemical charge allowed to pass. Therefore, van der Waals attractions existed between the nanoclusters and sidewalls, while a stronger bond, possibly containing a significant degree of covalent character, existed between the defect and nanoclusters.

The average height observed for AFM images of unbundled arc discharge SWNTs is about 1.4 nm.[30] The average height observed about 200 μm from the $TiO_x$/SWNT network interface to about 8.5±0.3 nm. The average size of the nanoparticles decreased to about 7.3±0.2 nm at about 2,000 μm from the $TiO_x$/SWNT network interface. Such a gradient in nanoparticle size is typically observed in SWNT networks,[64,65] as the SWNTs acts as a collection of low-R wires, with high R at each inter-SWNT junction causing a drop in the electrochemical potential with distance. Nanoparticle growth was not observed on isolated SWNTs or the silica substrate, indicating that electrodeposition is an effective manner to preferentially modify the SWNTs in a conductive network.

Effect of $Cu_2O$ Nanoparticles on Electrical Resistance

To determine the effect of $Cu_2O$ nanoparticles on R for low-density networks of unbundled SWNTs, R was measured by obtaining I/V curves in air, for the range about ±0.3 V, using a semiconductor characterization unit. For all electrochemical experiments involving FETs, the amount of $Cu_2O$ deposited was limited by controlling the total charge allowed to flow before the cell was returned to $V_{rev.}$, and the sample removed from the cell. Control experiments, where R was measured before and after samples were immersed in the electrochemical cell and held at potentials near or slightly positive of the $V_{rev.}$ for Cu resulted in no appreciable change in two-terminal R or FET response. However, the magnitude of R was observed to decrease with decreasing deposition potential. Two-point probe R measurements were used, as this configuration closely resembles that of the measurements for the FETs described below.

The change in R was strongly affected by the overall alignment of the SWNTs in the network. For a deposition potential of about 0.1 V vs. Ag/AgCl, the average R decreased from about 1.14±0.09 to 0.75±0.06 MΩ for the "aligned" samples when a deposition potential of about 0.1 V was used. This represents an about 34% decrease in R. The average R decreased from about 1.3±0.1 to 0.63±0.06 MD for the "crossbar" samples, corresponding to an about 52% reduction in R. The increased response of the crossbar samples can be attributed to the greater number of inter-SWNT junctions.

Part of the reduction in R for both levels of alignment is attributed to the formation of ohmic contacts between s- and m-SWNTs in the network when nanoparticles bridged those junctions, reducing the Schottky barrier between the two types of conductors. When high aspect ratio SWNTs were oriented orthogonally, the number of junctions increased significantly. This allowed greater gains in conductivity. The effect of the density of the nanoclusters on the two-terminal R and FET performance of both types of networks is currently under investigation, but it is expected that performance gains will decrease as the density of defects on the SWNTs increases, since sidewall defects impede current flow in nanotubes.

Effect of $Cu_2O$ Nanoparticles on SWNT Network Field-Effect Transistors

When the performance of "aligned" and "crossbar" samples were examined in FETs, the "aligned" samples had increased performance gains with respect to $I_{on}/I_{off}$. The magnitude of $I_{on}$ and $I_{off}$ were determined at about −5 and +5 V, respectively. For the representative devices in FIG. 23, a deposition charge of about 2 mC was accompanied by a slight increase in $I_{on}$ and a dramatic decrease in $I_{off}$. The highest increase $I_{on}/I_{off}$ was observed for "aligned" networks, as it increased from about 5 to 1057, representing an about 211- fold increase in $I_{on}/I_{off}$. The "crossbar" networks had a significantly greater initial R, and $I_{on}/I_{off}$ changed from about 16 to 561, representing an about 35-fold increase. At higher electrochemical charge densities, both the two-terminal R and $I_{on}/I_{off}$ decreased, as the transistor response exhibited increasing metallic behavior for both types of networks. It was also notable that the initial R was higher for "crossbar" networks, although the density of nanotubes for the two networks was similar. This can be attributed to the fewer junctions that have to be traversed during electron transport if the SWNTs are partially aligned. This facilitated greater gains in two-terminal R for "crossbar" networks after nanoparticle deposition (FIGS. 23A, 23B, insets).

As un-separated SWNTs have a distribution of $\frac{1}{3}^{rd}$ metallic and $\frac{2}{3}^{rd}$ semiconductive, low density networks of unbundled nanotubes behave as semiconductors due to the lack of metallic pathways in the network. However, at the higher densities used in these studies, metallic SWNTs formed short circuit pathways that greatly reduced the initial $I_{on}/I_{off}$ of SWNT network transistors. Then, the OFF-state current was indicative of the number of metallic pathways through the film. Therefore, starting with FETs that exhibited a low initial $I_{on}/I_{off}$ allowed confirmation of the fact that $Cu_2O$ nanoparticle deposition increased the $V_g$ sensitivity of the m-SWNTs in the conductive pathways.

It is possible to controllably open a bandgap in m-SWNTs since they are not true metals, in fact semimetals or zero band gap semiconductors, like graphene. Since graphene is a 2-dimensional material, efforts to open a band gap in it have centered on reducing its one of its lateral dimensions and/or functionalizing its edges.[66-68] However, the 1-dimensional nature of SWNTs simplifies the process of band gap opening and tuning. The ability to induce quantum confinement effects, by the electrodeposition of $Cu_2O$ nanoparticles, which increase sensitivity to $V_g$ essentially inserts a controllable valve along a conducting wire. Therefore, while much of the SWNT continues to exhibit high conductivity in the presence of positive values of $V_g$, electrical transport is stopped near the nanoparticles, as expected for a p-type semiconductor. The mechanism of this involves the local depletion of electron density within a few nm of the $Cu_2O$ nanoclusters, due to their high work function.

The great increase in $I_{on}/I_{off}$ for both types of networks indicated that metallic short circuit pathways in the networks were converted to semiconductive, as much of the increase in $I_{on}/I_{off}$ occurred via a greatly reduced $I_{off}$ for FETs that initially showed little response to $V_g$. This indicated that at positive values of $V_g$, the $Cu_2O$ adsorbates opened a band gap in m-SWNTs, and small band gap s-SWNTs, by locally withdrawing electron density. This would effectively allow each nanoparticle/SWNT contact to act as a nanoscale valve that could be closed at positive values of $V_g$, allowing much lower magnitudes of $I_{on}/I_{off}$ to be achieved.

Scanned gate microscopy studies have indicated that point defects along m-SWNTs led to resonant electron scattering that resulted in moderate sensitivity of the conductance of unmodified nanotubes to changes in $V_g$.[69] Further, the conductivity through defects in unmodified m-SWNTs has been shown to exhibit local gate dependence. In the present disclosure, local gating effect at defects on m-SWNTs was enhanced by the high work function $Cu_2O$ adsorbates. Therefore, when $Cu_2O$ nanoparticles were deposited on m-SWNTs, the modification of the density of electronic states near the defect opened a band gap in the otherwise metallic nanotubes causing a decrease in $I_{off}$ at positive values of $V_g$.

CONCLUSIONS

Forming SWNT networks on prefabricated metal electrodes using liquid deposition methods provides a facile route to device assembly. This device geometry also facilitated the use of electrochemical methods to enhance the interfacial electron transport by the formation of chemisorbed $Cu_2O$ shunts through a silane monolayer to the conductive underlying Ti. This provides greatly improved connections, compared to the weak van der Waals contacts that exist at unmodified metal/SWNT interfaces. As self-assembled monolayers (SAMs) composed of silane are used as adhesion layers on $SiO_x$ surfaces, the use of metal electrodes that are terminated with a thin oxide layer allows the formation of a single silane monolayer that coats the entire surface. Then, after network formation, electrochemical methods were used to optimize the electrical properties of the thin films.

For SWNT network FETs, $I_{on}$ was improved by reducing R at inter-SWNT junctions and at interfacial contacts between the nanotubes and metal. Metal oxide nanoclusters were electrodeposited onto the SWNT sidewalls resulting in the formation of numerous valves that allowed a much-enhanced response of the network to $V_g$. This can increase the operating efficiency of SWNT network-based electronic device structures, as less expensive gate dielectrics can be used when the sensitivity to $V_g$ is increased. This approach also reduces the effect of metallic SWNTs in networks without the need for expensive processing steps to separate them based on their type of conductivity.

REFERENCES (1) Zhou, X. J.; Park, J. Y.; Huang, S. M.; Liu, J.; McEuen, P. L. *Phys. Rev. Lett.* 2005, 95.
(2) Taychatanapat, T.; Bolotin, K. I.; Kuemmeth, F.; Ralph, D. C. *Nano Lett.* 2007, 7, 652.
(3) Zhou, W.; Zhan, S.; Ding, L.; Liu, J. *J. Am. Chem. Soc.* 2012, 134, 14019.
(4) Yang, X.; Liu, L.; Wu, M.; Wang, W.; Bai, X.; Wang, E. *J. Am. Chem. Soc.* 2011, 133, 13216.
(5) Hong, G.; Zhang, B.; Peng, B.; Zhang, J.; Choi, W. M.; Choi, J.-Y.; Kim, J. M.; Liu, Z. *J. Am. Chem. Soc.* 2009, 131, 14642.
(6) Zhang, L.; Tu, X.; Welsher, K.; Wang, X.; Zheng, M.; Dai, H. *J. Am. Chem. Soc.* 2009, 131, 2454.
(7) Palacin, T.; Le Khanh, H.; Jousselme, B.; Jegou, P.; Filoramo, A.; Ehli, C.; Guldi, D. M.; Campidelli, S. *J. Am. Chem. Soc.* 2009, 131, 15394.
(8) Zhang, L.; Zaric, S.; Tu, X.; Wang, X.; Zhao, W.; Dai, H. *J. Am. Chem. Soc.* 2008, 130, 2686.
(9) So, H. M.; Kim, B.-K.; Park, D.-W.; Kim, B. S.; Kim, J.-J.; Kong, K.-J.; Chang, H.; Lee, J.-O. *J. Am. Chem. Soc.* 2007, 129, 4866.
(10) Byon, H. R.; Choi, H. C. *J. Am. Chem. Soc.* 2006, 128, 2188.
(11) Chen, Z. H.; Appenzeller, J.; Knoch, J.; Lin, Y. M.; Avouris, P. *Nano Lett.* 2005, 5, 1497.
(12) Freitag, M.; Tsang, J. C.; Bol, A.; Yuan, D.; Liu, J.; Avouris, P. *Nano Lett.* 2007, 7, 2037.
(13) Rouhi, N.; Jain, D.; Burke, P. *J. Acs Nano* 2011, 5, 8471.
(14) Caballero-Briones, F.; Arles, J. M.; Diez-Perez, I.; Gorostiza, P.; Sanz, F. *J. Phys. Chem. C* 2009, 113, 1028.
(15) u, L. echt, . . . r ner, *Chem. Rev.* 2010, 110, 5790.
(16) Yuhas, B. D.; Yang, P. *J. Am. Chem. Soc.* 2009, 131, 3756.
(17) McShane, C. M.; Choi, K.-S. *J. Am. Chem. Soc.* 2009, 131, 2561.
(18) Deng, S.; Tjoa, V.; Fan, H. M.; Tan, H. R.; Sayle, D. C.; Olivo, M.; Mhaisalkar, S.; Wei, J.; Sow, C. H. *J. Am. Chem. Soc.* 2012, 134, 4905.
(19) Yang, F.; Choi, Y.; Liu, P.; Stacchiola, D.; Hrbek, J.; Rodriguez, J. A. *J. Am. Chem. Soc.* 2011, 133, 11474.

(20) Li, C. W.; Kanan, M. W. *J. Am. Chem. Soc.* 2012, 134, 7231.
(21) Huang, W.-C.; Lyu, L.-M.; Yang, Y.-C.; Huang, M. H. *J. Am. Chem. Soc.* 2012, 134, 1261.
(22) Kocabas, C.; Pimparkar, N.; Yesilyurt, O.; Kang, S. J.; Alam, M. A.; Rogers, J. A. *Nano Lett.* 2007, 7, 1195.
(23) Yan, X.; Cui, X.; Li, L.-s. *J. Am. Chem. Soc.* 2010, 132, 5944.
(24) eller, I. Chatoor, M nnik, J. evenbergen, M . . . ekker, C. Lemay, . . . *J. Am. Chem. Soc.* 2010, 132, 17149.
(25) Lay Marcus, D.; Vichchulada, P.; Asheghali, D. U.S. Patent Appl. 61/733,473, 2012.
(26) Yang, M. H.; Teo, K. B. K.; Milne, W. I.; Hasko, D. G. *Appl. Phys. Lett.* 2005, 87, 3.
(27) Lu, C. G.; An, L.; Fu, Q. A.; Liu, J.; Zhang, H.; Murduck, J. *Appl. Phys. Lett.* 2006, 88, 3.
(28) Fuhrer, M. S.; Nygard, J.; Shih, L.; Forero, M.; Yoon, Y. G.; Mazzoni, M. S. C.; Choi, H. J.; Ihm, J.; Louie, S. G.; Zettl, A.; McEuen, P. L. *Science* 2000, 288, 494.
(29) Nirmalraj, P. N.; Lyons, P. E.; De, S.; Coleman, J. N.; Boland, J. J. *Nano Lett.* 2009, 9, 3890.
(30) Bhatt, N. P.; Vichchulada, P.; Lay, M. D. *J. Am. Chem. Soc.* 2012, 134, 9352.
(31) Zhang, Q.; Vichchulada, P.; Lay, M. D. *J. Phys. Chem. C* 2010, 114, 16292.
(32) Vichchulada, P.; Zhang, Q.; Duncan, A.; Lay, M. D. *ACS Appl. Mater. Interfaces* 2010, 2, 467.
(33) Sangwan, V. K.; Ortiz, R. P.; Alaboson, J. M. P.; Emery, J. D.; Bedzyk, M. J.; Lauhon, L. J.; Marks, T. J.; Hersam, M. C. *Acs Nano* 2012, 6, 7480.
(34) Zhang, Q.; Vichchulada, P.; Cauble, M. A.; Lay, M. D. *J. Mater. Sci.* 2009, 44, 1206.
(35) Li, E. Y.; Marzari, N. *Acs Nano* 2011, 5, 9726.
(36) Zhang, Y.; Franklin, N. W.; Chen, R. J.; Dai, H. *J. Chem. Phys. Lett.* 2000, 331, 35.
(37) Rodriguez-Manzo, J. A.; Banhart, F.; Terrones, M.; Terrones, H.; Grobert, N.; Ajayan, P. M.; Sumpter, B. G.; Meunier, V.; Wang, M.; Bando, Y.; Golberg, D. *Proc. Natl. Acad. Sci. USA* 2009, 106, 4591.
(38) Zhang, Y.; Ichihashi, T.; Landree, E.; Nihey, F.; Iijima, S. *Science* 1999, 285, 1719.
(39) Asaka, K.; Karita, M.; Saito, Y. *Appl. Surf. Sci.* 2011, 257, 2850.
(40) Madsen, D. N.; Mølhave, K.; Mateiu, R.; Rasmussen, A. M.; Brorson, M.; Jacobsen, C. J. H.; Bøggild, P. *Nano Lett.* 2002, 3, 47.
(41) Zhang, Q.; Vichchulada, P.; Shivareddy, S. B.; Lay, M. D. *J. Mat. Sci.* 2012, 47, 6812.
(42) Chow, B. Y.; Mosley, D. W.; Jacobson, J. M. *Langmuir* 2005, 21, 4782.
(43) Vichchulada, P.; Cauble, M. A.; Abdi, E. A.; Obi, E. I.; Zhang, Q.; Lay, M. D. *J. Phys. Chem. C* 2010, 114, 12490.
(44) Horcas, I.; Fernandez, R.; Gomez-Rodriguez, J. M.; Colchero, J.; Gomez-Herrero, J.; Baro, A. M. *Rev. Sci. Instrum.* 2007, 78.
(45) Savio, A. K. P. D.; Starikov, D.; Bensaoula, A.; Pillai, R.; de la Torre Garcia, L. L.; Robles Hernandez, F. C. *Ceram. Int.* 2012, 38, 3529.
(46) Lee, M.-K.; Yen, C.-F. *Electrochem. Solid St.* 2010, 13, G87.
(47) Basame, S. B.; White, H. S. *Anal. Chem.* 1999, 71, 3166.
(48) Boxley, C. J.; White, H. S.; Gardner, C. E.; Macpherson, J. V. *J. Phys. Chem. B* 2003, 107, 9677.
(49) Rao, C. N. R.; Subba Rao, G. V. *Phys. Status Solidi* 1970, 1, 597.
(50) Emery, S. B.; Hubbley, J. L.; Roy, D. *J. Electroanal. Chem.* 2004, 568, 121.
(51) Oskam, G.; Searson, P. C. *Surf. Sci.* 2000, 446, 103.
(52) Casillas, N.; Charlebois, S.; Smyrl, W. H.; White, H. S. *J. Electrochem. Soc.* 1994, 141, 636.
(53) Scharifker, B.; Hills, G. *Electrochim. Acta* 1983, 28, 879.
(54) Liu, R.; Oba, F.; Bohannan, E. W.; Ernst, F.; Switzer, J. A. *Chem. Mater.* 2003, 15, 4882.
(55) Zhao, L.; Dong, W.; Zheng, F.; Fang, L.; Shen, M. *Electrochim. Acta* 2012, 80, 354.
(56) Wu, S.; Yin, Z.; He, Q.; Lu, G.; Zhou, X.; Zhang, H. *J. Mater. Chem.* 2011, 21, 3467.
(57) Basu, M.; Sinha, A. K.; Pradhan, M.; Sarkar, S.; Negishi, Y.; Pal, T. *J. Phys. Chem. C* 2011, 115, 20953.
(58) Banus, M. D.; Reed, T. B.; Strauss, A. J. *Phys. Rev. B* 1972, 5, 2775.
(59) Vandenberg, E. T.; Bertilsson, L.; Liedberg, B.; Uvdal, K.; Erlandsson, R.; Elwing, H.; Lundstrom, I. *J. Colloid Interface Sci.* 1991, 147, 103.
(60) Laitinen, H. A.; Kolthoff, I. M. *J. Am. Chem. Soc.* 1939, 61, 3344.
(61) Bard, A. J.; Faulkner, L. R. *Electrochemical Methods, Fundamentals and Applications;* 2nd ed.; John Wiley & Sons: New York, 2001.
(62) Fan, Y. W.; Goldsmith, B. R.; Collins, P. G. *Nat. Mater.* 2005, 4, 906.
(63) Walter, E. C.; Murray, B. J.; Favier, F.; Kaltenpoth, G.; Grunze, M.; Penner, R. M. *J. Phys. Chem. B* 2002, 106, 11407.
(64) Dudin, P. V.; Snowden, M. E.; Macpherson, J. V.; Unwin, P. R. *Acs Nano* 2011, 5, 10017.
(65) Day, T. M.; Wilson, N. R.; Macpherson, J. V. *J. Am. Chem. Soc.* 2004, 126, 16724.
(66) Yang, Z.; Sun, Y.; Alemany, L. B.; Narayanan, T. N.; Billups, W. E. *J. Am. Chem. Soc.* 2012, 134, 18689.
(67) Schwab, M. G.; Narita, A.; Hernandez, Y.; Balandina, T.; Mali, K. S.; De Feyter, S.; Feng, X.; Muellen, K. *J. Am. Chem. Soc.* 2012, 134, 18169.
(68) Balog, R.; Jorgensen, B.; Wells, J.; Laegsgaard, E.; Hofmann, P.; Besenbacher, F.; Hornekaer, L. *J. Am. Chem. Soc.* 2009, 131, 8744.
(69) Bockrath, M.; Liang, W. J.; Bozovic, D.; Hafner, J. H.; Lieber, C. M.; Tinkham, M.; Park, H. K. *Science* 2001, 291, 283.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to measurement techniques and the numerical value. In addition, the phrase "about 'x' to 'y'" includes "about 'x' to about 'y'".

It should be emphasized that the above-described embodiments of the present disclosure are merely possible examples of implementations, and are merely set forth for a clear understanding of the principles of the disclosure. Many variations and modifications may be made to the above-described embodiments. All such modifications and variations are intended to be included herein within the scope of this disclosure and protected by the following claims.

Therefore, at least the following is claimed:

1. A method of purifying and depositing single-walled carbon nanotube (SWNT) networks comprising:
    preparing a substrate;
    preparing a suspension of SWNTs; and
    depositing the SWNT suspension onto the substrate, wherein the deposition method provides control over a density and an alignment of SWNTs and prevents the SWNTs from forming bundles during deposition, wherein the deposition comprises laminar flow deposition (LFD),
    wetting the substrate with the SWNT suspension on a sample surface;
    drying the sample in a stream of gas;
    rinsing the sample with water; and
    drying the sample in a stream of gas.

2. The method of claim 1, wherein the substrate is selected from the group consisting of: Au, $Si/SiO_2$, $Si/SiO_x$, $TiO_x$, a mica, a polymer, and a combination thereof, wherein x is 1 or 2.

3. The method of claim 1, wherein preparing the substrate comprises depositing at least one electrode on the surface of the substrate, wherein the at least one electrode is selected from the group consisting of: Ti, Al, Ta, Ni, Fe, and a combination thereof.

4. The method of claim 3, wherein the electrodes are deposited before or after the network formation.

5. The method of claim 3, further comprising modifying the substrate with a self-assembled monolayer, wherein the monolayer serves as an adhesion layer for the SWNTs.

6. The method of claim 5, wherein the monolayer is selected from the group consisting of: a silane, a thiol, a phosphate, a sulfide, a disulfide, a phosphonate, and a combination thereof.

7. The method of claim 6, further comprising using electrodeposition to form conductive shunts through the self-assembled monolayer and the metal oxide adlayers.

8. The method of claim 1, wherein preparing the suspension of SWNTs comprises:
    dispersing unmodified SWNT soot in a solution of sodium dodecyl sulfate (SDS) via probe ultrasonication to form a suspension;
    centrifuging the suspension for about 45 to about 90 minutes at about 18,000 centripetal force (G);
    removing at least a portion of the supernatant; and
    repeating the centrifugation at least one time.

9. The method of claim 1, wherein purifying the SWNTS without oxidizing acids or vapors produces high aspect ratio SWNTs, wherein the high aspect ratio SWNTs comprise low defects and exhibit decreased electrical resistance (R).

10. The method of claim 1, further comprising spinning the substrate using a spin-coater to produce SWNT networks comprising randomly oriented SWNTs.

11. The method of claim 1, wherein the SWNT network is selected from the group consisting of: highly aligned SWNTs, randomly oriented SWNTs, and a combination thereof.

12. The method of claim 1, further comprising annealing the coated substrate at about 100 to about 300° C.

13. The method of claim 12, further comprising treating the coated substrate with a mild acid selected from the group consisting of: dilute nitric acid, dilute nitrous acid, and a combination thereof.

* * * * *